(12) United States Patent
Cheon et al.

(10) Patent No.: US 9,300,972 B2
(45) Date of Patent: Mar. 29, 2016

(54) VIDEO ENCODING METHOD AND APPARATUS USING LOW-COMPLEXITY FREQUENCY TRANSFORMATION, AND VIDEO DECODING METHOD AND APPARATUS

(75) Inventors: Min-Su Cheon, Suwon-si (KR); Il-Koo Kim, Osan-si (KR); Tammy Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 13/148,657

(22) PCT Filed: Feb. 8, 2010

(86) PCT No.: PCT/KR2010/000757
§ 371 (c)(1),
(2), (4) Date: Aug. 9, 2011

(87) PCT Pub. No.: WO2010/090484
PCT Pub. Date: Aug. 12, 2010

(65) Prior Publication Data
US 2011/0310973 A1    Dec. 22, 2011

Related U.S. Application Data

(60) Provisional application No. 61/150,902, filed on Feb. 9, 2009.

(51) Int. Cl.
*H04N 11/02* (2006.01)
*H04N 19/18* (2014.01)
(Continued)

(52) U.S. Cl.
CPC ............. *H04N 19/18* (2014.11); *H04N 19/119* (2014.11); *H04N 19/122* (2014.11);
(Continued)

(58) Field of Classification Search
CPC ................. H04N 19/00084; H04N 19/00109; H04N 19/00127; H04N 19/00157; H04N 7/26101; H04N 7/26127; H04N 7/2625
See application file for complete search history.

(56) References Cited

U.S. PATENT DOCUMENTS 5,241,395 A * 8/1993 Chen ...................... 358/426.14
5,371,611 A  12/1994 Kato et al.
(Continued)

FOREIGN PATENT DOCUMENTS

CN   1586042 A    2/2005
CN   101095137 A  12/2007
(Continued)

OTHER PUBLICATIONS

International Search Report for PCT/KR2010/000757 issued Sep. 17, 2010 [PCT/ISA/210].
(Continued)

Primary Examiner — Dave Czekaj
Assistant Examiner — Md Haque
(74) Attorney, Agent, or Firm — Sughrue Mion, PLLC

(57) ABSTRACT

Provided are a video encoding method and apparatus using a low-complexity transformation and a video decoding method and apparatus using a low-complexity inverse transformation. The video encoding method includes: receiving image data of an input picture in predetermined data units; generating coefficients of the predetermined data units by performing a low-complexity transformation on the image data; and outputting the generated coefficients. The low-complexity transformation includes at least one of a selective frequency-domain transformation that uses a transformation basis for a predetermined frequency-domain, a sub data unit transformation that performs a transformation by respectively selecting and applying transformation bases for a plurality of sub data units divided from the image data, and a scale-down transformation that uses a scale-down rectangular transformation basis that is a combination of a rectangular matrix and a square matrix.

49 Claims, 50 Drawing Sheets

(51) Int. Cl.

| | | |
|---|---|---|
| *H04N 19/176* | (2014.01) | |
| *H04N 19/119* | (2014.01) | |
| *H04N 19/46* | (2014.01) | |
| *H04N 19/122* | (2014.01) | |
| *H04N 19/129* | (2014.01) | |
| *H04N 19/61* | (2014.01) | |
| *H04N 19/132* | (2014.01) | |
| *H04N 19/14* | (2014.01) | |

(52) U.S. Cl.
CPC .......... *H04N 19/129* (2014.11); *H04N 19/132* (2014.11); *H04N 19/14* (2014.11); *H04N 19/176* (2014.11); *H04N 19/46* (2014.11); *H04N 19/61* (2014.11)

(56) References Cited

U.S. PATENT DOCUMENTS

| | | | | |
|---|---|---|---|---|
| 5,455,578 | A | * | 10/1995 | Bhandari ........................ 341/51 |
| 5,479,211 | A | | 12/1995 | Fukuda |
| 5,617,143 | A | | 4/1997 | Shimokoriyama et al. |
| 5,694,173 | A | * | 12/1997 | Kimura et al. ............. 348/423.1 |
| 5,991,453 | A | * | 11/1999 | Kweon et al. ................. 382/250 |
| 6,795,584 | B2 | | 9/2004 | Karczewicz |
| 7,020,672 | B2 | | 3/2006 | Lan et al. |
| 7,236,529 | B2 | * | 6/2007 | Lin et al. .................... 375/240.2 |
| 8,069,201 | B2 | | 11/2011 | Zhou |
| 8,604,947 | B2 | | 12/2013 | Kadono et al. |
| 2003/0077002 | A1 | * | 4/2003 | Silverstein et al. ........... 382/282 |
| 2005/0074062 | A1 | | 4/2005 | Sung et al. |
| 2005/0111554 | A1 | * | 5/2005 | Zhou ........................ 375/240.17 |
| 2007/0280349 | A1 | * | 12/2007 | Prieto et al. .............. 375/240.03 |
| 2008/0137744 | A1 | * | 6/2008 | Moriya et al. ........... 375/240.15 |
| 2008/0310512 | A1 | * | 12/2008 | Ye et al. .................... 375/240.16 |

FOREIGN PATENT DOCUMENTS

| | | | |
|---|---|---|---|
| KR | 10-0148150 B1 | | 9/1998 |
| KR | 10-0257175 B1 | | 5/2000 |
| KR | 100751869 | * | 4/2005 |
| KR | 10-2005-0105268 A | | 11/2005 |
| KR | 10-2007-0016663 A | | 2/2007 |
| KR | 10-0751869 B1 | | 8/2007 |

OTHER PUBLICATIONS

Written Opinion for PCT/KR2010/000757 issued Sep. 17, 2010 [PCT/ISA/237].

Communication, dated Nov. 5, 2013, issued by the State Intellectual Property Office of P.R. China in counterpart Chinese Patent Application No. 201080016020.8.

Bruckstein, Alfred M., et al., "Down-Scaling for Better Transform Compression," IEEE Transactions on Image Processing, vol. 12, No. 9, Sep. 2003, pp. 1132-1144.

Communication dated Jun. 4, 2014 issued by the State Intellectual Property Office in counterpart Chinese Application No. 201080016020.8.

European Search Report issued Dec. 4, 2014 by the European Patent Office in related application No. 10738768.0.

Zhang et al., "Video Coding Using Spatially Varying Transform," Lecture Note in Computer Science, vol. 5414, Jan. 2009, total 11 pages.

Zhang et al., "Video Coding Using Variable Block-Size Spatially Varying Transforms," Acoustics, Speech, and Signal Processing, Apr. 2009, total 4 pages.

Han et al., "Improved Video Compression Efficiency Through Flexible Unit Representation and Corresponding Extension of Coding Tools," IIE Transactions on Circuits and Systems for Video Technology, vol. 20, No. 12, Dec. 2010, total 12 pages.

Wien, "Variable Block-Size Transforms for H.264/AVC," IEEE Transactions o Circuits and Systems for Video Technology, vol. 13, No. 7, Jul. 2003, total 10 pages.

Zhang et al., "Low Complexity Algorithm for Spatially Varying Transforms," Picture Coding Symposium, 2009, May 2009, total 4 pages.

Ma et al., "High-definition Video Coding with Super-macroblocks," Visual Communication and Image Processing, vol. 6508, Jan. 2007, total 12 pages.

Ye et al., "Improved Intra Coding," ITU-Telecommunications Standardization Sector, Oct. 2007, total 6 pages.

Communication dated Jan. 20, 2016 issued by Korean Intellectual Property Office in counterpart Korean Patent Application No. 10-2011-7018510.

* cited by examiner $Y = Ta \cdot X \cdot Tb$

AxB    CxD

A>C    Ta : CxA MATRIX
B>D    Tb : BxD MATRIX
       X : AxB MATRIX
       Y : CxA MATRIX $$X' = Ta^T \cdot Y \cdot Tb^T$$

$$M = \begin{bmatrix} 1 & 0 & 0 & 0 \\ 0 & 1 & 0 & 0 \end{bmatrix}, \quad T = \begin{bmatrix} 1 & 1 & 1 & 1 \\ 2 & 1 & -1 & 2 \\ 1 & -1 & -1 & 1 \\ 1 & -2 & 2 & -1 \end{bmatrix}$$

$$M \cdot T = \begin{bmatrix} 1 & 1 & 1 & 1 \\ 2 & 1 & -1 & -2 \end{bmatrix}$$

| M1(1 1 1 1) |
| M2(2 1 -1 -1) |
| M3(1 -1 -1 1) |
| M4(1 -2 2 -1) |

TRANSFORMATION BASIS

1620

| D1 (M1ᵀ·D1·M1) | D2 (M1ᵀ·D2·M2) | D3 (M1ᵀ·D3·M3) | D4 (M1ᵀ·D4·M4) |
| D5 (M2ᵀ·D5·M1) | D6 (M2ᵀ·D6·M2) | D7 (M2ᵀ·D7·M3) | D8 (M2ᵀ·D8·M4) |
| D9 (M3ᵀ·D9·M1) | D10 (M3ᵀ·D10·M2) | D11 (M3ᵀ·D11·M3) | D12 (M3ᵀ·D12·M4) |
| D13 (M4ᵀ·D13·M1) | D14 (M4ᵀ·D14·M2) | D15 (M4ᵀ·D15·M3) | D16 (M4ᵀ·D16·M4) |

COEFFICIENT

| M1 (4 4 4 4 4 4 4 4) |
|---|
| M2 (6 6 2 3 -3 -2 -6 -6) |
| M3 (4 2 -2 -4 -4 -2 2 4) |
| M4 (6 -3 -6 -2 2 6 3 -6) |
| M5 (4 -4 -4 4 4 -4 -4 4) |
| M6 (2 -6 3 6 -6 -3 6 -2) |
| M7 (2 -4 4 -2 -2 4 -4 2) |
| M8 (3 -2 6 -6 6 -6 2 -3) |

TRANSFORMATION BASIS

1720

| D1 (M1ᵀ·D1·M1) | D2 (M1ᵀ·D2·M2) | D3 (M1ᵀ·D3·M3) | D4 (M1ᵀ·D4·M4) | D5 (M1ᵀ·D5·M5) | D6 (M1ᵀ·D6·M6) | D7 (M1ᵀ·D7·M7) | D8 (M1ᵀ·D8·M8) |
|---|---|---|---|---|---|---|---|
| D9 (M2ᵀ·D9·M1) | D10 (M2ᵀ·D10·M2) | D11 (M2ᵀ·D11·M3) | D12 (M2ᵀ·D12·M4) | D13 (M2ᵀ·D13·M5) | D14 (M2ᵀ·D14·M6) | D15 (M2ᵀ·D15·M7) | D16 (M2ᵀ·D16·M8) |
| D17 (M3ᵀ·D17·M1) | D18 (M3ᵀ·D18·M2) | D19 (M3ᵀ·D19·M3) | D20 (M3ᵀ·D20·M4) | D21 (M3ᵀ·D21·M5) | D22 (M3ᵀ·D22·M6) | D23 (M3ᵀ·D23·M7) | D24 (M3ᵀ·D24·M8) |
| D25 (M4ᵀ·D25·M1) | D26 (M4ᵀ·D26·M2) | D27 (M4ᵀ·D27·M3) | D28 (M4ᵀ·D28·M4) | D29 (M4ᵀ·D29·M5) | D30 (M4ᵀ·D30·M6) | D31 (M4ᵀ·D31·M7) | D32 (M4ᵀ·D32·M8) |
| D33 (M5ᵀ·D33·M1) | D34 (M5ᵀ·D34·M2) | D35 (M5ᵀ·D35·M3) | D36 (M5ᵀ·D36·M4) | D37 (M5ᵀ·D37·M5) | D38 (M5ᵀ·D38·M6) | D39 (M5ᵀ·D39·M7) | D40 (M5ᵀ·D40·M8) |
| D41 (M6ᵀ·D41·M1) | D42 (M6ᵀ·D42·M2) | D43 (M6ᵀ·D43·M3) | D44 (M6ᵀ·D44·M4) | D45 (M6ᵀ·D45·M5) | D46 (M6ᵀ·D46·M6) | D47 (M6ᵀ·D47·M7) | D48 (M6ᵀ·D48·M8) |
| D49 (M7ᵀ·D49·M1) | D50 (M7ᵀ·D50·M2) | D51 (M7ᵀ·D51·M3) | D52 (M7ᵀ·D52·M4) | D53 (M7ᵀ·D53·M5) | D54 (M7ᵀ·D54·M6) | D55 (M7ᵀ·D55·M7) | D56 (M7ᵀ·D56·M8) |
| D57 (M8ᵀ·D57·M1) | D58 (M8ᵀ·D58·M2) | D59 (M8ᵀ·D59·M3) | D60 (M8ᵀ·D60·M4) | D61 (M8ᵀ·D61·M5) | D62 (M8ᵀ·D62·M6) | D63 (M8ᵀ·D63·M7) | D64 (M8ᵀ·D64·M8) |

COEFFICIENT

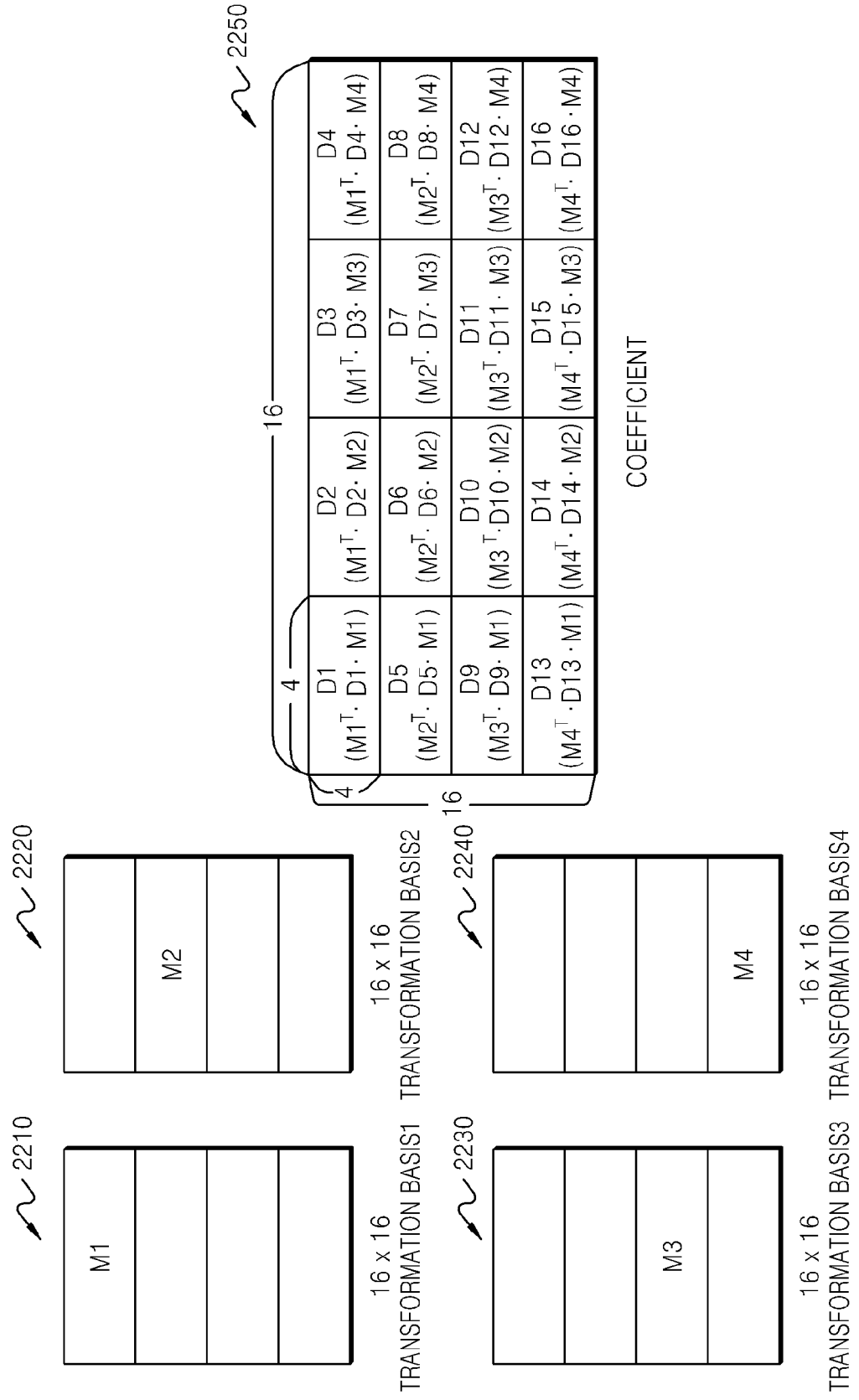

FIG. 23

| D1<br>(M1ᵀ·D1·M1) | D2<br>(M1ᵀ·D2·M2) | D3<br>(M1ᵀ·D3·M3) | D4<br>(M1ᵀ·D4·M4) | D5<br>(M1ᵀ·D5·M5) | D6<br>(M1ᵀ·D6·M6) | D7<br>(M1ᵀ·D7·M7) | D8<br>(M1ᵀ·D8·M8) |
|---|---|---|---|---|---|---|---|
| D9<br>(M2ᵀ·D9·M1) | D10<br>(M2ᵀ·D10·M2) | D11<br>(M2ᵀ·D11·M3) | D12<br>(M2ᵀ·D12·M4) | D13<br>(M2ᵀ·D13·M5) | D14<br>(M2ᵀ·D14·M6) | D15<br>(M2ᵀ·D15·M7) | D16<br>(M2ᵀ·D16·M8) |
| D17<br>(M3ᵀ·D17·M1) | D18<br>(M3ᵀ·D18·M2) | D19<br>(M3ᵀ·D19·M3) | D20<br>(M3ᵀ·D20·M4) | D21<br>(M3ᵀ·D21·M5) | D22<br>(M3ᵀ·D22·M6) | D23<br>(M3ᵀ·D23·M7) | D24<br>(M3ᵀ·D24·M8) |
| D25<br>(M4ᵀ·D25·M1) | D26<br>(M4ᵀ·D26·M2) | D27<br>(M4ᵀ·D27·M3) | D28<br>(M4ᵀ·D28·M4) | D29<br>(M4ᵀ·D29·M5) | D30<br>(M4ᵀ·D30·M6) | D31<br>(M4ᵀ·D31·M7) | D32<br>(M4ᵀ·D32·M8) |
| D33<br>(M5ᵀ·D33·M1) | D34<br>(M5ᵀ·D34·M2) | D35<br>(M5ᵀ·D35·M3) | D36<br>(M5ᵀ·D36·M4) | D37<br>(M5ᵀ·D37·M5) | D38<br>(M5ᵀ·D38·M6) | D39<br>(M5ᵀ·D39·M7) | D40<br>(M5ᵀ·D40·M8) |
| D41<br>(M6ᵀ·D41·M1) | D42<br>(M6ᵀ·D42·M2) | D43<br>(M6ᵀ·D43·M3) | D44<br>(M6ᵀ·D44·M4) | D45<br>(M6ᵀ·D45·M5) | D46<br>(M6ᵀ·D46·M6) | D47<br>(M6ᵀ·D47·M7) | D48<br>(M6ᵀ·D48·M8) |
| D49<br>(M7ᵀ·D49·M1) | D50<br>(M7ᵀ·D50·M2) | D51<br>(M7ᵀ·D51·M3) | D52<br>(M7ᵀ·D52·M4) | D53<br>(M7ᵀ·D53·M5) | D54<br>(M7ᵀ·D54·M6) | D55<br>(M7ᵀ·D55·M7) | D56<br>(M7ᵀ·D56·M8) |
| D57<br>(M8ᵀ·D57·M1) | D58<br>(M8ᵀ·D58·M2) | D59<br>(M8ᵀ·D59·M3) | D60<br>(M8ᵀ·D60·M4) | D61<br>(M8ᵀ·D61·M5) | D62<br>(M8ᵀ·D62·M6) | D63<br>(M8ᵀ·D63·M7) | D64<br>(M8ᵀ·D64·M8) |

2310

COEFFICIENT LENGTH = 27

| | | | | | | | |
|---|---|---|---|---|---|---|---|
| D1 (M1ᵀ·D1·M1) | D2 (M1ᵀ·D2·M2) | D3 (M1ᵀ·D3·M3) | D4 (M1ᵀ·D4·M4) | D5 (M1ᵀ·D5·M5) | D6 (M1ᵀ·D6·M6) | D7 (M1ᵀ·D7·M7) | D8 (M1ᵀ·D8·M8) |
| D9 (M2ᵀ·D9·M1) | D10 (M2ᵀ·D10·M2) | D11 (M2ᵀ·D11·M3) | D12 (M2ᵀ·D12·M4) | D13 (M2ᵀ·D13·M5) | D14 (M2ᵀ·D14·M6) | D15 (M2ᵀ·D15·M7) | D16 (M2ᵀ·D16·M8) |
| D17 (M3ᵀ·D17·M1) | D18 (M3ᵀ·D18·M2) | D19 (M3ᵀ·D19·M3) | D20 (M3ᵀ·D20·M4) | D21 (M3ᵀ·D21·M5) | D22 (M3ᵀ·D22·M6) | D23 (M3ᵀ·D23·M7) | D24 (M3ᵀ·D24·M8) |
| D25 (M4ᵀ·D25·M1) | D26 (M4ᵀ·D26·M2) | D27 (M4ᵀ·D27·M3) | D28 (M4ᵀ·D28·M4) | D29 (M4ᵀ·D29·M5) | D30 (M4ᵀ·D30·M6) | D31 (M4ᵀ·D31·M7) | D32 (M4ᵀ·D32·M8) |
| D33 (M5ᵀ·D33·M1) | D34 (M5ᵀ·D34·M2) | D35 (M5ᵀ·D35·M3) | D36 (M5ᵀ·D36·M4) | D37 (M5ᵀ·D37·M5) | D38 (M5ᵀ·D38·M6) | D39 (M5ᵀ·D39·M7) | D40 (M5ᵀ·D40·M8) |
| D41 (M6ᵀ·D41·M1) | D42 (M6ᵀ·D42·M2) | D43 (M6ᵀ·D43·M3) | D44 (M6ᵀ·D44·M4) | D45 (M6ᵀ·D45·M5) | D46 (M6ᵀ·D46·M6) | D47 (M6ᵀ·D47·M7) | D48 (M6ᵀ·D48·M8) |
| D49 (M7ᵀ·D49·M1) | D50 (M7ᵀ·D50·M2) | D51 (M7ᵀ·D51·M3) | D52 (M7ᵀ·D52·M4) | D53 (M7ᵀ·D53·M5) | D54 (M7ᵀ·D54·M6) | D55 (M7ᵀ·D55·M7) | D56 (M7ᵀ·D56·M8) |
| D57 (M8ᵀ·D57·M1) | D58 (M8ᵀ·D58·M2) | D59 (M8ᵀ·D59·M3) | D60 (M8ᵀ·D60·M4) | D61 (M8ᵀ·D61·M5) | D62 (M8ᵀ·D62·M6) | D63 (M8ᵀ·D63·M7) | D64 (M8ᵀ·D64·M8) |

COEFFICIENT LENGTH = 25    CCBP = 1001

FIG. 28

| D1<br>(M1$^T$·D1·M1) | D2<br>(M1$^T$·D2·M2) | D3<br>(M1$^T$·D3·M3) | D4<br>(M1$^T$·D4·M4) | D5<br>(M1$^T$·D5·M5) | D6<br>(M1$^T$·D6·M6) | D7<br>(M1$^T$·D7·M7) | D8<br>(M1$^T$·D8·M8) |
|---|---|---|---|---|---|---|---|
| D9<br>(M2$^T$·D9·M1) | D10<br>(M2$^T$·D10·M2) | D11<br>(M2$^T$·D11·M3) | D12<br>(M2$^T$·D12·M4) | D13<br>(M2$^T$·D13·M5) | D14<br>(M2$^T$·D14·M6) | D15<br>(M2$^T$·D15·M7) | D16<br>(M2$^T$·D16·M8) |
| D17<br>(M3$^T$·D17·M1) | D18<br>(M3$^T$·D18·M2) | D19<br>(M3$^T$·D19·M3) | D20<br>(M3$^T$·D20·M4) | D21<br>(M3$^T$·D21·M5) | D22<br>(M3$^T$·D22·M6) | D23<br>(M3$^T$·D23·M7) | D24<br>(M3$^T$·D24·M8) |
| D25<br>(M4$^T$·D25·M1) | D26<br>(M4$^T$·D26·M2) | D27<br>(M4$^T$·D27·M3) | D28<br>(M4$^T$·D28·M4) | D29<br>(M4$^T$·D29·M5) | D30<br>(M4$^T$·D30·M6) | D31<br>(M4$^T$·D31·M7) | D32<br>(M4$^T$·D32·M8) |
| D33<br>(M5$^T$·D33·M1) | D34<br>(M5$^T$·D34·M2) | D35<br>(M5$^T$·D35·M3) | D36<br>(M5$^T$·D36·M4) | D37<br>(M5$^T$·D37·M5) | D38<br>(M5$^T$·D38·M6) | D39<br>(M5$^T$·D39·M7) | D40<br>(M5$^T$·D40·M8) |
| D41<br>(M6$^T$·D41·M1) | D42<br>(M6$^T$·D42·M2) | D43<br>(M6$^T$·D43·M3) | D44<br>(M6$^T$·D44·M4) | D45<br>(M6$^T$·D45·M5) | D46<br>(M6$^T$·D46·M6) | D47<br>(M6$^T$·D47·M7) | D48<br>(M6$^T$·D48·M8) |
| D49<br>(M7$^T$·D49·M1) | D50<br>(M7$^T$·D50·M2) | D51<br>(M7$^T$·D51·M3) | D52<br>(M7$^T$·D52·M4) | D53<br>(M7$^T$·D53·M5) | D54<br>(M7$^T$·D54·M6) | D55<br>(M7$^T$·D55·M7) | D56<br>(M7$^T$·D56·M8) |
| D57<br>(M8$^T$·D57·M1) | D58<br>(M8$^T$·D58·M2) | D59<br>(M8$^T$·D59·M3) | D60<br>(M8$^T$·D60·M4) | D61<br>(M8$^T$·D61·M5) | D62<br>(M8$^T$·D62·M6) | D63<br>(M8$^T$·D63·M7) | D64<br>(M8$^T$·D64·M8) |

~2810

COEFFICIENT LENGTH = 10

FIG. 29

| D1<br>(M1$^T$·D1·M1) | D2<br>(M1$^T$·D2·M2) | D3<br>(M1$^T$·D3·M3) | D4<br>(M1$^T$·D4·M4) | D5<br>(M1$^T$·D5·M5) | D6<br>(M1$^T$·D6·M6) | D7<br>(M1$^T$·D7·M7) | D8<br>(M1$^T$·D8·M8) |
|---|---|---|---|---|---|---|---|
| D9<br>(M2$^T$·D9·M1) | D10<br>(M2$^T$·D10·M2) | D11<br>(M2$^T$·D11·M3) | D12<br>(M2$^T$·D12·M4) | D13<br>(M2$^T$·D13·M5) | D14<br>(M2$^T$·D14·M6) | D15<br>(M2$^T$·D15·M7) | D16<br>(M2$^T$·D16·M8) |
| D17<br>(M3$^T$·D17·M1) | D18<br>(M3$^T$·D18·M2) | D19<br>(M3$^T$·D19·M3) | D20<br>(M3$^T$·D20·M4) | D21<br>(M3$^T$·D21·M5) | D22<br>(M3$^T$·D22·M6) | D23<br>(M3$^T$·D23·M7) | D24<br>(M3$^T$·D24·M8) |
| D25<br>(M4$^T$·D25·M1) | D26<br>(M4$^T$·D26·M2) | D27<br>(M4$^T$·D27·M3) | D28<br>(M4$^T$·D28·M4) | D29<br>(M4$^T$·D29·M5) | D30<br>(M4$^T$·D30·M6) | D31<br>(M4$^T$·D31·M7) | D32<br>(M4$^T$·D32·M8) |
| D33<br>(M5$^T$·D33·M1) | D34<br>(M5$^T$·D34·M2) | D35<br>(M5$^T$·D35·M3) | D36<br>(M5$^T$·D36·M4) | D37<br>(M5$^T$·D37·M5) | D38<br>(M5$^T$·D38·M6) | D39<br>(M5$^T$·D39·M7) | D40<br>(M5$^T$·D40·M8) |
| D41<br>(M6$^T$·D41·M1) | D42<br>(M6$^T$·D42·M2) | D43<br>(M6$^T$·D43·M3) | D44<br>(M6$^T$·D44·M4) | D45<br>(M6$^T$·D45·M5) | D46<br>(M6$^T$·D46·M6) | D47<br>(M6$^T$·D47·M7) | D48<br>(M6$^T$·D48·M8) |
| D49<br>(M7$^T$·D49·M1) | D50<br>(M7$^T$·D50·M2) | D51<br>(M7$^T$·D51·M3) | D52<br>(M7$^T$·D52·M4) | D53<br>(M7$^T$·D53·M5) | D54<br>(M7$^T$·D54·M6) | D55<br>(M7$^T$·D55·M7) | D56<br>(M7$^T$·D56·M8) |
| D57<br>(M8$^T$·D57·M1) | D58<br>(M8$^T$·D58·M2) | D59<br>(M8$^T$·D59·M3) | D60<br>(M8$^T$·D60·M4) | D61<br>(M8$^T$·D61·M5) | D62<br>(M8$^T$·D62·M6) | D63<br>(M8$^T$·D63·M7) | D64<br>(M8$^T$·D64·M8) |

COEFFICIENT LENGTH = 4

| | D1<br>(M1$^T$·D1·M1) | D2<br>(M1$^T$·D2·M2) | D3<br>(M1$^T$·D3·M3) | D4<br>(M1$^T$·D4·M4) | D5<br>(M1$^T$·D5·M5) | D6<br>(M1$^T$·D6·M6) | D7<br>(M1$^T$·D7·M7) | D8<br>(M1$^T$·D8·M8) |
|---|---|---|---|---|---|---|---|---|
| | D9<br>(M2$^T$·D9·M1) | D10<br>(M2$^T$·D10·M2) | D11<br>(M2$^T$·D11·M3) | D12<br>(M2$^T$·D12·M4) | D13<br>(M2$^T$·D13·M5) | D14<br>(M2$^T$·D14·M6) | D15<br>(M2$^T$·D15·M7) | D16<br>(M2$^T$·D16·M8) |
| | D17<br>(M3$^T$·D17·M1) | D18<br>(M3$^T$·D18·M2) | D19<br>(M3$^T$·D19·M3) | D20<br>(M3$^T$·D20·M4) | D21<br>(M3$^T$·D21·M5) | D22<br>(M3$^T$·D22·M6) | D23<br>(M3$^T$·D23·M7) | D24<br>(M3$^T$·D24·M8) |
| | D25<br>(M4$^T$·D25·M1) | D26<br>(M4$^T$·D26·M2) | D27<br>(M4$^T$·D27·M3) | D28<br>(M4$^T$·D28·M4) | D29<br>(M4$^T$·D29·M5) | D30<br>(M4$^T$·D30·M6) | D31<br>(M4$^T$·D31·M7) | D32<br>(M4$^T$·D32·M8) |
| | D33<br>(M5$^T$·D33·M1) | D34<br>(M5$^T$·D34·M2) | D35<br>(M5$^T$·D35·M3) | D36<br>(M5$^T$·D36·M4) | D37<br>(M5$^T$·D37·M5) | D38<br>(M5$^T$·D38·M6) | D39<br>(M5$^T$·D39·M7) | D40<br>(M5$^T$·D40·M8) |
| | D41<br>(M6$^T$·D41·M1) | D42<br>(M6$^T$·D42·M2) | D43<br>(M6$^T$·D43·M3) | D44<br>(M6$^T$·D44·M4) | D45<br>(M6$^T$·D45·M5) | D46<br>(M6$^T$·D46·M6) | D47<br>(M6$^T$·D47·M7) | D48<br>(M6$^T$·D48·M8) |
| | D49<br>(M7$^T$·D49·M1) | D50<br>(M7$^T$·D50·M2) | D51<br>(M7$^T$·D51·M3) | D52<br>(M7$^T$·D52·M4) | D53<br>(M7$^T$·D53·M5) | D54<br>(M7$^T$·D54·M6) | D55<br>(M7$^T$·D55·M7) | D56<br>(M7$^T$·D56·M8) |
| | D57<br>(M8$^T$·D57·M1) | D58<br>(M8$^T$·D58·M2) | D59<br>(M8$^T$·D59·M3) | D60<br>(M8$^T$·D60·M4) | D61<br>(M8$^T$·D61·M5) | D62<br>(M8$^T$·D62·M6) | D63<br>(M8$^T$·D63·M7) | D64<br>(M8$^T$·D64·M8) |

COEFFICIENT LENGTH = 23

| | D1<br>(M1ᵀ·D1·M1) | D2<br>(M1ᵀ·D2·M2) | D3<br>(M1ᵀ·D3·M3) | D4<br>(M1ᵀ·D4·M4) | D5<br>(M1ᵀ·D5·M5) | D6<br>(M1ᵀ·D6·M6) | D7<br>(M1ᵀ·D7·M7) | D8<br>(M1ᵀ·D8·M8) |
|---|---|---|---|---|---|---|---|---|
| | D9<br>(M2ᵀ·D9·M1) | D10<br>(M2ᵀ·D10·M2) | D11<br>(M2ᵀ·D11·M3) | D12<br>(M2ᵀ·D12·M4) | D13<br>(M2ᵀ·D13·M5) | D14<br>(M2ᵀ·D14·M6) | D15<br>(M2ᵀ·D15·M7) | D16<br>(M2ᵀ·D16·M8) |
| | D17<br>(M3ᵀ·D17·M1) | D18<br>(M3ᵀ·D18·M2) | D19<br>(M3ᵀ·D19·M3) | D20<br>(M3ᵀ·D20·M4) | D21<br>(M3ᵀ·D21·M5) | D22<br>(M3ᵀ·D22·M6) | D23<br>(M3ᵀ·D23·M7) | D24<br>(M3ᵀ·D24·M8) |
| | D25<br>(M4ᵀ·D25·M1) | D26<br>(M4ᵀ·D26·M2) | D27<br>(M4ᵀ·D27·M3) | D28<br>(M4ᵀ·D28·M4) | D29<br>(M4ᵀ·D29·M5) | D30<br>(M4ᵀ·D30·M6) | D31<br>(M4ᵀ·D31·M7) | D32<br>(M4ᵀ·D32·M8) |
| | D33<br>(M5ᵀ·D33·M1) | D34<br>(M5ᵀ·D34·M2) | D35<br>(M5ᵀ·D35·M3) | D36<br>(M5ᵀ·D36·M4) | D37<br>(M5ᵀ·D37·M5) | D38<br>(M5ᵀ·D38·M6) | D39<br>(M5ᵀ·D39·M7) | D40<br>(M5ᵀ·D40·M8) |
| | D41<br>(M6ᵀ·D41·M1) | D42<br>(M6ᵀ·D42·M2) | D43<br>(M6ᵀ·D43·M3) | D44<br>(M6ᵀ·D44·M4) | D45<br>(M6ᵀ·D45·M5) | D46<br>(M6ᵀ·D46·M6) | D47<br>(M6ᵀ·D47·M7) | D48<br>(M6ᵀ·D48·M8) |
| | D49<br>(M7ᵀ·D49·M1) | D50<br>(M7ᵀ·D50·M2) | D51<br>(M7ᵀ·D51·M3) | D52<br>(M7ᵀ·D52·M4) | D53<br>(M7ᵀ·D53·M5) | D54<br>(M7ᵀ·D54·M6) | D55<br>(M7ᵀ·D55·M7) | D56<br>(M7ᵀ·D56·M8) |
| | D57<br>(M8ᵀ·D57·M1) | D58<br>(M8ᵀ·D58·M2) | D59<br>(M8ᵀ·D59·M3) | D60<br>(M8ᵀ·D60·M4) | D61<br>(M8ᵀ·D61·M5) | D62<br>(M8ᵀ·D62·M6) | D63<br>(M8ᵀ·D63·M7) | D64<br>(M8ᵀ·D64·M8) |

X = 4, Y = 6
COEFFICIENT LENGTH = 19

FIG. 32
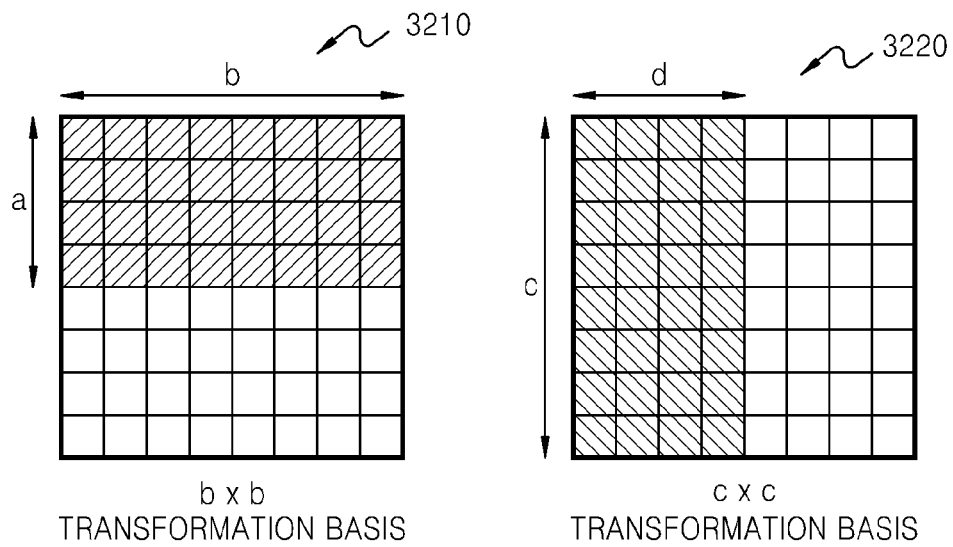
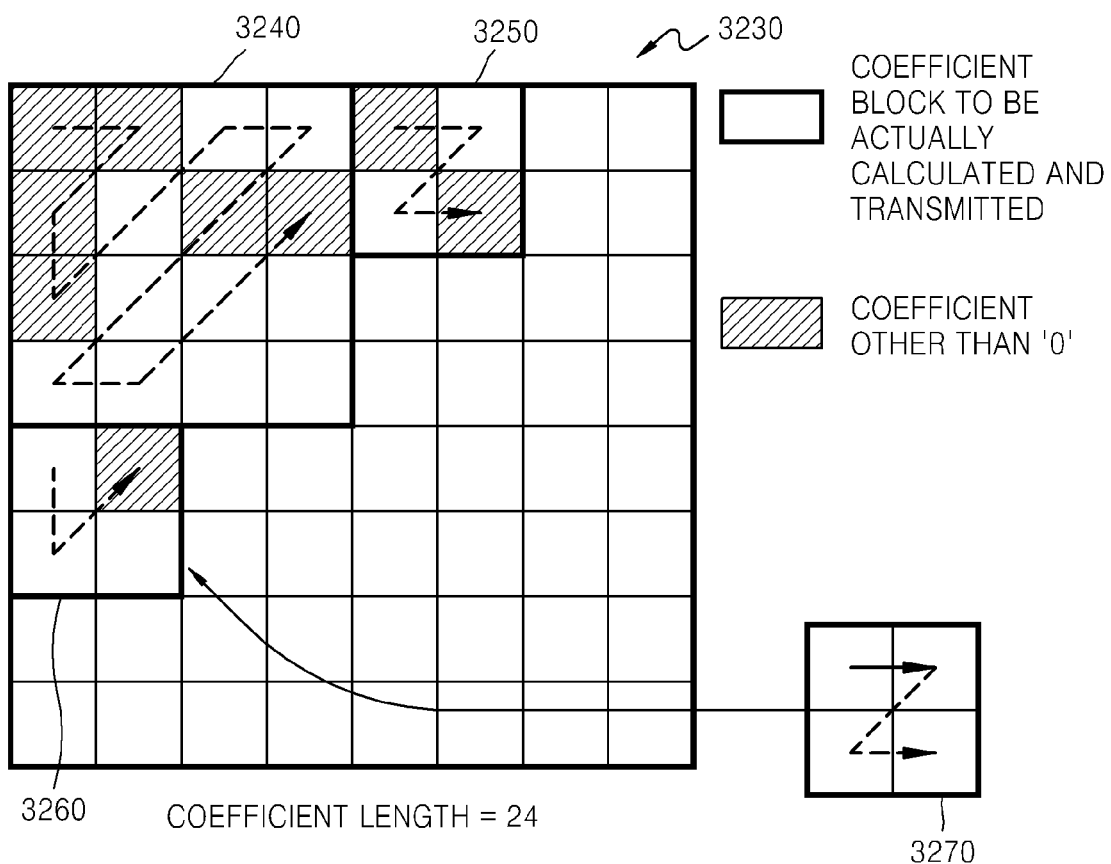

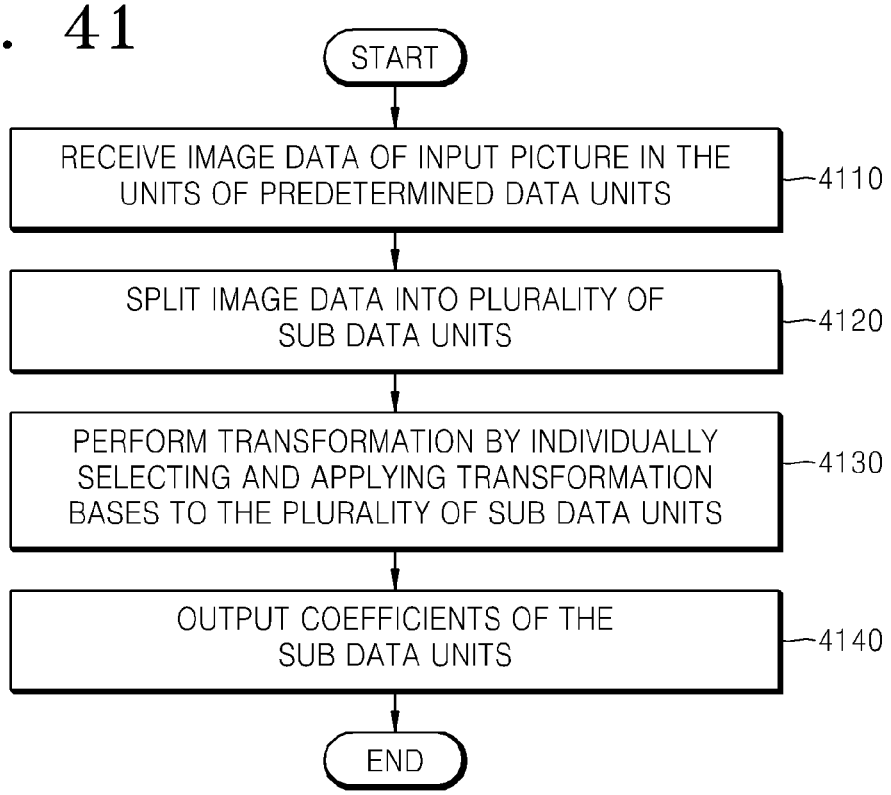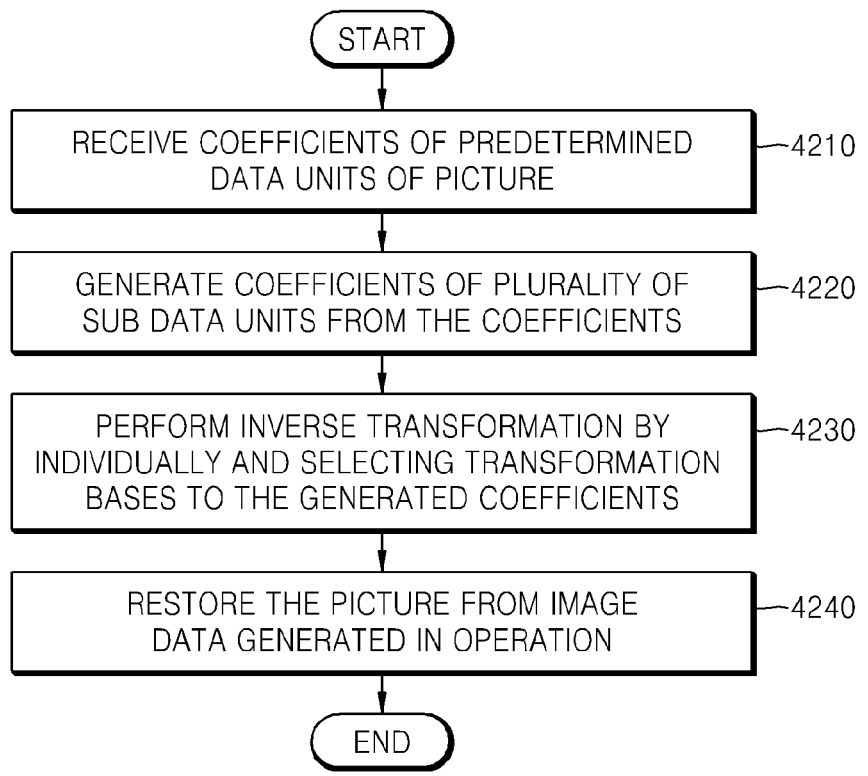

FIG. 57
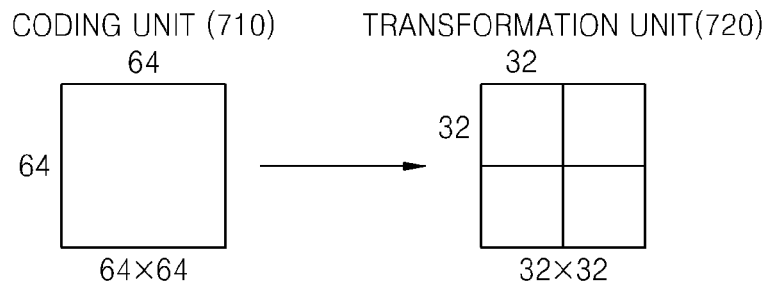
FIG. 58
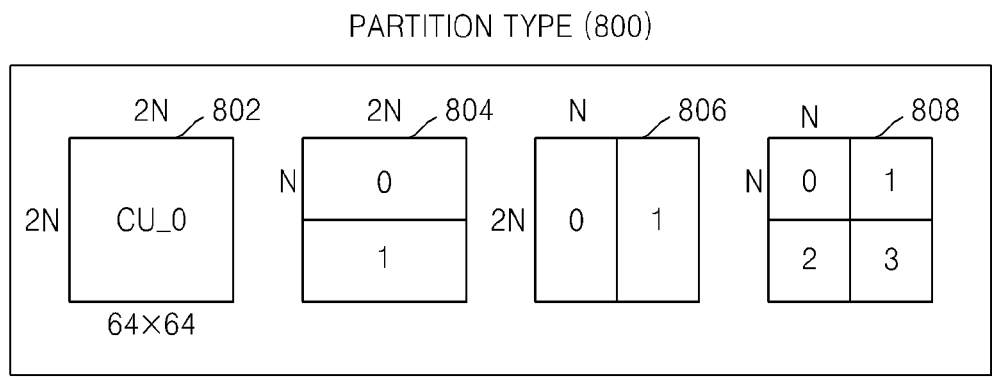
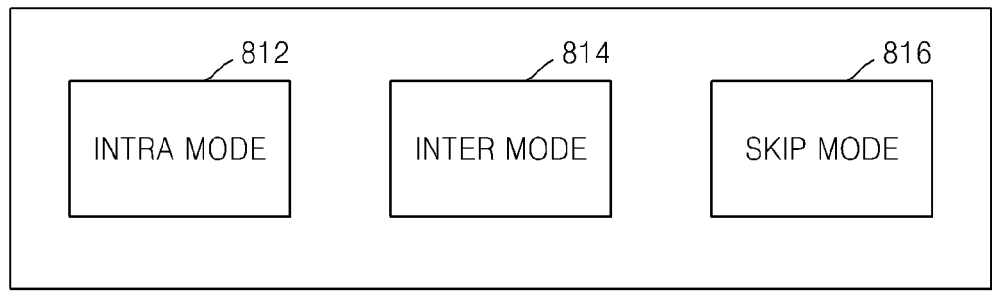
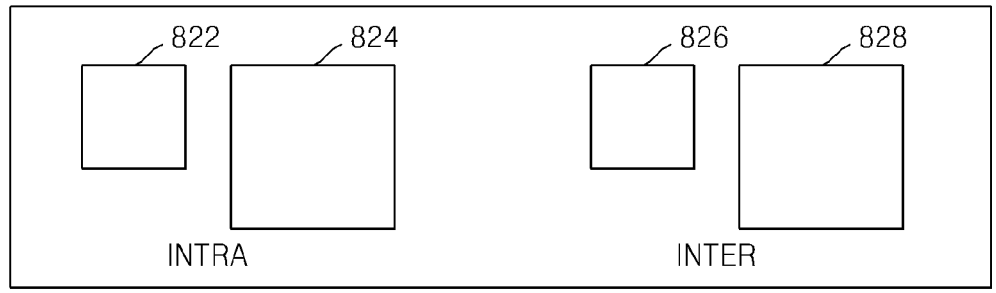

CODING UNIT (1010)

FIG. 63

| | SPLIT x | | | SPLIT ○ |
|---|---|---|---|---|
| | ENCODE AT CURRENT DEPTH | | | SPLIT TO LOWER DEPTH |
| | PREDICTION MODE | | TRANSFORMATION UNIT SIZE | INDIVIDUALLY ENCODE CODING UNIT (NXN) OF EACH UPPER DEPTH |
| SPLIT TYPE | | INTRA | FIRST INTRA TRANSFORMATION UNIT SIZE | |
| 2N×2N | INTRA | | SECOND INTRA TRANSFORMATION UNIT SIZE | |
| 2N×N | INTER | INTER | FIRST INTER TRANSFORMATION UNIT SIZE | |
| N×2N | SKIP (ONLY 2N×2N) | | SECOND INTER TRANSFORMATION UNIT SIZE | |
| N×N | | | | |

VIDEO ENCODING METHOD AND APPARATUS USING LOW-COMPLEXITY FREQUENCY TRANSFORMATION, AND VIDEO DECODING METHOD AND APPARATUS

CROSS-REFERENCE TO RELATED APPLICATIONS

This application is a National Stage application under 35 U.S.C. §371 of PCT/KR2010/000757, filed on Feb. 8, 2010, which claims the benefit of U.S. Provisional Application No. 61/150,902, filed on Feb. 9, 2009, all the disclosures of which are incorporated herein in their entireties by reference.

BACKGROUND

1. Field

Apparatuses and methods consistent with exemplary embodiments relate to encoding and decoding video.

2. Description of the Related Art

As hardware for reproducing and storing high resolution or high quality video content is being developed and supplied, a need for a video codec for effectively encoding or decoding the high resolution or high quality video content is increasing. From among compression techniques of video codecs, transformation and inverse transformation are indispensible techniques.

In a related art video codec, video is encoded according to a limited encoding method based on a macroblock having a predetermined size.

SUMMARY

One or more aspects of exemplary embodiments relate to encoding and decoding video by performing a transformation with low-complexity calculation.

According to an aspect of an exemplary embodiment, there is provided a video encoding method using a low-complexity transformation, the method including: receiving image data of an input picture in predetermined data units; generating coefficients of the predetermined data units by performing a low-complexity transformation on the image data; and outputting the generated coefficients.

The low-complexity transformation includes at least one of a selective frequency-domain transformation that uses a transformation basis for a predetermined frequency-domain, a sub data unit transformation that performs a transformation by respectively selecting and applying transformation bases for a plurality of sub data units divided from the image data, and a scale-down transformation that uses a rectangular transformation basis obtained by combining a rectangular matrix and a square matrix and scaling down a result of the combining.

During the performing of the selective frequency-domain transform, the coefficients of the predetermined frequency-domain may be generated by performing a transformation by selecting a transformation basis for a current frequency-domain related to a predetermined frequency band, a predetermined-sized coefficient block, or a predetermined coefficient location from among square transform, and applying the selected transformation basis to the image data.

In the performing of the selective frequency-domain transform, a vertical frequency band and a horizontal frequency band of the transformation basis may be individually selected.

During the performing of the selective frequency-domain transform, coefficients except for the coefficients of the predetermined frequency domain may be generated by performing a transformation by selecting a transformation basis selected excluding a predetermined frequency band from among the square transformation bases and applying the selected transformation basis to the image data.

Generating of selective frequency-domain coefficients may include selecting a horizontal frequency band transformation basis and a vertical frequency band transformation basis corresponding to each predetermined frequency band so that coefficients obtained by performing a transformation on the image data may be classified according to arbitrary frequency bands.

In the performing of the selective frequency-domain transform, a vertical frequency band and a horizontal frequency band of the transformation basis may be individually selected.

During the generating of the selective frequency-domain coefficients, the vertical frequency band and the horizontal frequency band of the transformation basis may be individually selected with respect to at least one of a transformation basis size, a type of a transform, and transformation basis matrix factors.

The performing of the sub data unit transformation may include combining coefficient blocks corresponding to the sub data units.

The outputting of the coefficients may include performing a transformation on the coefficient blocks corresponding to the sub data units, and outputting a result of the performing.

During the performing of the scale-down transformation, if a first size is less than a second size and the horizontal and vertical sizes of the image data are equal to the second size, then a rectangular transformation basis, the horizontal and vertical sizes of which are respectively equal to the first size and the second size may be used, wherein the rectangular transformation basis is a combination of a transformation basis matrix, the horizontal and vertical sizes of which are equal to the first size and a scale-down spatial matrix, the horizontal and vertical sizes of which are respectively equal to the first size and the second size.

During the performing of the scale-down transformation, if a transformation basis matrix, the horizontal and vertical sizes of which are equal to the first size, then coefficients of the sub data units are obtained by performing a transformation by individually selecting transformation bases for the sub data units, and the transformation is performed on coefficient blocks corresponding to the sub data units.

During the performing of the scale-down transformation, if a first size is less than a second size and the horizontal and vertical sizes of the image data are equal to the second size, then a rectangular transformation basis, the horizontal and vertical sizes of which are respectively equal to the first size and the second size may be used, wherein the rectangular transformation basis is a combination of a matrix that is used to select a predetermined frequency-domain and the horizontal and vertical sizes of which are respectively equal to the first size and the second size, and a transformation basis matrix, the horizontal and vertical sizes of which are equal to the second size.

During the performing of the scale-down transformation, if a first size is less than a second size and the horizontal and vertical sizes of the image data are equal to the second size, then the transformation may be performed using a transformation basis matrix, the horizontal and vertical sizes of the image data are equal to the second size, a result of the performing may be quantized, and the scale-down transformation may be selectively performed on the image data when high-frequency components are '0'.

The video encoding method may further include encoding information regarding a type of a selected transformation and details of the selected transformation so as to perform the low-complexity transformation.

The video encoding method may further include changing a coefficient scanning order in such a manner that coefficients of down-scaled coefficient blocks generated through the low-complexity transformation are scanned and encoded.

The changing of the coefficient scanning order may include changing the coefficient scanning order in such a manner that coefficients of the generated predetermined-sized coefficient blocks are scanned.

The changing of the coefficient scanning order may be changed in such manner that the generated coefficient blocks may be individually scanned or coefficients of the generated coefficient blocks may be continuously scanned.

The video encoding method may further include encoding information regarding coefficient block size information for performing coefficient scanning.

The changing of the coefficient scanning order may be changed in the units of the generated coefficient blocks and according to frequency characteristics, or may be changed in such a manner that only generated coefficients from among a total of coefficients of the image data or coefficient blocks generated excluding coefficient blocks corresponding to a predetermined frequency band from among the total of coefficients of the image data may be scanned.

The video encoding method may further include setting and encoding code coefficient block pattern (CCBP) information indicating whether a coefficient block including the generated coefficients includes a coefficient other than '0'.

The coefficient scanning order may be changed in such a manner that only a coefficient block including a coefficient other than '0' may be scanned based on the CCBP information.

The video encoding method may further include dividing the input picture into predetermined maximum coding units; and determining an encoding mode regarding a coding unit corresponding to at least one coded depth to output an encoding result by encoding the maximum coding units in the units of regions, which are hierarchically split from the maximum coding units as a depth deepens, by performing a transformation based on at least one transformation unit for at least one deeper coding units according to depths, wherein the encoding mode includes information regarding the at least one coded depth and a transformation unit size.

The receiving of the image data may include receiving a residual component of the at least one transformation unit.

According to an aspect of another exemplary embodiment, there is provided a video encoding method using a selective frequency-domain transformation which is a type of a low-complexity transformation, the method including: receiving image data of an input picture in predetermined data units, generating selective frequency-domain coefficients by performing a transformation by applying a transformation basis for a predetermined frequency-domain to the image data, and outputting the generated coefficients.

According to an aspect of another exemplary embodiment, there is provided a video encoding method using the sub data unit transformation which is a type of a low-complexity transformation, the method including: receiving image data of an input picture in predetermined data units, dividing the image data into a plurality of sub data units, generating coefficients for the sub data units by performing a transformation by individually selecting and using transformation bases for the sub data units, and outputting the generated coefficients.

According to an aspect of another exemplary embodiment, there is provided a video encoding method using the scale-down transformation which is a type of a low-complexity transformation, the method including: receiving image data of an input picture in predetermined data units, generating coefficients of the image data by performing a transformation by applying a rectangular transformation basis that is a combination of a rectangular matrix and a square matrix, and outputting the generated coefficients.

According to an aspect of another exemplary embodiment, there is provided a method of decoding video by using a low-complexity inverse transformation, the method including: receiving coefficients of predetermined data units of a picture; generating image data in the predetermined data units by performing the low-complexity inverse transformation on the received coefficients, wherein the low-complexity inverse transformation includes at least one of a selective frequency-domain inverse transformation that uses a transformation basis for a predetermined frequency domain, an inverse sub data unit transformation that performs an inverse transformation by respectively selecting and applying transformation bases for a plurality of sub data units divided from an image data, and a scale-down inverse transformation that uses a scale-down rectangular transformation basis that is a combination of a rectangular matrix and a square matrix; and reconstructing the generated picture from the image data.

According to an aspect of another exemplary embodiment, there is provided a video decoding method using a selective frequency-domain inverse transformation which is a type of a low-complexity inverse transformation, the method including: receiving coefficients of predetermined data units of a picture, generating image data in the predetermined data units by performing an inverse transformation by applying a transformation basis for a predetermined frequency-domain to the coefficients, and reconstructing the picture from the image data.

According to an aspect of another exemplary embodiment, there is provided a video decoding method using the sub data unit inverse transformation which is a type of the low-complexity inverse transformation, the method including: receiving coefficients of predetermined data units of a picture, generating coefficients of the predetermined data units from the received coefficients, generating image data in the predetermined data units by performing an inverse transformation by individually selecting and applying transformation bases to the generated coefficients, and reconstructing the picture from the image data.

According to an aspect of another exemplary embodiment, there is provided a video decoding method using the scale-down inverse transformation which is a type of the low-complexity inverse transformation, the method including: receiving coefficients of predetermined data units of a picture, generating image data in the predetermined data units by performing an inverse transformation on the received coefficients by using a rectangular transformation basis that is a combination of a rectangular matrix and a square matrix, and reconstructing the picture from the image data.

According to an aspect of another exemplary embodiment, there is provided an apparatus for encoding video by using a low-complexity transformation, the apparatus including: an image data receiver for receiving image data of an input picture in the units of predetermined data units; a low-complexity transformation unit for generating coefficients of the predetermined data units by performing the low-complexity transformation, wherein the low-complexity transformation includes at least one of a selective frequency-domain transformation that applies a transformation basis for a predetermined frequency domain to image data, a sub data unit transformation that performs a transformation by respectively selecting and applying transformation bases for a plurality of sub data units divided from the image data, and a scale-down transformation that uses a scale-down rectangular transformation basis obtained by combining a rectangular matrix and a square matrix and scaling down a result of the combining; and a transformation coefficient output unit for outputting transformation coefficients generated with respect to the predetermined data units of the input picture.

According to an aspect of another exemplary embodiment, there is provided a video encoding apparatus using the selective frequency-domain transformation which is a type of the low-complexity transformation, the apparatus including: an image data receiver for receiving image data of an input picture in predetermined data units, a selective frequency-domain transformer for generating selective frequency-domain coefficients by performing a transformation by applying a transformation basis for a predetermined frequency-domain to the image data, and a selective frequency-domain coefficient output unit for outputting the generated coefficients.

According to an aspect of another exemplary embodiment, there is provided a video encoding apparatus using the sub data unit transformation which is a type of the low-complexity transformation, the apparatus including: an image data receiver for receiving image data of an input picture in predetermined data units, a sub data unit dividing unit for dividing the image data into a plurality of sub data units, a sub data unit transformer for generating coefficients for the sub data units by performing a transformation by individually selecting and using transformation bases for the sub data units, and a sub data unit coefficient output unit for outputting the generated coefficients.

According to an aspect of another exemplary embodiment, there is provided a video encoding apparatus using the scale-down transformation which is a type of the low-complexity transformation, the apparatus including: an image data receiver for receiving image data of an input picture in predetermined data units, a scale-down transformer for generating coefficients of the image data by performing a transformation by applying a rectangular transformation basis that is a combination of a rectangular matrix and a square matrix, and a scale-down transformation coefficient output unit for outputting the generated coefficients.

According to an aspect of another exemplary embodiment, there is provided an apparatus for decoding video by using a low-complexity inverse transformation, the apparatus including: a coefficient receiver which receives coefficients of predetermined data units of a picture; a low-complexity inverse transformation unit which generates image data in the predetermined data units by performing the low-complexity inverse transformation on the received coefficients, wherein the low-complexity inverse transformation includes at least one of a selective frequency-domain inverse transformation that uses a transformation basis for a predetermined frequency-domain, an inverse sub data unit transformation that performs an inverse transformation by respectively selecting and applying transformation bases for a plurality of sub data units divided from the picture, and a scale-down inverse transformation that uses a scale-down rectangular transformation basis that is a combination of a rectangular matrix and a square matrix; and a picture reproducing unit which reproduces the generated picture from the image data.

According to an aspect of another exemplary embodiment, there is provided a video decoding apparatus using the selective frequency-domain inverse transformation which is a type of the low-complexity inverse transformation, the apparatus including: a coefficient receiver for receiving coefficients of predetermined data units of a picture, a selective frequency-domain inverse transformer for generating image data in the predetermined data units by performing an inverse transformation by applying a transformation basis for a predetermined frequency-domain to the coefficients, and a picture reconstructing unit for reconstructing the picture from the image data.

According to an aspect of another exemplary embodiment, there is provided a video decoding apparatus using the sub data unit inverse transformation which is a type of the low-complexity inverse transformation, the apparatus including: a coefficient receiver for receiving coefficients of predetermined data units of a picture, a sub data unit coefficient generator for generating coefficients of the predetermined data units from the received coefficients, a sub data unit inverse transformer for generating image data in the predetermined data units by performing an inverse transformation by individually selecting and applying transformation bases to the generated coefficients, and a picture reconstructing unit for reconstructing the picture from the image data.

According to an aspect of another exemplary embodiment, there is provided a video decoding apparatus using the scale-down inverse transformation which is a type of the low-complexity inverse transformation, the apparatus including: a coefficient receiver for receiving coefficients of predetermined data units of a picture, a scale-down frequency inverse transformer for generating image data in the predetermined data units by performing an inverse transformation on the received coefficients by using a rectangular transformation basis that is a combination of a rectangular matrix and a square matrix, and a picture reconstructing unit for reconstructing the picture from the image data.

According to an aspect of another exemplary embodiment, there is provided a computer readable recording medium having recorded thereon a computer program for executing a video encoding method using the low-complexity transformation.

According to an aspect of another exemplary embodiment, there is provided a computer readable recording medium having recorded thereon a computer program for executing a video encoding method using the selective frequency-domain transformation which is a type of the low-complexity transformation.

According to an aspect of another exemplary embodiment, there is provided a computer readable recording medium having recorded thereon a computer program for executing a video encoding method using the sub data unit transformation which is a type of the low-complexity transformation.

According to an aspect of another exemplary embodiment, there is provided a computer readable recording medium having recorded thereon a computer program for executing a video encoding method using the scale-down transformation which is a type of the low-complexity transformation.

According to an aspect of another exemplary embodiment, there is provided a computer readable recording medium having recorded thereon a computer program for executing a video decoding method using the low-complexity transformation.

According to an aspect of another exemplary embodiment, there is provided a computer readable recording medium having recorded thereon a computer program for executing a video decoding method using the selective frequency-domain inverse transformation which is a type of the low-complexity frequency inverse transformation.

According to an aspect of another exemplary embodiment, there is provided a computer readable recording medium having recorded thereon a computer program for executing a video decoding method using the sub data unit inverse transformation which is a type of the low-complexity transformation.

According to an aspect of another exemplary embodiment, there is provided a computer readable recording medium having recorded thereon a computer program for executing a video decoding method using the scale-down inverse transformation which is a type of the low-complexity transformation.

In a video encoding method using a low-complexity transformation based on hierarchical data units of each image region, according to an exemplary embodiment, a transformation is performed on data in coding units and transformation units, the sizes of which are hierarchically determined based on an image size and image regions by using a predetermined frequency band, sub data units, or a scale-down transformation basis. Accordingly, a relatively small bit rate is needed to transmit a bitstream. Also, in a video decoding method and apparatus using a low-complexity inverse transformation based on hierarchical data units of each image region, according to an exemplary embodiment, an inverse transformation is performed on only received coefficients by using a predetermined frequency band, sub data units, or a scale-down transformation basis. Accordingly, an amount of calculation is relatively small during a decoding process.

DESCRIPTION OF DRAWINGS

FIG. 16 illustrates a transformation basis for classifying transformation coefficients of a 4×4 data unit in the units of coefficients and the transformation coefficients, according to another exemplary embodiment;

FIG. 17 illustrates a transformation basis for classifying transformation coefficients of an 8×8 data unit in the units of coefficients and the transformation coefficients, according to another exemplary embodiment;

FIG. 22 illustrates a transformation basis to be individually selected according to a frequency band of each transformation coefficient, and transformation coefficient blocks thereof, according to another exemplary embodiment;

FIG. 23 illustrates a general order of scanning 8×8 transformation coefficients;

FIG. 24 illustrates an order of scanning 8×8 transformation coefficients according to a frequency band, according to an exemplary embodiment;

FIG. 26 illustrates an order of scanning 8×8 transformation coefficients except for coefficients corresponding to a middle frequency band, according to another exemplary embodiment;

FIG. 28 illustrates an order of scanning 8×8 transformation coefficients, according to another exemplary embodiment;

FIG. 29 illustrates a method of expressing information regarding an order of scanning 8×8 transformation coefficients by using a vertical or horizontal size of a coefficient block, according to another exemplary embodiment;

FIG. 30 illustrates an order of scanning 8×8 transformation coefficients, according to another exemplary embodiment;

FIG. 31 illustrates a method of expressing information regarding an order of scanning 8×8 transformation coefficients by expressing vertical and horizontal indexes of a coefficient block as multiples of '2', according to another exemplary embodiment;

FIG. 32 illustrates a method of changing an order of scanning 8×8 transformation coefficients based on frequency characteristics of each frequency domain, according to another exemplary embodiment;

FIG. 41 is a flowchart illustrating a video encoding method using the sub data unit transformation to perform the low-complexity transformation, according to another exemplary embodiment;

FIG. 42 is a flowchart illustrating a video decoding method using the sub data unit inverse transformation to perform the low-complexity inverse transformation, according to another exemplary embodiment;

FIG. 57 is a diagram for describing a relationship between a coding unit and a transformation unit according to an exemplary embodiment;

FIG. 58 is a diagram for describing encoding information according to depths, according to an exemplary embodiment;

FIG. 63 is a table illustrating encoding information for each coding unit, according to an exemplary embodiment;

DETAILED DESCRIPTION OF EXEMPLARY EMBODIMENTS

Figure 1:
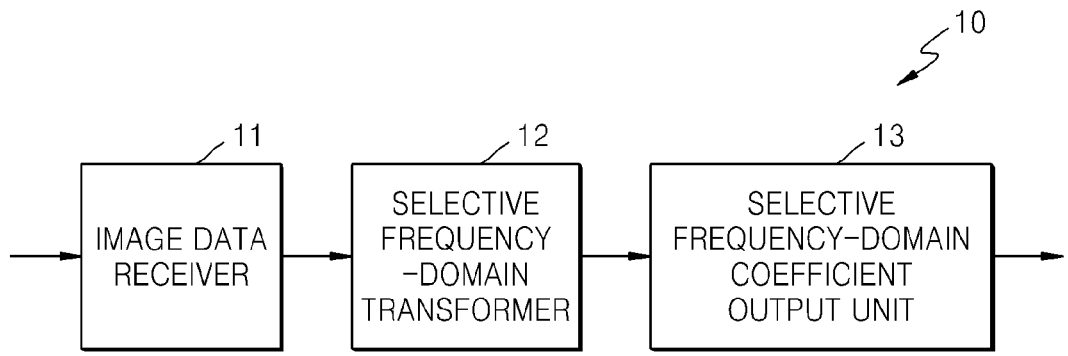
FIG. 1 is a block diagram of a video encoding apparatus using a selective frequency-domain transformation to perform a low-complexity transformation, according to an exemplary embodiment.

A video encoding method using a low-complexity transformation according to an exemplary embodiment includes receiving image data of an input picture in predetermined data units, generating coefficients of the predetermined data units by performing the low-complexity transformation on the image data, and outputting the generated coefficients. Here, the low-complexity transformation includes at least one of a selective frequency-domain transformation that performs a transformation using a transformation basis for a predetermined frequency-domain, a sub data unit transformation that performs a transformation by respectively selecting and using transformation bases for a plurality of sub data units divided from the image data, and a scale-down transformation that performs a transformation using a rectangular transformation basis that is obtained by combining a rectangular matrix and a square matrix and scaling down a result of the performing.

A video decoding method using a low-complexity inverse transformation according to an exemplary embodiment includes receiving coefficients of predetermined data units of a picture, generating image data in the predetermined data units by performing the low-complexity inverse transformation on the coefficients, and reconstructing the picture by using the image data. Here, the low-complexity inverse transformation includes at least one of a selective frequency-domain inverse transformation that performs an inverse transformation on the coefficients by using a transformation basis for a predetermined frequency-domain, a sub data unit inverse transformation that performs an inverse transformation by respectively selecting and using transformation bases for a plurality of sub data units divided from the image data, and a scale-down inverse transformation that performs an inverse transformation using a rectangular transformation basis that is obtained by combining a rectangular matrix and a square matrix and scaling down a result of the performing.

Hereinafter, video encoding methods and apparatuses and video decoding methods and apparatuses that use a low-complexity transformation according to various exemplary embodiments will be described with reference to FIGS. 1 to 67. In the present specification, a selective frequency-domain transform, a sub data unit transformation, and a scale-down transformation will be disclosed as examples of the low-complexity transformation according to exemplary embodiments.

First, video encoding and decoding methods and apparatuses according to various exemplary embodiments that respectively use the selective frequency-domain transform, the sub data unit transformation, and the scale-down transformation as examples of the low-complexity transformation, will be described. Then, video encoding and decoding methods and apparatuses that use the low-complexity transformation according to an exemplary embodiment will be described. In the present specification, video encoding and decoding performed based on hierarchical data units of each image region to determine image data on which the low-complexity transformation is to be performed, will also be described in detail. More specifically, a video encoding method and apparatus and a video decoding method and apparatus that use the selective frequency-domain transformation which is a type of the low-complexity transformation according to exemplary embodiments, will be described with reference to FIGS. 1 to 35. A video encoding method and apparatus and a video decoding method and apparatus that use the sub data unit transformation which is another type of the low-complexity transformation according to exemplary embodiments, will be described with reference to FIGS. 36 to 42. A video encoding method and apparatus and a video decoding method and apparatus that use the scale-down transformation which is another type of the low-complexity transformation according to exemplary embodiments, will be described with reference to FIGS. 43 to 46. A video encoding method and apparatus and a video decoding method and apparatus that selectively use the selective frequency-domain transform, the sub data unit transformation, and the scale-down transformation according to exemplary embodiments, will be described with reference to FIGS. 47 to 50. A video encoding method and apparatus and a video decoding method and apparatus that are based on hierarchical data units of each image region according to various exemplary embodiments will be described with reference to FIGS. 51 to 63. Thereafter, a video encoding method and apparatus and a video decoding method and apparatus that use the low-complexity transformation based on hierarchical data units of each image region according to various exemplary embodiments, will be described with reference to FIGS. 66 to 69. Furthermore, hereinafter, expressions such as "at least one of," when preceding a list of elements, modify the entire list of elements and do not modify the individual elements of the list.

A video encoding method and apparatus and a video decoding method and apparatus that use the selective frequency-domain transformation which is a type of the low-complexity transformation according to exemplary embodiments, will be described with reference to FIGS. 1 to 35.

FIG. 1 is a block diagram of a video encoding apparatus 10 using the selective frequency-domain transformation to perform the low-complexity transformation, according to an exemplary embodiment. The video encoding apparatus 10 includes an image data receiver 11, a selective frequency-domain transformer 12, and a selective frequency-domain coefficient output unit 13.

The image data receiver 11 may receive image data of an input picture in predetermined data units. The predetermined data units may be obtained by dividing the image data of the input picture into predetermined-sized blocks so as to perform a transformation thereon. The image data in the predetermined data units may be square or rectangular data blocks.

The selective frequency-domain transformer 12 may generate selective frequency-domain coefficients by performing a transformation on the image data by using a transformation basis for a predetermined frequency-domain.

The selective frequency-domain transformer 12 may perform a transformation by applying a transformation basis corresponding to a predetermined frequency band from among square transformation bases so as to generate the selective frequency-domain coefficients. In this case, a vertical frequency band and a horizontal frequency band of the transformation basis may be individually selected. Transformation coefficients other than the predetermined frequency-domain coefficients may be generated by performing the transformation by applying a transformation basis for a frequency band other than the predetermined frequency band from among the square transformation bases.

In order to split transformation coefficients for the image data according to arbitrary frequency bands, the selective frequency-domain transformer 12 may select a vertical transformation basis corresponding to a predetermined vertical frequency band and a horizontal transformation basis corresponding to a predetermined horizontal frequency band from among the arbitrary frequency bands.

The selective frequency-domain transformer 12 may generate a predetermined-sized coefficient block by performing the transformation on the image data by applying a transformation basis corresponding to the predetermined-sized coefficient block from among the square transformation bases.

In order to classify transformation coefficients for the image data according to arbitrary-sized coefficient blocks, the selective frequency-domain transformer 12 may select a horizontal transformation basis and a vertical transformation basis that respectively correspond to a horizontal size and vertical size of a predetermined coefficient block from among coefficient blocks. The selective frequency-domain transformer 12 may perform the transformation in units of arbitrary-sized coefficient blocks by applying a vertical transformation basis and a horizontal transformation basis selected for each of the arbitrary-sized coefficient blocks to the image data.

The selective frequency-domain transformer 12 may perform the transformation on the image data in the units of coefficients by using transformation bases corresponding to the coefficients from among the square frequency bases. That is, the selective frequency-domain transformer 12 may perform the transformation in units of coefficients by applying a horizontal transformation basis and a vertical transformation basis corresponding to each of the coefficients from among transformation bases to the image data so that the coefficients of the image data may be differentiated from each other.

The selective frequency-domain transformer 12 may individually select a vertical transformation basis and a horizontal transformation basis from among transformation bases for performing the selective frequency-domain transformation. For example, the sizes, transformation methods, and matrix factors of the vertical and horizontal transformation bases may be individually selected based on different transformation bases.

The selective frequency-domain transformer 12 may selectively determine a frequency-domain having a coefficient other than '0', based on a result of analyzing frequency characteristics obtained through the transformation by applying same-sized transformation bases to the image data. Thus, the selective frequency-domain transformer 12 may determine a transformation basis and transformation coefficients, which are to be encoded, corresponding to a frequency-domain based on the result of performing the transformation.

The selective frequency-domain coefficient output unit 13 outputs coefficients of the predetermined data units of the input picture.

The video encoding apparatus 10 may encode and transmit information regarding a transformation method selected to perform the selective frequency-domain transformation on the image data.

The video encoding apparatus 10 may change a coefficient scanning order in such a manner that coefficients of a coefficient block that are generated in the units of frequency bands may be scanned and encoded. For example, the coefficient scanning order may be changed in such a manner that predetermined-sized coefficient blocks may be scanned from among all coefficients of the image data, coefficient blocks in frequency bands may be individually scanned, all of the coefficient blocks in frequency bands may be continuously scanned, or coefficient blocks other than coefficient blocks in a predetermined frequency band may be scanned.

The video encoding apparatus 10 may change the coefficient scanning order in such a manner that only coefficients generated may be continuously scanned.

Also, the video encoding apparatus 10 may change the coefficient scanning order according to frequency characteristics of frequency bands of the generated coefficients from all frequency-band coefficients.

The video encoding apparatus 10 may encode information regarding coefficient block size for performing coefficient scanning. For example, the coefficient block size information may include information regarding at least one of the vertical and horizontal sizes of each coefficient block. Coefficient block size indexes for coefficient scanning may be set to have specific intervals, e.g., multiples of '2'. Also, the coefficient block size indexes may become finer from a high-frequency band to a low-frequency band.

The video encoding apparatus 10 may set and encode coefficient block pattern information indicating whether a coefficient block including generated frequency-band coefficients includes a coefficient other than '0'. The coefficient scanning order may be changed in such a manner that a coefficient block including a coefficient other than '0' may be scanned, based on the coded coefficient block pattern (CCBP) information.

A coefficient scanning order for performing entropy-encoding may be changed according to the coefficient scanning order changed by the video encoding apparatus 10. The selective frequency-domain coefficient output unit 13 may output frequency-domain coefficients based on the changed coefficient scanning order.

The image data receiver 11 may receive the image data in transformation units determined according to an encoding method based on hierarchical data units of each image region. According to the encoding method based on the hierarchical data units of each image region, at least one coded depth to output an encoding result and an encoding mode regarding a coding unit of a coded depth. The coding units of coded depths may be determined by dividing an input picture into predetermined-sized coding units and then encoding each of maximum coding units in each image region. The maximum coding units of which hierarchically split as a depth deepens by transforming at least one coding unit corresponding to a depth based on at least one transformation unit. The size of a transformation unit that is a data unit in which a transformation will be performed, may be determined by performing encoding in the units of image regions. The encoding mode regarding a coding unit of a coded depth includes transformation unit size information. In this case, the image data receiver 11 may receive residual components in transformation units.

The low-complexity transformation performed on data in transformation units determined according to the encoding method based on the hierarchical data units of each image region, will be described later with reference to FIGS. 51 to 67.

Figure 2:
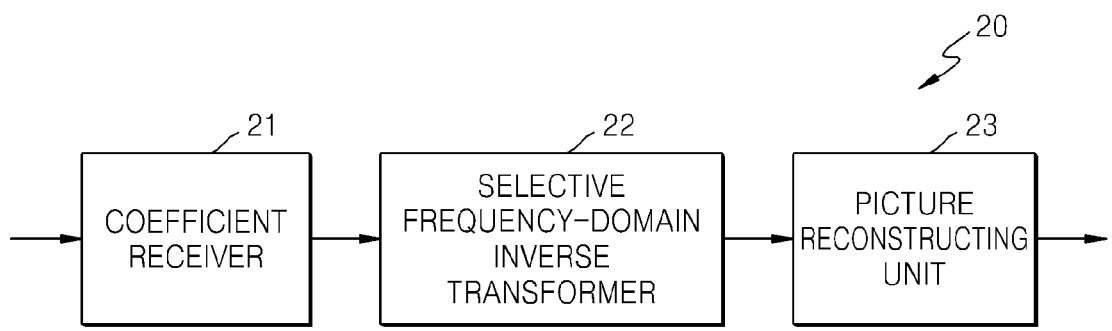
FIG. 2 is a block diagram of a video decoding apparatus using a selective frequency-domain inverse transformation to perform a low-complexity inverse transformation, according to an exemplary embodiment.

FIG. 2 is a block diagram of a video decoding apparatus 20 using the selective frequency-domain inverse transformation to perform the low-complexity inverse transformation, according to an exemplary embodiment. The video decoding apparatus 20 includes a coefficient receiver 21, a selective frequency-domain inverse transformer 22, and a picture reconstructing unit 23.

The coefficient receiver 21 may receive coefficients of predetermined data units of a picture. The coefficients of the predetermined data units may be a result of dividing received coefficients of image data of the picture through an inverse transformation. If the picture has been encoded according to a video encoding method based on hierarchical data units of each image region according to an exemplary embodiment, then the coefficient receiver 21 may receive coefficients of a current transformation unit corresponding to a current coding unit of a current maximum coding unit of the picture.

The selective frequency-domain inverse transformer 22 may generate image data in the predetermined data units by performing an inverse transformation, which uses a transformation basis for a predetermined frequency-domain, on the received coefficients.

The video decoding apparatus 20 may further receive information regarding a transformation method selected to perform the inverse transformation on a selective frequency-domain of the received coefficients. In this case, the selective frequency-domain inverse transformer 22 may perform the inverse transformation by determining a frequency-domain of the received coefficients and a transformation basis for the frequency-domain, based on the information regarding the transformation method.

The selective frequency-domain inverse transformer 22 may reconstruct the image data in the predetermined data units by performing the inverse transformation, which uses a transformation basis corresponding to a predetermined frequency band from among square transformation bases, on the received coefficients. In this case, a vertical frequency band and a horizontal frequency band of the transformation basis may be individually selected.

The selective frequency-domain inverse transformer 22 may perform an inverse transformation that uses a transformation basis selected to exclude the predetermined frequency band from among the square transformation bases. If the coefficients of the predetermined data units are classified according to arbitrary frequency bands, the selective frequency-domain inverse transformer 22 may use vertical and horizontal transformation bases corresponding to a predetermined frequency band so as to perform an inverse transformation on coefficients of the predetermined frequency band.

The selective frequency-domain inverse transformer 22 may use a transformation basis corresponding to a predetermined-sized coefficient block from among the square transformation bases so as to perform an inverse transformation on coefficients of the predetermined-sized coefficient block. If the coefficients of the predetermined data units are classified according to arbitrary-sized coefficient blocks, the selective frequency-domain inverse transformer 22 may perform an inverse transformation in the units of the arbitrary-sized coefficient blocks by using a vertical transformation basis and a horizontal transformation basis of each of these coefficient blocks.

The selective frequency-domain inverse transformer 22 may perform an inverse transformation in the units of coefficients by performing an inverse transformation using a transformation basis corresponding to a predetermined coefficient from among the square frequency bases. That is, the inverse transformation may be performed on the coefficients of the predetermined data units by individually selecting and using a horizontal transformation basis and a vertical transformation basis of each of the coefficients.

The selective frequency-domain inverse transformer 22 may select a transformation method and a matrix factor related to each vertical transformation basis and each horizontal transformation basis, based on among different transformation bases.

An order of scanning the received coefficients may vary according to a frequency-domain. The selective frequency-domain inverse transformer 22 may reconstruct the image data in the predetermined data units by performing an inverse transformation on the coefficients arranged according to the changed order of scanning by applying transformation bases selected according to frequency-domains.

The video decoding apparatus 20 may analyze the changed order of scanning by receiving and reading scanning order information.

The video decoding apparatus 20 may change the order of scanning in such a manner that received coefficient blocks according frequency bands may be individually or coefficients of the coefficient blocks may be continuously scanned according to frequency bands.

Also, the video decoding apparatus 20 may receive coefficient block size information for performing coefficient scanning. Also, the video decoding apparatus 200 may change the order of scanning based on information regarding at least one of the vertical and horizontal sizes of each coefficient block, which is included in the coefficient block size information. For example, the coefficient block size information may be set with indexes having specific intervals, e.g., multiples of '2', or may be set to become finer from a high-frequency band to a low-frequency band.

Also, the video decoding apparatus 20 may change the order of scanning according to frequency characteristics of each frequency band. For example, in the case of a coefficient block of a frequency band in which the number of vertical frequencies is greater than that of horizontal frequencies, the order of scanning may be set in such a manner that coefficients arranged in the vertical direction may first be scanned.

The video decoding apparatus 20 may change the order of scanning in such a manner that only received coefficients from among all of the coefficients of the predetermined data units of the picture may be scanned and decoded. Also, the video decoding apparatus 20 may change the order of scanning in such a manner that coefficient blocks of frequency bands other than a predetermined frequency band from among all of the coefficients of the predetermined data units may be scanned.

The video decoding apparatus 20 may receive coded coefficient block pattern (CCBP) information indicating whether a coefficient block including coefficients generated according to frequency bands includes a coefficient other than '0'. In this case, the video decoding apparatus 20 may change the coefficient scanning order in such a manner that only a coefficient block including a coefficient other than '0' may be scanned, based on the CCBP information.

If the video decoding apparatus 20 employs a video decoding method performed based on hierarchical data units of each image region according to an exemplary embodiment, then the coefficient receiver 21 may receive a coefficient of a transformation unit corresponding to a predetermined maximum coding unit of the picture.

The picture reconstructing unit 23 reconstructs and outputs the picture based on the generated image data.

The video encoding apparatus 20 may use a transformation selected according to a frequency band so as to control a transmission bit rate according to a data communication environment, hardware performance, or a developer or user's need. For example, the video encoding apparatus 10 may analyze a result of performing a transformation on N×N image data by using an N×N transformation basis, and transmit only data related to coefficients other than '0' when the coefficients other than '0' are preset in a predetermined frequency band. In other words, a frequency band that is to be encoded is selected and a transformation is performed on the selected frequency band to reduce an amount of calculation and the total number of coefficients generated, thereby reducing a transmission bit rate.

Also, the video encoding apparatus 10 may transmit information regarding a selective frequency-domain to a decoding side so that the decoding side may reconstruct the original N×N data by performing an inverse transformation by using only received coefficients. Also, the order of scanning may be changed in consideration of a frequency band so that only coefficients other than '0' and coefficient blocks each including such coefficients may be scanned and read.

The video decoding apparatus 20 may determine location of received coefficients and a frequency-domain based on received information regarding the order of scanning and information regarding a selective frequency-domain, and may perform an inverse transformation by using a transformation basis corresponding to the selective frequency-domain used to perform a transformation so as to reconstruct the original data. The transformation basis corresponding to the selective frequency-domain is scaled down more than the existing square transformation bases. Thus, if a transformation and an inverse transformation are performed using such a scale-down transformation basis, an amount of calculation may decrease.

Accordingly, according to the selective frequency-domain transformation according to the current exemplary embodiment, only coefficients other than '0' from among frequency-transformed coefficients of image data are scanned, encoded, and transmitted. Also, according to the selective frequency-domain inverse transformation according to the current exemplary embodiment, the image may be reconstructed by inversely transforming only coefficients other than '0', thereby reducing an amount and complexity of calculation.

Figure 3:
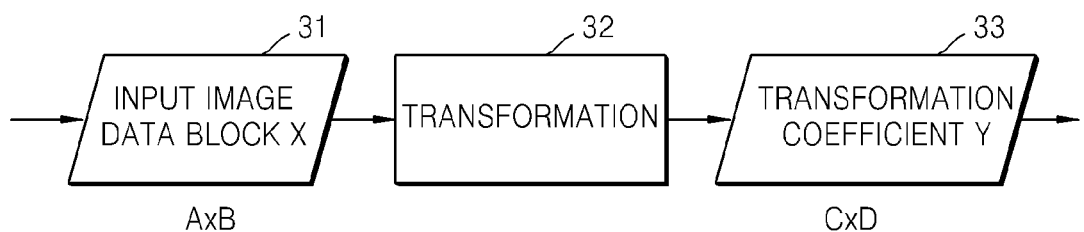
FIG. 3 is a block diagram illustrating a process of performing the low-complexity transformation, according to an exemplary embodiment.

FIG. 3 is a block diagram illustrating a process of performing the low-complexity transform, according to an exemplary embodiment. In operation 31, an input image data block X is received. In operation 32, a transformation is performed on the input image data block X by using a vertical transformation basis Ta and a horizontal transformation basis Tb. Then, in operation 33, a transformation coefficient Y of the input image data block X is output.

In this case, the transformation coefficient Y, the size of which is C×D is obtained by applying the vertical transformation basis Ta and the horizontal transformation basis Tb, the sizes of which are respectively C×A and B×D to the input image data block X, the size of which is A×B. Thus, the size of the output transformation basis Y, i.e., C×D, is less than the size of the input image data block X, i.e., A×B. If the transformation is performed, then the size of a transformation coefficient of a frequency-domain is smaller than that of image data of a spatial domain. Thus, an encoding side may save a transmission bit rate through the transformation.

Figures 4, 5:
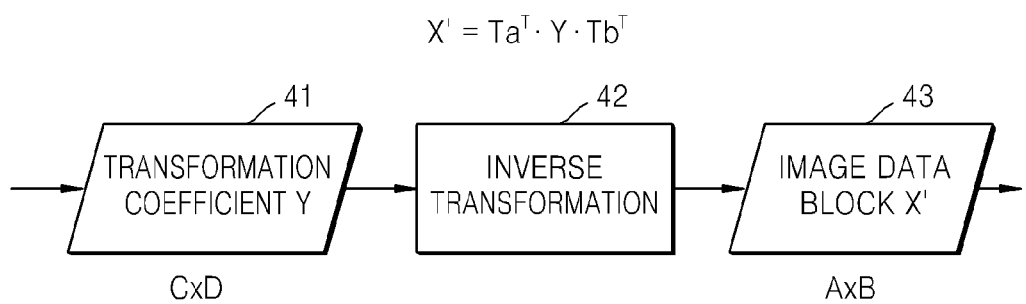
FIG. 4 is a block diagram illustrating a process of performing the low-complexity inverse transformation, according to an exemplary embodiment.
FIG. 5 illustrates a method of scaling down a transformation basis according to an exemplary embodiment.

FIG. 4 is a block diagram illustrating a process of performing the low-complexity inverse transformation, according to an exemplary embodiment. In operation 41, a transformation coefficient Y is received. In operation 42, an inverse transformation is performed by applying a transformation basis $Ta^T$ matrix-transposed from a vertical transformation basis Ta and a transformation basis $Tb^T$ matrix-transposed from a horizontal transformation basis Tb to the transformation basis Y. Then, in operation 43, an image data block X' corresponding to the transformation coefficient Y is reconstructed.

Thus, even if an insufficient number of coefficients are received compared to the amount of the image data, the image data may be reconstructed using the insufficient number of coefficients when transformation bases used to perform a transformation are provided. Referring to FIGS. 3 to 5, an amount of calculation may be reduced when a transformation is performed using scale-down transformation bases, thereby saving a bit rate according to the result of performing the transformation.

FIG. 5 illustrates a method of scaling down a transformation basis according to an exemplary embodiment. A product M·T of a matrix M and a transformation basis T corresponds to a matrix consisting of only upper factors of the transformation basis T. That is, if the matrix M is used, only low-frequency parts of the transformation basis T may be extracted by halving a vertical frequency band of the transformation basis T.

Thus, if only a part of image data corresponding to a low-frequency band of the vertical frequency band is needed, a coefficient block of the low-frequency band may be obtained by additionally multiplying a coefficient block, which is obtained through a transformation by applying the transformation basis T to an input image data block X, by the matrix M, i.e., by performing multiplication of the matrix M twice. However, if the product M·T has already been stored, the coefficient block of the low-frequency band may be obtained by applying the product M·T of a selective frequency band to the input image data block X, i.e., by performing multiplication of the marix M once, thereby reducing an amount of calculation.

As described above, a video encoding method and apparatus and a video decoding method and apparatus according to an exemplary embodiment may be embodied through the low-complexity transformation, such as the selective frequency-band transform, the sub data unit transform, or the scale-down transformation, by using the product M·T that is scaled down from the transformation basis T.

Figure 6:
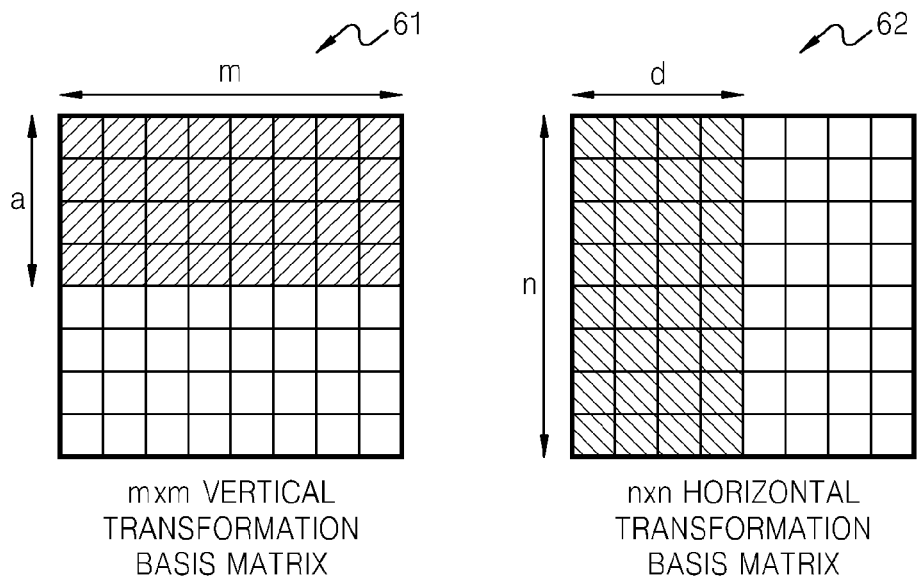
FIG. 6 illustrates a method of selecting a transformation basis to selectively generate transformation coefficients, according to an exemplary embodiment.

FIG. 6 illustrates a method of selecting a transformation basis to selectively generate transformation coefficients, according to an exemplary embodiment. An a×m vertical transformation basis matrix corresponding to an a/m vertical frequency band included in a vertical frequency band may be selected from an m×m vertical transformation basis matrix 61. Similarly, an n×d horizontal transformation basis matrix corresponding to a d/n horizontal frequency band included in a horizontal frequency band may be selected from an n×n horizontal transformation basis matrix 62.

Figure 7:
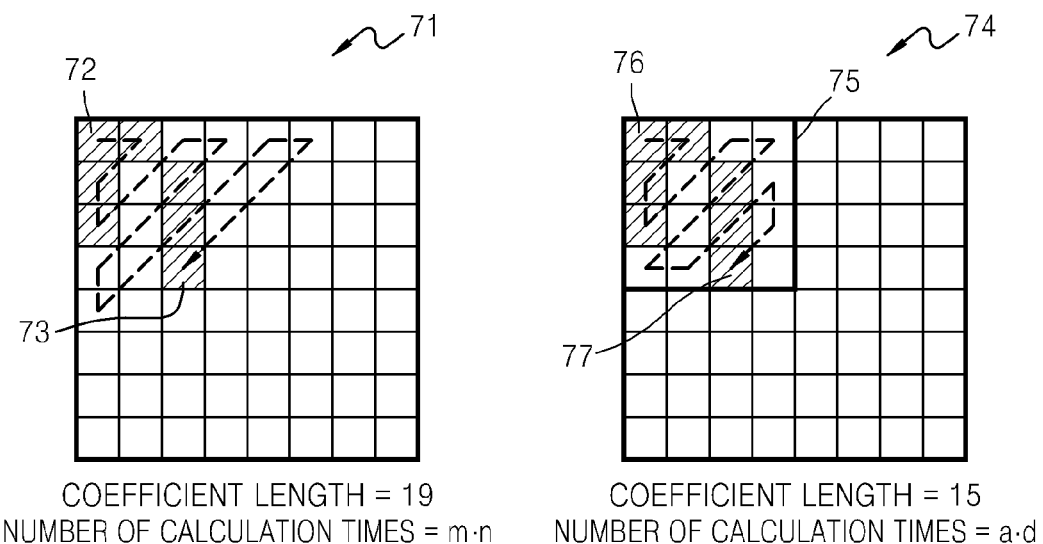
FIG. 7 is a diagram comparing transformation coefficients when a general transformation basis is used with those when a scale-down transformation basis according to an exemplary embodiments used.

FIG. 7 is a diagram comparing transformation coefficients when a general transformation basis is used with those when a scale-down transformation basis according to an exemplary embodiment is used.

If a transformation is performed by applying the m×m vertical transformation basis matrix 61 and the n×n horizontal transformation basis matrix 62 of FIG. 6 to m×n image data, then an m×n coefficient block 71 of FIG. 7 is obtained. In order to scan a coefficient other than '0' of the m×n coefficient block 71, a coefficient length from a DC component coefficient 72 to a highest-frequency coefficient 73 is '19' and a number of times that a calculation is performed through a frequency transformation is 'm·n'.

When a transformation basis selected based on a selective frequency-domain according to an exemplary embodiment is used, then a transformation may be performed by applying the a×m vertical transformation basis matrix and the n×d horizontal transformation basis matrix of FIG. 6 to n×m image data. Then, a d×a coefficient block 75 is obtained, in which all of coefficients other than '0' of a whole n×m coefficient block are present, i.e., all of actual significant information is present. Thus, the selective frequency-domain coefficient output unit 13 of the video encoding apparatus 10 of FIG. 1 may output only data regarding the d×a coefficient block 75 included in the whole n×m coefficient block 74.

Also, an actual number of times that an operation is performed to generate the d×a coefficient block 75 is a·d, and a coefficient length from a DC component coefficient 76 to a highest-frequency coefficient 77 is '15' to scan coefficients other than '0' of the d×a coefficient block 75.

Accordingly, generating of coefficient blocks corresponding to a selective frequency-domain by performing a frequency-domain by using only a transformation basis corresponding to the selective frequency-domain is more advantageous than generating all coefficient blocks corresponding to a whole frequency-domain, in terms of a number of times that an operation is performed, a scan length, and a bit rate.

Figure 8:
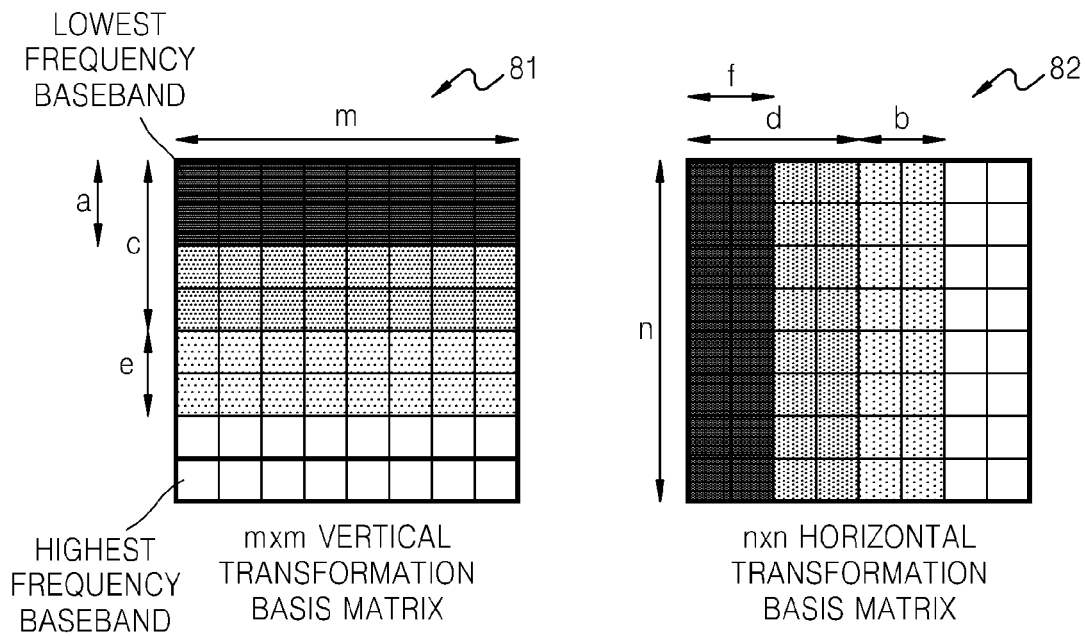
FIG. 8 illustrates a method of selecting a transformation basis to selectively generate transformation coefficients according to a frequency band, according to another exemplary embodiment.

FIG. 8 illustrates a method of selecting a transformation basis to selectively generate transformation coefficients according to a frequency band, according to another exemplary embodiment. Vertical transformation bases corresponding to selective frequency bands from a lowest frequency band to a highest frequency band, may be selected from an m×m vertical transformation basis matrix 81 according to a vertical frequency. Examples of the selective frequency bands may be an a/m frequency basis band or a c/m frequency basis band starting from a lowest frequency, or an e/m frequency basis band starting from a middle frequency.

Similarly, horizontal transformation bases corresponding to selective frequency bands from a lowest frequency band to a highest frequency band, may be selected from an n×n horizontal transformation basis matrix 82 according to a horizontal frequency. Examples of the selective frequency bands may be an f/n frequency basis band or a d/n frequency basis band starting from a lowest frequency, or a b/n frequency basis band starting from a middle frequency.

Figure 9:
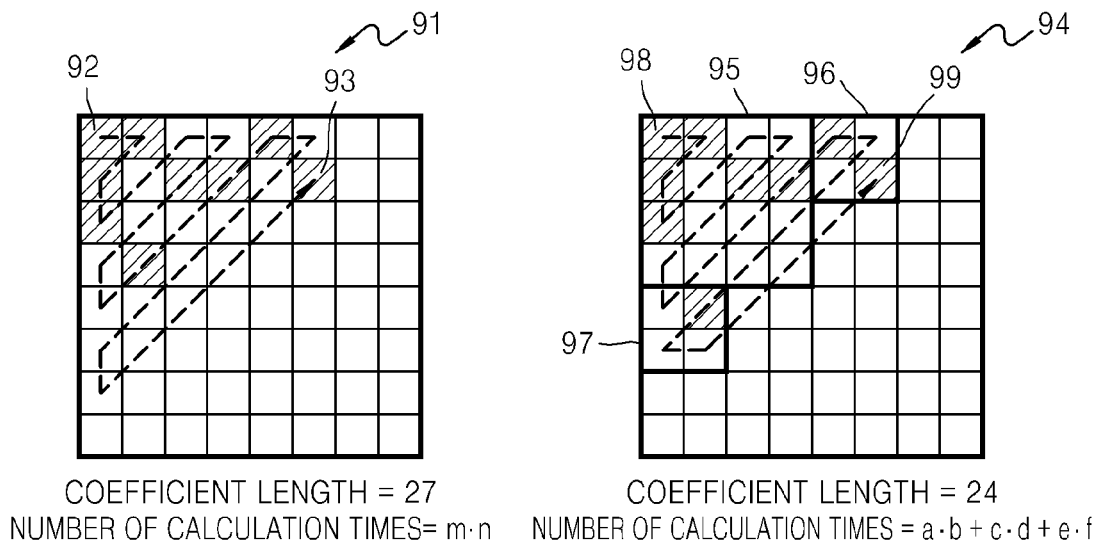
FIG. 9 is a diagram comparing transformation coefficients when a general transformation basis is used with those when a transformation basis selected based on a frequency band according to an exemplary embodiment is used.

FIG. 9 is a diagram comparing transformation coefficients when a general transformation basis is used with those when a transformation basis selected based on a frequency band according to an exemplary embodiment is used. If a transformation is performed by applying the m×m vertical transformation basis matrix 81 and the n×n horizontal transformation basis matrix 82 of FIG. 8 to n×m image data, then an n×m coefficient block 91 of FIG. 9 is obtained. In order to scan a coefficient other than '0' of the m×n coefficient block 91, a coefficient length from a DC component coefficient 92 to a highest-frequency coefficient 93 is '27' and a number of times that a calculation is performed through a frequency transformation is 'm·n'.

If a transformation basis selected based on a selective frequency-domain according to an exemplary embodiment is used, then the selected transformation basis may correspond to a frequency band having a coefficient other than '0'. For example, a vertical transformation basis and a horizontal transformation basis for generating coefficient blocks according to a frequency band may be selected in such a manner that a frequency-domain having a coefficient other than '0' of a whole coefficient block 94 may be obtained and divided into coefficient blocks 95, 96, and 97 according to a frequency band.

In other words, a c×m vertical transformation basis and an n×d horizontal transformation basis may be selected to obtain the coefficient block 95, the size of which is d×c, an a×m vertical transformation basis and an n×b horizontal transformation basis may be selected to obtain the coefficient block 95, the size of which is a×b, and an e×m vertical transformation basis and an n×f horizontal transformation basis may be selected to obtain the coefficient block 95, the size of which is e×f. That is, the selective frequency-domain transformation may be performed in such a manner that not only the low-frequency band coefficient block 95 but also the high-frequency band coefficient blocks 96 and 97 may be selected and encoded.

A number of times that an operation is performed to obtain the coefficient block 95 is 'c·d', a number of times that an operation is performed to obtain the coefficient block 96 is 'a·b', and a number of times that an operation is performed to obtain the coefficient block 97 is 'e·f'.

Thus, when scanning is performed on only the coefficient blocks 95 to 97 on which a transformation is actually performed to produce coefficients, a coefficient length from a minimum DC component coefficient 98 to a highest frequency component coefficient 99 is reduced to '24' and a number of times that an operation is performed to perform the transformation is reduced to 'a·b+c·d+e·f'.

Accordingly, generating of coefficient blocks corresponding to a selective frequency-domain by performing a frequency-domain by using only a transformation basis corresponding to the selective frequency-domain is more advantageous than generating all coefficient blocks corresponding to a whole frequency-domain, in terms of a number of times that an operation is performed, a scan length, and a bit rate.

Figure 10:
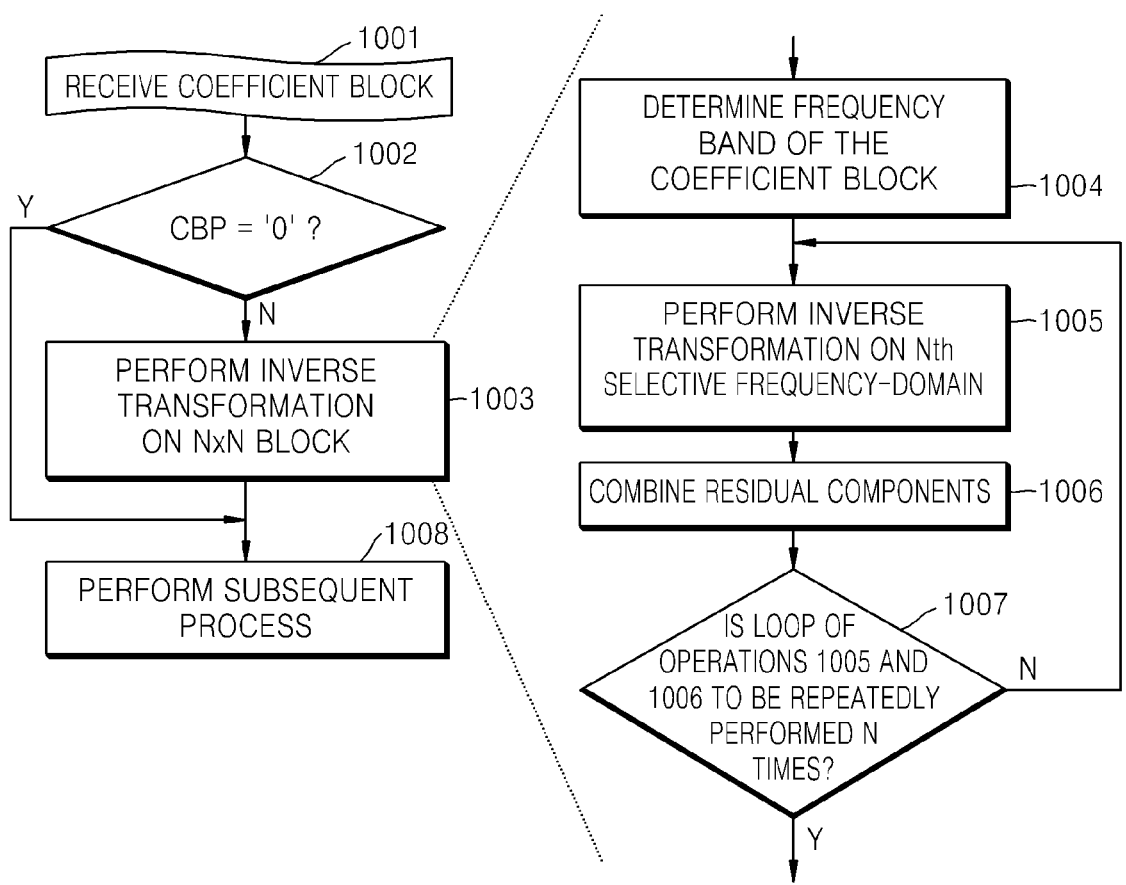
FIG. 10 is a flowchart illustrating an inverse transformation performed by a decoding side that receives selective frequency-domain coefficients, according to an exemplary embodiment.

FIG. 10 is a flowchart illustrating an inverse transformation performed by a decoding side that receives selective frequency-domain coefficients, according to an exemplary embodiment. In operation 1001, a coefficient block is input. In operation 1002, whether a coefficient other than '0' is present in the coefficient block is determined based on block pattern information regarding the coefficient block. In operation 1003, an inverse transformation is performed on an N×N block. In operation 1008, a subsequent process is performed. According to an exemplary embodiment, the inverse transformation performed in operation 1003 may be divided into sub operations. Specifically, in operation 1004, a frequency band of the coefficient block is determined. In operation 1005, the inverse transformation is performed an $n^{th}$ selective frequency-domain. In operation 1006, residual components are combined together. In operation 1007, it is determined whether a loop of operations 1005 and 1006 is to be repeatedly performed N times. If it is determined in operation 1007 that the inverse transformation should be performed again, the process of FIG. 10 proceeds to operation 1005. If it is determined in operation 1007 that the inverse transformation is not needed to be performed again, the process of FIG. 10 ends.

A selective frequency-domain transformation and a selective frequency-domain inverse transformation according to a arbitrary frequency band, which are respectively performed by the selective frequency-domain transformer 12 and the selective frequency-domain inverse transformer 22, will now be described in detail with reference to FIGS. 11 and 12.

Figure 11:
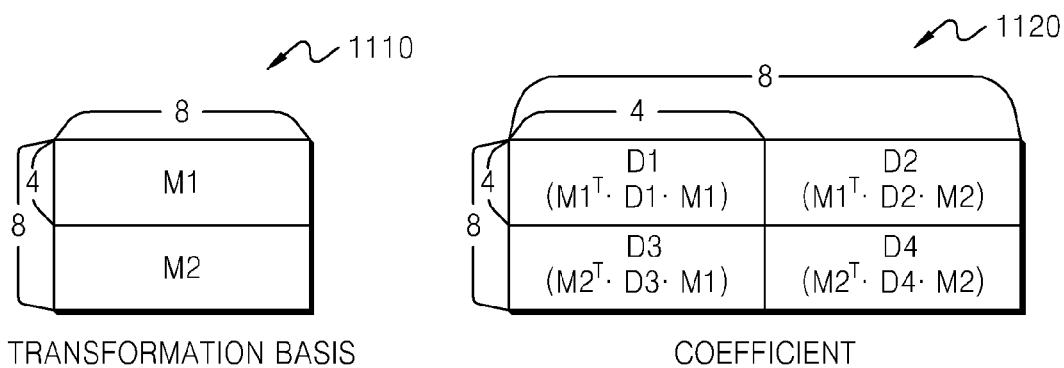
FIG. 11 illustrates a transformation basis for dividing an 8×8 data unit into transformation coefficients of four equal blocks according to a frequency band, and the four equal transformation coefficient blocks, according to an exemplary embodiment.

FIG. 11 illustrates a transformation basis for dividing an 8×8 data unit into transformation coefficients of four equal blocks according to a frequency band, and the four equal transformation coefficient blocks, according to an exemplary embodiment.

The selective frequency-domain transformer 12 may select matrices M1 and M2 obtained by dividing an 8×8 transformation basis M 1110 in the units of four pixels and in a direction of a vertical frequency, as selective vertical transformation bases, and may select matrices $M1^T$ and $M2^T$ that are respectively matrix-transposed from the matrices M1 and M2, as selective horizontal transformation bases. Examples of the 8×8 transformation basis M 1110 and the matrices M1 and M2 are as follows:

$$M = \begin{bmatrix} 4, & 4, & 4, & 4, & 4, & 4, & 4, & 4; \\ 6, & 6, & 2, & 3, & -3, & -2, & -6, & -6; \\ 4, & 2, & -2, & -4, & -4, & -2, & 2, & 4; \\ 6, & -3, & -6, & -2, & 2, & 6, & 3, & -6; \\ 4, & -4, & -4, & 4, & 4, & -4, & -4, & 4; \\ 2, & -6, & 3, & 6, & -6, & -3, & 6, & -2; \\ 2, & -4, & 4, & -2, & -2, & 4, & -4, & 2; \\ 3, & -2, & 6, & -6, & 6, & -6, & 2, & -3 \end{bmatrix};$$

$$M1 = \begin{bmatrix} 4, & 4, & 4, & 4, & 4, & 4, & 4, & 4; \\ 6, & 6, & 2, & 3, & -3, & -2, & -6, & -6; \\ 4, & 2, & -2, & -4, & -4, & -2, & 2, & 4; \\ 6, & -3, & -6, & -2, & 2, & 6, & 3, & -6 \end{bmatrix};$$

$$M3 = \begin{bmatrix} 4, & -4, & -4, & 4, & 4, & -4, & -4, & 4; \\ 2, & -6, & 3, & 6, & -6, & -3, & 6, & -2; \\ 2, & -4, & 4, & -2, & -2, & 4, & -4, & 2; \\ 3, & -2, & 6, & -6, & 6, & -6, & 2, & -3 \end{bmatrix}$$

Thus, an 8×8 coefficient block 1120 of an 8×8 image data block X may be divided into four 4×4 coefficient blocks D1, D2, D3, and D4 according to a frequency band. The coefficient blocks D1, D2, D3, and D4 may be obtained by respectively using transformation operations, e.g., $D1 = M1 \cdot X \sim M1^T$, $D2 = M1 \cdot X \cdot M2^T$, $D3 = M2 \cdot X \cdot M1^T$, and $D4 = M2 \cdot X \cdot M2^T$.

Thus, the coefficient blocks D1, D2, D3, and D4 according to a frequency band may be obtained from only the matrices M1 and M2 instead of the 8×8 transformation basis 1110. For example, if a coefficient other than '0' is present in only the coefficient block D1 corresponding to a vertical low-frequency band and a horizontal low-frequency band, then the selective frequency-domain transformer 12 may perform a transformation operation, i.e., $M1 \cdot X \cdot M1^T$, in which the matrix M1 that is a transformation basis selectively determined according to a frequency-domain is applied to the image data block X. The selective frequency-domain coefficient output unit 13 of FIG. 1 may output only data regarding the coefficient block D1.

The selective frequency-domain inverse transformer 22 may perform an inverse transformation on the coefficient blocks D1 to D4 by respectively using inverse transformation operations shown in the coefficient blocks D1 to D4 in the form of a parenthesis, illustrated in FIG. 11. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1, D2, D3, and D4.

For example, if the coefficient receiver 21 receives only data regarding the coefficient block D1, then the selective frequency-domain inverse transformer 22 may reconstruct the image data block X' by performing the inverse transformation operation, i.e., $M1^T \cdot D1 \cdot M1$, in which transformation bases $M1^T$ and M1 matrix-transposed from the selective vertical and horizontal transformation bases M1 and $M1^T$, which are used to perform a transformation, are applied to the coefficient block D1.

Figure 12:
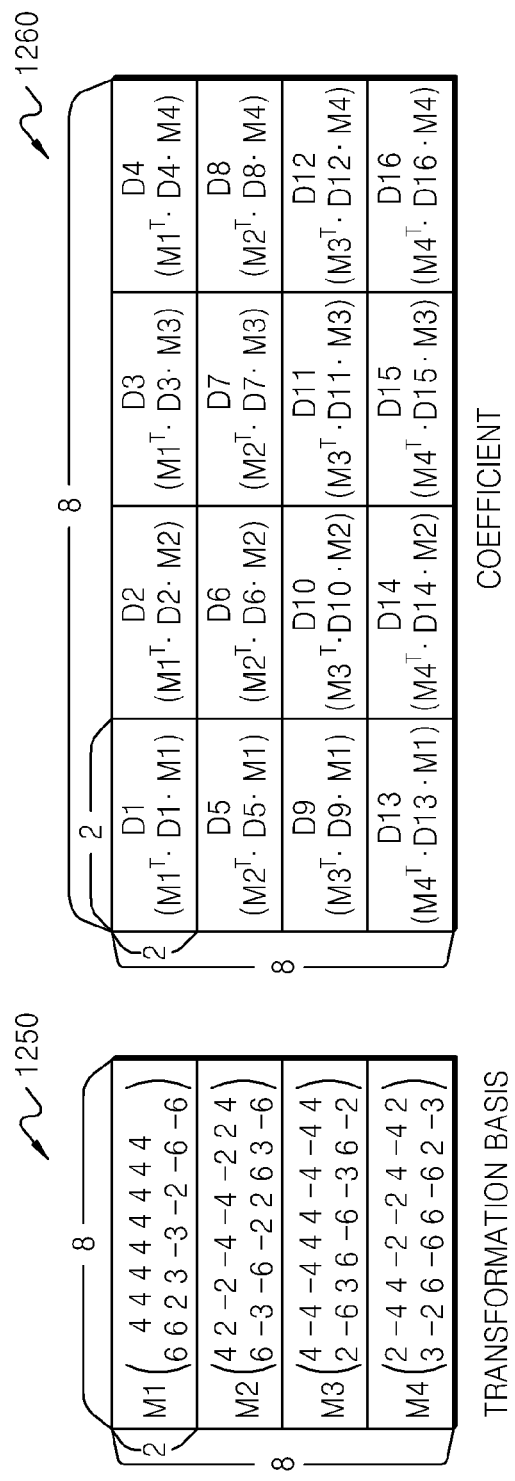
FIG. 12 illustrates a transformation basis for dividing an 8×8 data unit into transformation coefficients of sixteen equal blocks according to a frequency band, and the sixteen equal transformation coefficient blocks, according to another exemplary embodiment.

FIG. 12 illustrates a transformation basis for dividing an 8×8 data unit into transformation coefficients of sixteen equal blocks according to a frequency band, and the sixteen equal transformation coefficient blocks, according to another exemplary embodiment.

The selective frequency-domain transformer 12 of FIG. 1 may select matrices M1 to M4 obtained by dividing an 8×8 transformation basis M 1250 in the units of two pixels and in a direction of a vertical frequency, as selective vertical transformation bases, and may select matrices $M1^T$ to $M4^T$ matrix-transposed from the matrices M1 to M4, as selective horizontal transformation bases.

Thus, an 8×8 coefficient block 1260 of an 8×8 image data block X may be divided into sixteen 2×2 coefficient blocks D1 to D16 according to a frequency band. The coefficient blocks D1 to D16 may be obtained by respectively using the following transformation operations:

$D1 = M1 \cdot X \cdot M1^T$, $D2 = M1 \cdot X \cdot M2^T$, $D3 = M1 \cdot X \cdot M3^T$, $D4 = M1 \cdot X \cdot M4^T$;
$D5 = M2 \cdot X \cdot M1^T$, $D6 = M2 \cdot X \cdot M2^T$, $D7 = M2 \cdot X \cdot M3^T$, $D8 = M2 \cdot X \cdot M4^T$;
$D9 = M3 \cdot X \cdot M1^T$, $D10 = M3 \cdot X \cdot M2^T$, $D11 = M3 \cdot X \cdot M3^T$, $D12 = M3 \cdot X \cdot M4^T$;
$D13 = M4 \cdot X \cdot M1^T$, $D14 = M4 \cdot X \cdot M2^T$, $D15 = M4 \cdot X \cdot M3^T$, $D16 = M4 \cdot X \cdot M4^T$ Thus, the coefficient blocks D1 to D16 according to a frequency band may be obtained from only the matrices M1 to M4 instead of the 8×8 transformation basis 1250. For example, if a coefficient other than '0' is present in only the coefficient blocks D1, D2, D5, D6, and D9, then the selective frequency-domain transformer 12 may select one of the transformation bases M1 to M4 according to a frequency-domain, apply the selected transformation basis to the image data block X, and perform transformation operations, i.e., $D1 = M1 \cdot X \cdot M1^T$, $D2 = M1 \cdot X \cdot M2^T$, $D5 = M2 \cdot X \cdot M1^T$, $D6 = M2 \cdot X \cdot M2^T$, and $D9 = M3 \cdot X \cdot M1^T$. The selective frequency-domain coefficient output unit 13 of FIG. 1 may output only data regarding the coefficient blocks D1, D2, D5, D6, and D9.

The selective frequency-domain inverse transformer 22 may perform an inverse transformation on the coefficient blocks D1 to D16 by respectively using inverse transformation operations shown in the coefficient blocks D1 to D16 in the form of a parenthesis, illustrated in FIG. 12. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 to D16.

For example, if the coefficient receiver 21 receives only data regarding the coefficient blocks D1, D2, D5, D6, and D9, then the selective frequency-domain inverse transformer 22 may reconstruct the image data block X' by respectively performing the inverse transformation operations, i.e., $M1^T \cdot D1 \cdot M1$, $M1^T \cdot D2 \cdot M2$, $M2^T \cdot D5 \cdot M1$, $M2^T \cdot D6 \cdot M2$, and $M3^T \cdot D9 \cdot M1$, on the coefficient blocks D1, D2, D5, D6, and D9, and then combining results of the performing.

A selective frequency-domain transformation and a selective frequency-domain inverse transformation according to a frequency band in which a vertical frequency band and a horizontal frequency band are individually divided, which are respectively performed by the selective frequency-domain transformer 12 and the selective frequency-domain inverse transformer 22, will now be described in detail with reference to FIGS. 13 and 14.

Figure 13:
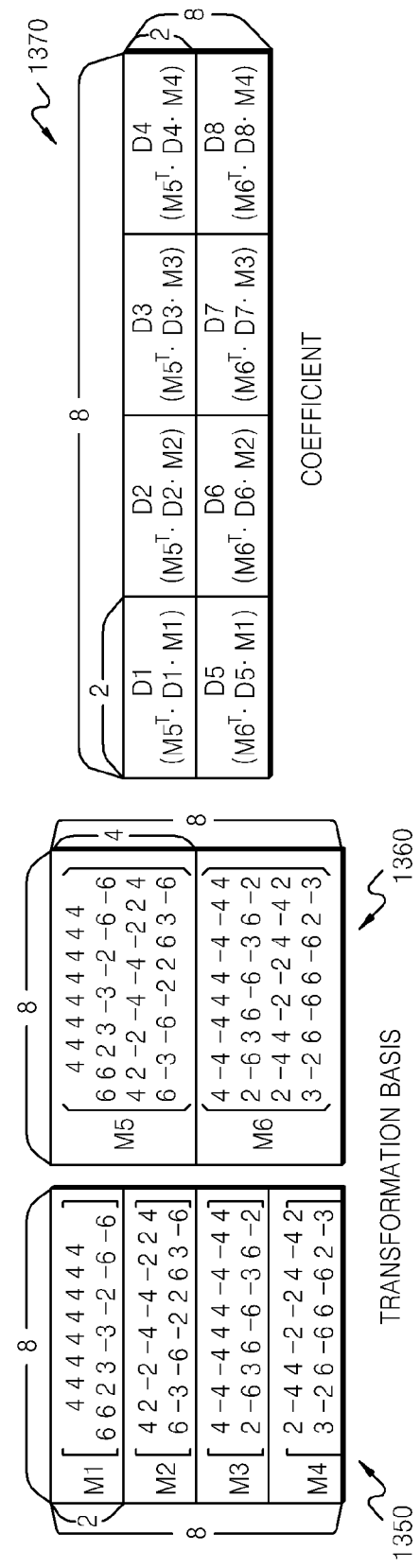
FIG. 13 illustrates transformation bases for dividing an 8×8 data unit into 2×4 transformation coefficient blocks and the 2×4 transformation coefficient blocks, according to another exemplary embodiment.

FIG. 13 illustrates transformation bases for dividing an 8×8 data unit into 2×4 transformation coefficient blocks, and the 2×4 transformation coefficient blocks, according to another exemplary embodiment.

The selective frequency-domain transformer 12 of FIG. 1 may select matrices $M1^T$ to $M4^T$ matrix-transposed from matrices M1 to M4, which are obtained by dividing an 8×8 transformation basis 350 in the units of two pixels and in a direction of a vertical frequency, as selective horizontal transformation bases, and may select matrices M5 and M6 obtained by dividing an 8×8 matrix basis 1360 in the units of four pixels and in the direction of the vertical frequency, as selective vertical transformation bases.

Thus, an 8×8 coefficient block 1370 of an 8×8 image data block X may be divided in the units of four pixels according to a vertical frequency band and in the units of two pixels according to a horizontal frequency band so as to obtain 2×4 coefficient blocks D1 to D8. The coefficient blocks D1 to D8 may be obtained by respectively using the following transformation operations:

$D1=M5·X·M1^T$, $D2=M5·X·M2^T$, $D3=M5·X·M3^T$, $D4=M5·X·M4^T$;
$D5=M6·X·M1^T$, $D6=M6·X·M2^T$, $D7=M6·X·M3^T$, $D8=M6·X·M4^T$

Thus, the coefficient blocks D1 to D8 according to a frequency band may be obtained from only the matrices M1 to M6 instead of the 8×8 transformation bases 1350 and 1360. For example, if a coefficient other than '0' is present in only the coefficient blocks D1, D2, and D5, then the selective frequency-domain transformer 12 may select one of the transformation bases M1 to M6 according to a frequency-domain, apply the selected transformation basis to the image data block X, and perform transformation operations, i.e., $D1=M5·X·M1^T$, $D2=M5·X·M2^T$, and $D5=M6·X·M1^T$. The selective frequency-domain coefficient output unit 13 of FIG. 1 may output only data regarding the coefficient blocks D1, D2, and D5.

The selective frequency-domain inverse transformer 22 may perform an inverse transformation on the coefficient blocks D1 to D8 by respectively using inverse transformation operations shown in the coefficient blocks D1 to D8 in the form of a parenthesis, illustrated in FIG. 13. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 to D8.

For example, if the coefficient receiver 21 receives only data regarding the coefficient blocks D1, D2, and D5, then the selective frequency-domain inverse transformer 22 may reconstruct the image data block X' by respectively performing the inverse transformation operations, i.e., $M5^T·D1·M1$, $M5^T·D2·M2$, and $M6^T·D5·M1$, on the coefficient blocks D1, D2, and D5, and then combining the results of performing the inverse transformation operations.

Figure 14:
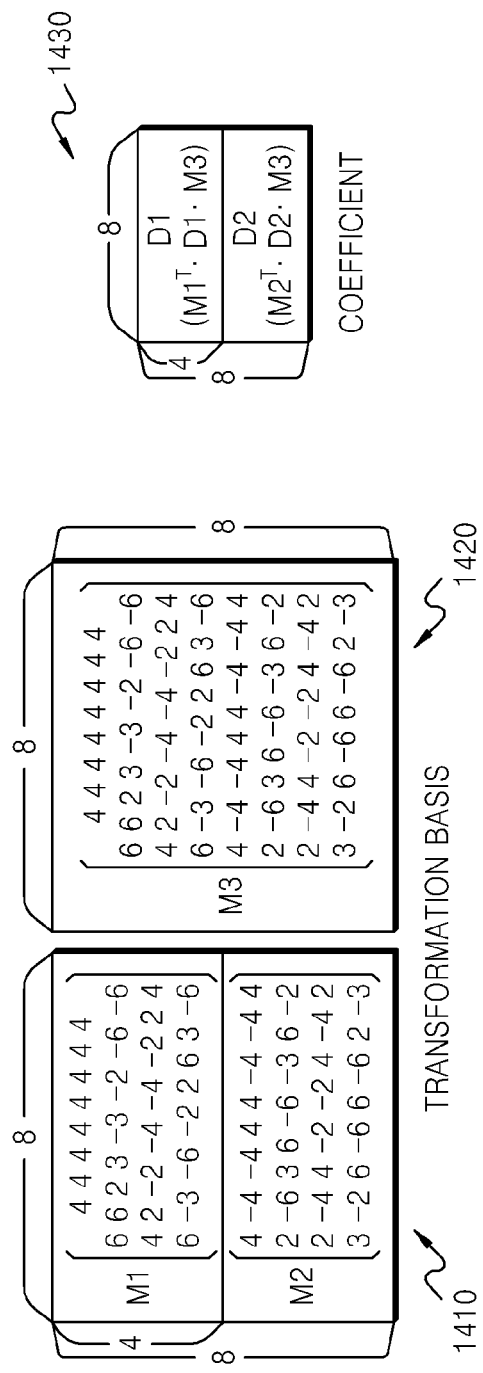
FIG. 14 illustrates transformation bases for dividing an 8×8 data unit into 8×4 transformation coefficient blocks and the 8×4 transformation coefficient blocks, according to another exemplary embodiment.

FIG. 14 illustrates transformation bases for dividing an 8×8 data unit into 8×4 transformation coefficient blocks and the 8×4 transformation coefficient blocks, according to another exemplary embodiment.

The selective frequency-domain transformer 12 may select matrices M1 and M2 obtained by dividing an 8×8 transformation basis 1410 in the units of four pixels and in a direction of a vertical frequency, as selective vertical transformation bases, and may select a matrix $M3^T$ matrix-transposed from an 8×8 transformation basis 1420, as a selective horizontal transformation basis.

Thus, an 8×8 coefficient block 1430 of an 8×8 image data block X may be divided in the units of four pixels according to a vertical frequency band, that is, may be divided into two 8×4 coefficient blocks D1 and D2. The coefficient blocks D1 and D2 may be obtained by respectively using frequency transformation operations, e.g., $D1=M1·X·M3^T$ and $D2=M2·X·M3^T$.

Thus, the coefficient blocks D1 and D2 according to a frequency band may be obtained from only the matrices M1 to M3 instead of the 8×8 transformation bases 1410 and 1420. For example, if a coefficient other than '0' is preset in only the coefficient block D1, then the selective frequency-domain transformer 12 may select the transformation bases M1 and M3 according to a frequency band, apply the transformation bases M1 and M3 to the image data block X, and perform the transformation operation, i.e., $D1=M1·X·M3^T$. The selective frequency-domain coefficient output unit 13 of FIG. 1 may output only data regarding the coefficient block D1.

The selective frequency-domain inverse transformer 22 may perform an inverse transformation on the coefficient blocks D1 and D2 by respectively using inverse transformation operations shown in the coefficient blocks D1 and D2 in the form of a parenthesis, illustrated in FIG. 14. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 and D2.

For example, if the coefficient receiver 21 receives only data regarding the coefficient block D1, then the selective frequency-domain inverse transformer 22 may reconstruct the image data block X' by performing the inverse transformation operation, i.e., $M1^T·D1·M3$, on the coefficient block D1 corresponding to both vertical and horizontal low-frequency bands.

Figure 15:
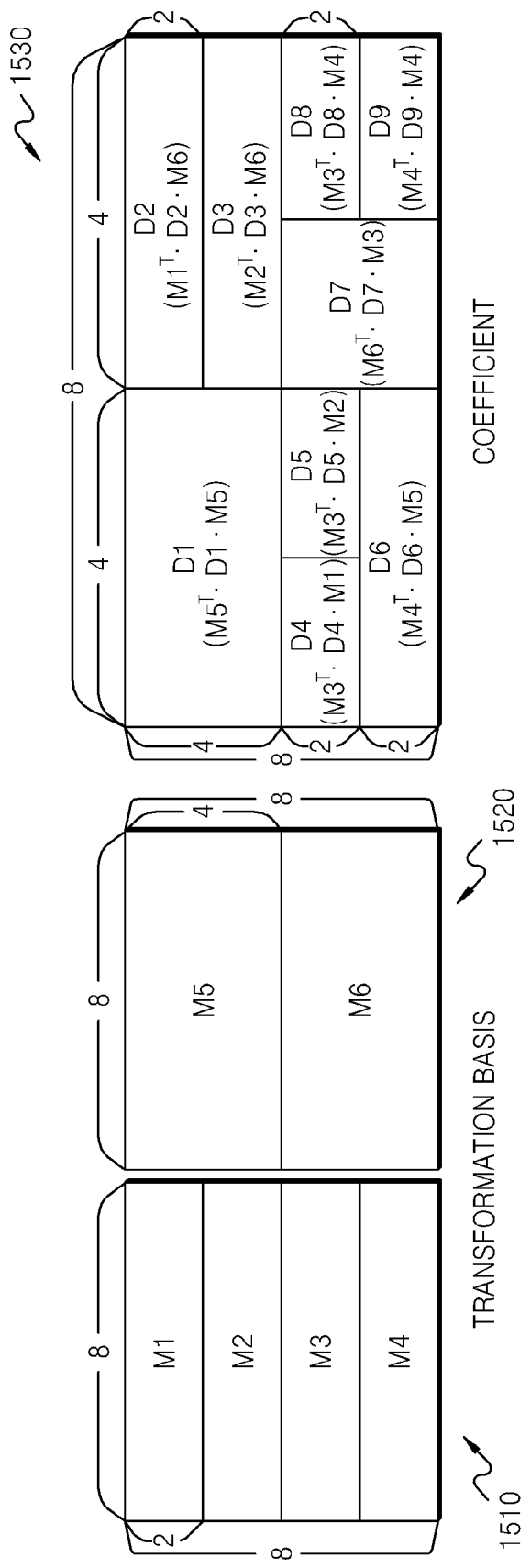
FIG. 15 illustrates transformation bases for generating arbitrary-sized transformation basis blocks from 8×8 coefficient blocks of an 8×8 data unit, and the transformation coefficient blocks, according to another exemplary embodiment.

FIG. 15 illustrates transformation bases for generating arbitrary-sized transformation basis blocks from 8×8 coefficient blocks of an 8×8 data unit, and the transformation coefficient blocks, according to another exemplary embodiment.

If one transformation coefficient block is divided into a plurality of arbitrary-sized coefficient blocks, then the selective frequency-domain transformer 12 of FIG. 1 and the selective frequency-domain inverse transformer 22 of FIG. 2 may respectively perform the selective frequency-domain transformation and the selective frequency-domain inverse transformation with respect to a frequency band selected for each of the plurality of coefficient blocks.

The selective frequency-domain transformer 12 may select matrices M1 to M4 obtained by dividing an 8×8 transformation basis 1510 in the units of two pixels and in a direction of a vertical frequency, and matrices M5 and M6 obtained by dividing an 8×8 transformation basis 1520 in the units of four pixels and in the direction of the vertical frequency, as selective vertical transformation bases. Also, the selective frequency-domain transformer 12 may select matrices $M1^T$, $M2^T$, $M3^T$, and $M4^T$ of the 8×8 transformation basis 1510 and matrices $M5^T$ and $M6^T$ of the 8×8 transformation basis 1520, as selective horizontal transformation bases.

An 8×8 coefficient block 1530 of the 8×8 image data block X may be divided into a 4×4 coefficient block D1, 4×2 coefficient blocks D2 and D3, 2×2 coefficient blocks D4 and D5, a 4×2 coefficient block D6, a 2×4 coefficient block D7, and 2×2 coefficient blocks D8 and D9, according to a combination of the selective horizontal and vertical frequency bases. The coefficient blocks D1 to D9 may be obtained by respectively using transformation operations, e.g., $D1=M5·X·M5^T$, $D2=M1·X·M6^T$, $D3=M2·X·M6^T$, $D4=M3·X·M1^T$, $D5=M3·X·M2^T$, $D6=M4·X·M5^T$, $D7=M6·X·M3^T$, $D8=M3·X·M4^T$, and $D9=M4·X·M4^T$.

Thus, the coefficient blocks D1 to D9 according to a frequency band may be obtained from only the matrices M1 to M6 instead of the 8×8 transformation bases 1510 and 1520. For example, if a coefficient other than '0' is present in only the coefficient blocks D1, D2, and D4, then the selective frequency-domain transformer 12 may select one of the transformation bases M1 to M6, apply the selected transformation basis to the image data block X, and perform the transformation operations, i.e., $D1=M5 \cdot X \cdot M5^T$, $D2=M1 \cdot X \cdot M6^T$, and $D4=M3 \cdot X \cdot M1^T$. The selective frequency-domain coefficient output unit 13 of FIG. 1 may output only data regarding the coefficient blocks D1, D2, and D4.

The selective frequency-domain inverse transformer 22 may perform an inverse transformation on the coefficient blocks D1 to D9 by respectively using inverse transformation operations shown in the coefficient blocks D1 to D9 in the form of a parenthesis, illustrated in FIG. 15. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 to D9.

For example, if the coefficient receiver 21 receives only data regarding the coefficient blocks D1, D2, and D4, then the selective frequency-domain inverse transformer 22 may reconstruct the image data block X' by respectively performing the inverse transformation operations, i.e., $M5^T \cdot D1 \cdot M5$, $M1^T \cdot D2 \cdot M6$, and $M3^T \cdot D4 \cdot M1$, on the coefficient blocks D1, D2, and D4 and combining the results of performing the inverse transformation operations.

If a selective frequency-domain transformation and a selective frequency-domain inverse transformation according to an exemplary embodiment are performed according to a frequency band corresponding to such arbitrary-sized coefficient blocks, then the selective frequency-domain transformation and the selective frequency-domain inverse transformation may be performed using selective horizontal and vertical transformation bases selected according to a frequency band corresponding to a arbitrary coefficient block having a coefficient other than '0', thereby reducing an amount and complexity of calculation more than when a transformation and an inverse transformation are performed using 8×8 transformation bases.

A selective frequency-domain transformation and a selective frequency-domain inverse transformation performed in the units of coefficients and respectively performed by the selective frequency-domain transformation unit 17 and the selective frequency-domain inverse transformer 22, will now be described in detail with reference to FIGS. 16 and 17.

FIG. 16 illustrates a transformation basis for classifying transformation coefficients of a 4×4 data unit in the units of coefficients, and the transformation coefficients, according to another exemplary embodiment.

The selective frequency-domain transformer 12 of FIG. 1 may select matrices M1 to M4 obtained by dividing a 4×4 transformation basis 1610 in the units of pixels and in a direction of a vertical frequency, as selective vertical transformation bases, and may select matrices $M1^T$ to $M4^T$ matrix-transposed from the matrices M1 to M4, as selective horizontal transformation bases.

Thus, a 4×4 coefficient block 1620 of a 4×4 image data block X may include sixteen coefficients D1 to D16. The coefficient D1 to D16 may be obtained by respectively using the following transformation operations:

$D1=M1 \cdot X \cdot M1^T$,    $D2=M1 \cdot X \cdot M2^T$,    $D3=M1 \cdot X \cdot M3^T$,
    $D4=M1 \cdot X \cdot M4^T$;
$D5=M2 \cdot X \cdot M1^T$,    $D6=M2 \cdot X \cdot M2^T$,    $D7=M2 \cdot X \cdot M3^T$,
    $D8=M2 \cdot X \cdot M4^T$;
$D9=M3 \cdot X \cdot M1^T$,    $D10=M3 \cdot X \cdot M2^T$,    $D11=M3 \cdot X \cdot M3^T$,
    $D12=M3 \cdot X \cdot M4^T$;
$D13=M4 \cdot X \cdot M1^T$,    $D14=M4 \cdot X \cdot M2^T$,    $D15=M4 \cdot X \cdot M3^T$,
    $D16=M4 \cdot X \cdot M4^T$ Thus, the coefficients D1 to D16 may be obtained from only the matrices M1 to M4 instead of the 4×4 transformation basis 1610. For example, if the coefficients D1, D2, D5, D6, and D9 are not '0', the selective frequency-domain transformer 12 may select one of the transformation bases M1, M2, M3, and M4 according to a frequency band, apply the selected transformation basis to the image data block X, and then perform the transformation operations, i.e., $D1=M1 \cdot X \cdot M1^T$, $D2=M1 \cdot X \cdot M2^T$, $D5=M2 \cdot X \cdot M1^T$, $D6=M2 \cdot X \cdot M2^T$, and $D9=M3 \cdot X \cdot M1^T$. The selective frequency-domain coefficient output unit 13 of FIG. 1 may output only data regarding the coefficients D1, D2, D5, D6, and D9.

The video decoding apparatus 20 of FIG. 2 may perform decoding by arranging received coefficients on appropriate locations according to an order of scanning coefficients other than '0'. The selective frequency-domain inverse transformer 22 may perform an inverse transformation on the coefficients D1 to D16 by respectively using inverse transformation operations shown in the coefficients D1 to D16 in the form of a parenthesis, illustrated in FIG. 16. That is, the selective frequency-domain inverse transformer 22 may reconstruct an image data block X' by applying a result of matrix-transposing selective vertical and horizontal transformation bases, which are used to perform a transformation, to a coefficient received from among the coefficients D1 to D16.

For example, if the coefficient receiver 21 receives only data regarding the coefficients D1, D2, D5, D6, and D9, the selective frequency-domain inverse transformer 22 may reconstruct the image data block X' by performing corresponding inverse transformation operations from among $M1^T \cdot D1 \cdot M1$, $M1^T \cdot D2 \cdot M2$, $M3^T \cdot D5 \cdot M1$, $M2^T \cdot D6 \cdot M2$, and $M3^T \cdot D9 \cdot M1$, on at least one of the coefficients D1, D2, D5, D6, and D9, and combining results of the performing.

FIG. 17 illustrates a transformation basis for classifying transformation coefficients of an 8×8 data unit in the units of coefficients and the transformation coefficients, according to another exemplary embodiment.

The selective frequency-domain transformer 12 of FIG. 1 may select matrices M1 to M8 obtained by dividing an 8×8 transformation basis 1710 in the units of pixels and in a direction of a vertical frequency, as selective vertical transformation bases, and may select matrices $M1^T$ to $M8^T$ matrix-transposed from the matrices M1 to M8, as selective horizontal transformation bases.

Thus, an 8×8 coefficient block 1720 of an 8×8 image data block X includes coefficients D1 through D64. The coefficient D1 to D64 may be obtained by respectively using the following transformation operations:

$D1=M1 \cdot X \cdot M1^T$,    $D2=M1 \cdot X \cdot M2^T$,    $D3=M1 \cdot X \cdot M3^T$,
    $D4=M1 \cdot X \cdot M4^T$;
$D5=M1 \cdot X \cdot M5^T$,    $D6=M1 \cdot X \cdot M6^T$,    $D7=M1 \cdot X \cdot M7^T$,
    $D8=M1 \cdot X \cdot M8^T$;
$D9=M2 \cdot X \cdot M1^T$,    $D10=M2 \cdot X \cdot M2^T$,    $D11=M2 \cdot X \cdot M3^T$,
    $D12=M2 \cdot X \cdot M4^T$;
$D13=M2 \cdot X \cdot M5^T$,    $D14=M2 \cdot X \cdot M6^T$,    $D15=M2 \cdot X \cdot M7^T$,
    $D16=M2 \cdot X \cdot M8^T$;
$D17=M3 \cdot X \cdot M1^T$,    $D18=M3 \cdot X \cdot M2^T$,    $D19=M3 \cdot X \cdot M3^T$,
    $D20=M3 \cdot X \cdot M4^T$;
$D21=M3 \cdot X \cdot M5^T$,    $D22=M3 \cdot X \cdot M6^T$,    $D23=M3 \cdot X \cdot M7^T$,
    $D24=M3 \cdot X \cdot M8^T$;

$D25=M4 \cdot X \cdot M1^T$, $D26=M4 \cdot X \cdot M2^T$, $D27=M4 \cdot X \cdot M3^T$, $D28=M4 \cdot X \cdot M4^T$;
$D29=M4 \cdot X \cdot M5^T$, $D30=M4 \cdot X \cdot M6^T$, $D31=M4 \cdot X \cdot M7^T$, $D32=M4 \cdot X \cdot M8^T$;
$D33=M5 \cdot X \cdot M1^T$, $D34=M5 \cdot X \cdot M2^T$, $D35=M5 \cdot X \cdot M3^T$, $D36=M5 \cdot X \cdot M4^T$;
$D37=M5 \cdot X \cdot M5^T$, $D38=M5 \cdot X \cdot M6^T$, $D39=M5 \cdot X \cdot M7^T$, $D40=M5 \cdot X \cdot M8^T$;
$D41=M6 \cdot X \cdot M1^T$, $D42=M6 \cdot X \cdot M2^T$, $D43=M6 \cdot X \cdot M3^T$, $D44=M6 \cdot X \cdot M4^T$;
$D45=M6 \cdot X \cdot M5^T$, $D46=M6 \cdot X \cdot M6^T$, $D47=M6 \cdot X \cdot M7^T$, $D48=M6 \cdot X \cdot M8^T$;
$D49=M7 \cdot X \cdot M1^T$, $D50=M7 \cdot X \cdot M2^T$, $D51=M7 \cdot X \cdot M3^T$, $D52=M7 \cdot X \cdot M4^T$;
$D53=M7 \cdot X \cdot M5^T$, $D54=M7 \cdot X \cdot M6^T$, $D55=M7 \cdot X \cdot M7^T$, $D56=M7 \cdot X \cdot M8^T$;
$D57=M8 \cdot X \cdot M1^T$, $D58=M8 \cdot X \cdot M2^T$, $D59=M8 \cdot X \cdot M3^T$, $D60=M8 \cdot X \cdot M4^T$;
$D61=M8 \cdot X \cdot M5^T$, $D62=M8 \cdot X \cdot M6^T$, $D63=M8 \cdot X \cdot M7^T$, $D64=M8 \cdot X \cdot M8^T$ Thus, the coefficients D1 to D64 may be obtained from only the matrices M1 to M8 instead of the 8×8 transformation basis 1710. For example, if the coefficients D1, D2, D9, D10, D17, D19, D26, and D27 are not '0', then the selective frequency-domain transformer 12 may select one of the transformation bases M1, M2, M3, M4, M5, M6, M7, and M8 according to a frequency band, apply the selected transformation basis to the image data block X, and then perform the transformation operations, i.e., $D1=M1 \cdot X \cdot M1^T$, $D2=M1 \cdot X \cdot M2^T$, $D9=M2 \cdot X \cdot M1^T$, $D10=M2 \cdot X \cdot M2^T$, $D17=M3 \cdot X \cdot M1^T$, $D19=M3 \cdot X \cdot M3^T$, $D26=M4 \cdot X \cdot M2^T$, and $D27=M4 \cdot X \cdot M3^T$. The selective frequency-domain coefficient output unit 13 of FIG. 1 may output only data regarding the coefficients D1, D2, D9, D10, D17, D19, D26, and D27.

The video decoding apparatus 20 of FIG. 2 may perform decoding by arranging received coefficients on appropriate locations according to an order of scanning coefficients other than '0'. The selective frequency-domain inverse transformer 22 may perform an inverse transformation on the coefficients D1 to D64 by respectively using inverse transformation operations shown in the coefficients D1 to D64 in the form of a parenthesis, illustrated in FIG. 16. That is, the selective frequency-domain inverse transformer 22 may reconstruct an image data block X' by applying a result of matrix-transposing selective vertical and horizontal transformation bases, which are used to perform a transformation, to a coefficient received from among the coefficients D1 to D64.

For example, if the coefficient receiver 21 receives only data regarding the coefficients D1, D2, D9, D10, D17, D19, D26, and D27, then the selective frequency-domain inverse transformer 22 may reconstruct the image data block X' by performing a corresponding inverse transformation operation from among $M1^T \cdot D1 \cdot M1$, $M1^T \cdot D2 \cdot M2$, $M2^T \cdot D9 \cdot M1$, $M2^T \cdot D10 \cdot M2$, $M3^T \cdot D17 \cdot M1$, $M3^T \cdot D19 \cdot M3$, $M4^T \cdot D26 \cdot M2$, and $M4^T \cdot D27 \cdot M3$ on at least one of the coefficients D1, D2, D9, D10, D17, D19, D26, and D27, and combining results of the performing.

A selective frequency-domain transformation and a selective frequency-domain inverse transformation performed on image data, the shape of which is not a square block type by the selective frequency-domain transformer 12 and the selective frequency-domain inverse transformer 22, respectively, will now be described in detail with reference to FIGS. 18 and 19.

Figure 18:
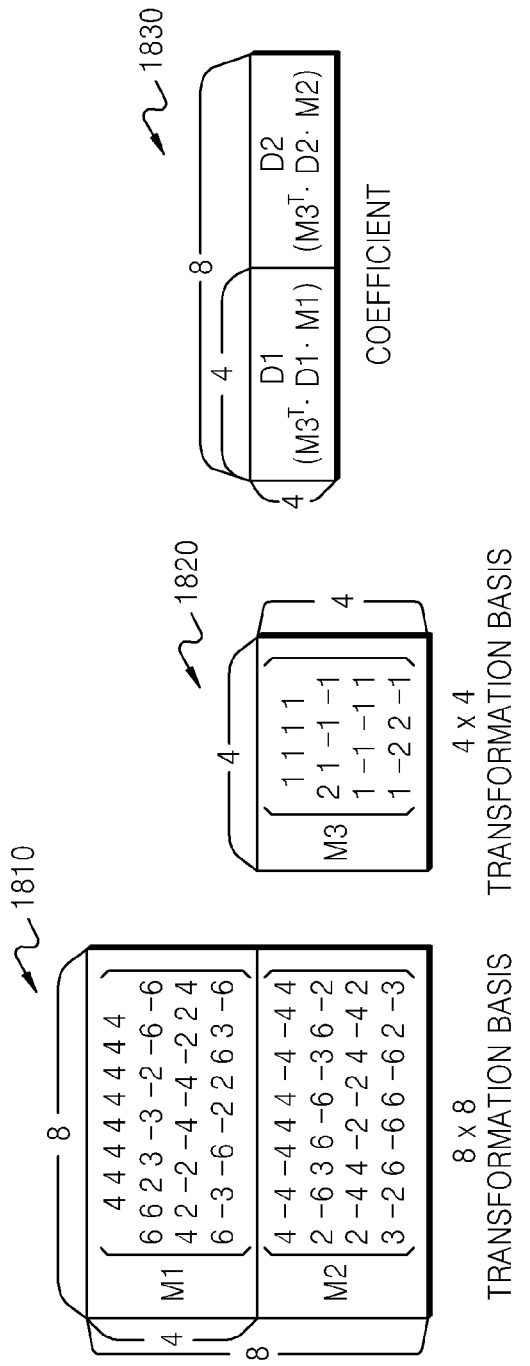
FIG. 18 illustrates transformation bases for obtaining transformation coefficients by dividing an arbitrarily selected data unit, e.g., an 8×4 data unit, in the units of selective frequency-domains, and the transformation coefficient blocks according to another exemplary embodiment.

FIG. 18 illustrates transformation bases for obtaining transformation coefficients by dividing a arbitrarily selected data unit, e.g., an 8×4 data unit, in the units of selective frequency-domains, and the transformation coefficient blocks according to another exemplary embodiment.

The selective frequency-domain transformer 12 may select matrices $M1^T$ and $M2^T$ that are matrix-transposed from matrices M1 and M2, which are obtained by dividing an 8×8 transformation basis 1810 in the units of four pixels and in a direction of a vertical frequency, as selective horizontal transformation bases, and may select a 4×4 transformation basis 1820 which is a matrix M3, as a selective vertical transformation basis.

Thus, an 8×4 coefficient block 1830 of an 8×4 image data block X may be divided in the units of four pixels according to a vertical frequency band, that is, may be divided into two 4×4 coefficient blocks D1 and D2. The coefficient blocks D1 and D2 may be obtained by respectively using frequency transformation operations, e.g., $D1=M3 \cdot X \cdot M1^T$ and $D2=M3 \cdot X \cdot M2^T$.

Thus, the coefficient blocks D1 and D2 according to a frequency band may be obtained from only the matrices M1 to M3 instead of the 8×8 transformation basis 1810 and the 4×4 transformation basis 1820. For example, if a coefficient other than '0' is preset in only the coefficient block D1, then the selective frequency-domain transformer 12 may select the transformation bases M1 and M3 according to a frequency band, apply the transformation bases M1 and M3 to the image data block X, and perform the transformation operation, e.g., $D1=M3 \cdot X \cdot M1^T$. The selective frequency-domain coefficient output unit 13 of FIG. 1 may output only data regarding the coefficient block D1.

The selective frequency-domain inverse transformer 22 may perform an inverse transformation on the coefficient blocks D1 and D2 by respectively using inverse transformation operations shown in the coefficient blocks D1 and D2 in the form of a parenthesis, illustrated in FIG. 18. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 and D2.

For example, if the coefficient receiver 21 receives only data regarding the coefficient block D1, then the selective frequency-domain inverse transformer 22 may reconstruct the image data block X' by performing the inverse transformation operation, i.e., $M3^T \cdot D1 \cdot M1$, on the coefficient block D1.

Figure 19:
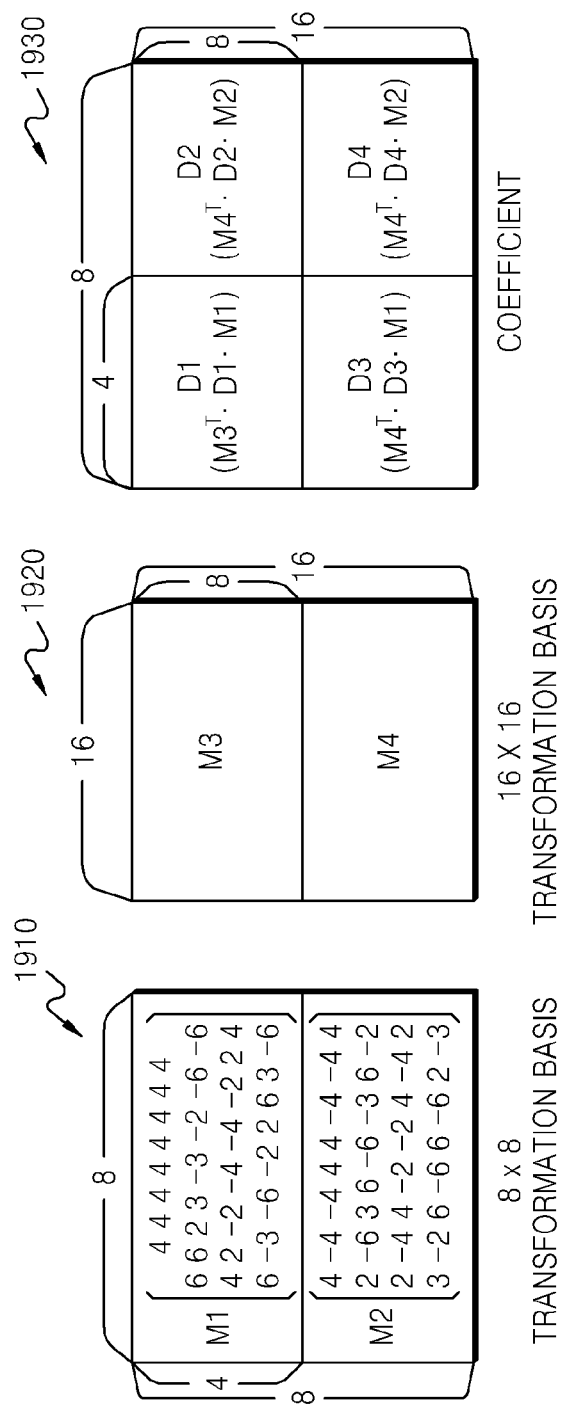
FIG. 19 illustrates transformation bases for dividing an arbitrarily selected data unit, e.g., an 8×16 data unit, into transformation coefficients according to selective frequency-domains, and the transformation coefficient blocks according to another exemplary embodiment.

FIG. 19 illustrates transformation bases for dividing an arbitrarily selected data unit, e.g., an 8×16 data unit, into transformation coefficients according to selective frequency-domains, and the transformation coefficient blocks according to another exemplary embodiment.

The selective frequency-domain transformer 12 may select matrices $M1^T$ and $M2^T$ that are matrix-transposed from matrices M1 and M2, which are obtained by dividing an 8×8 transformation basis 1910 in the units of four pixels and in a direction of a vertical frequency, as selective horizontal transformation bases, and may select matrices M3 and M4 obtained by dividing a 16×16 transformation basis 1920 in the units of eight pixels and in the direction of the vertical frequency, as selective vertical transformation bases.

Thus, an 8×16 coefficient block 1930 of an 8×16 image data block X may be divided in the units of four pixels according to a horizontal frequency band and divided in the units of eight pixels according to a vertical frequency band, that is, may be divided into four 4×8 coefficient blocks D1 to D4. The coefficient blocks D1, D2, D3, and D4 may be obtained by respectively using transformation operations, e.g., $D1=M3 \cdot X \cdot M1^T$, $D2=M3 \cdot X \cdot M2^T$, $D3=M4 \cdot X \cdot M1^T$, and $D4=M4 \cdot X \cdot M2^T$.

Thus, the coefficient blocks D1 to D4 according to a frequency band may be obtained from only the matrices M1 to M4 instead of the 8×8 transformation basis 1910 and the 16×17 transformation basis 1920. For example, if a coefficient other than '0' is preset in only the coefficient block D1, then the selective frequency-domain transformer 12 may select the transformation bases M1 and M3 according to a frequency band, apply the transformation bases M1 and M3 to the image data block X, and perform the transformation operation, e.g., $D1=M3 \cdot X \cdot M1^T$. The selective frequency-domain coefficient output unit 13 of FIG. 1 may output only data regarding the coefficient block D1.

The selective frequency-domain inverse transformer 22 may perform an inverse transformation on the coefficient blocks D1 to D4 by respectively using inverse transformation operations shown in the coefficient blocks D1 to D4 in the form of a parenthesis, illustrated in FIG. 19. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1, D2, D3, and D4.

For example, if the coefficient receiver 21 receives only data regarding the coefficient block D1, then the selective frequency-domain inverse transformer 22 may reconstruct the image data block X' by performing the inverse transformation operation, e.g., $M3^T \cdot D1 \cdot M1$, on the coefficient block D1 corresponding to both vertical and horizontal low-frequency bands.

A selective frequency-domain transformation and a selective frequency-domain inverse transformation performed on a large image data unit by the selective frequency-domain transformation unit 21 and the selective frequency-domain inverse transformer 22, respectively, will now be described in detail with reference to FIGS. 20 and 21.

Figure 20:
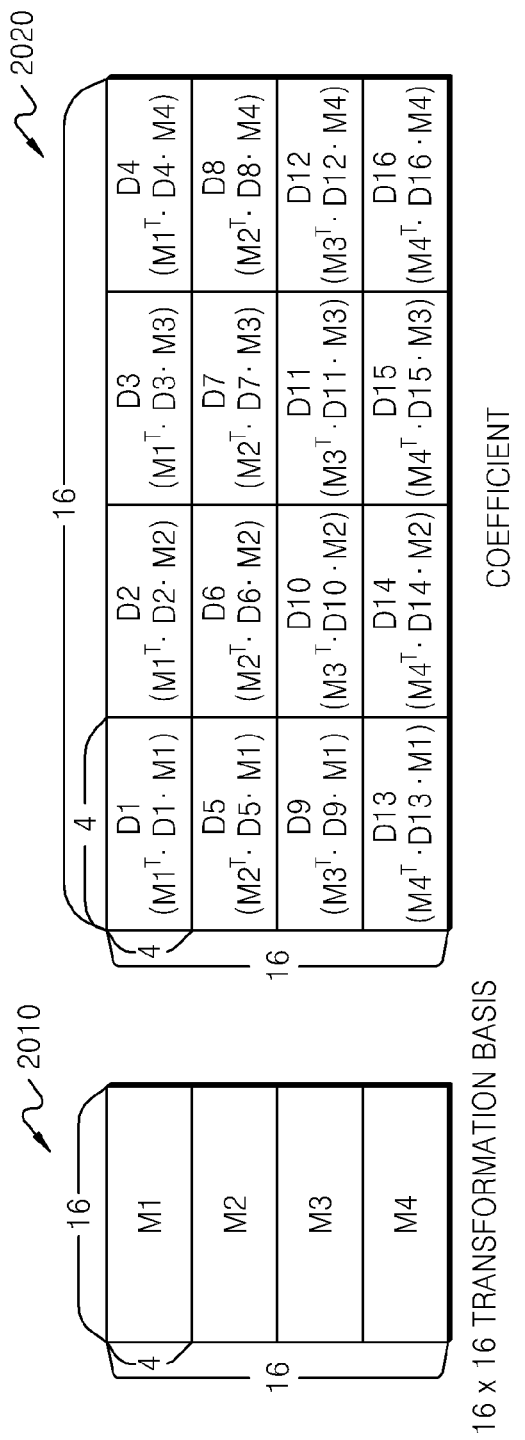
FIG. 20 illustrates a transformation basis for dividing a large data unit, e.g., a 16×16 data unit, into transformation coefficients of sixteen equal blocks according to a frequency band, and the sixteen equal transformation coefficient blocks according to another exemplary embodiment.

FIG. 20 illustrates a transformation basis for dividing a large data unit, e.g., a 16×16 data unit, into transformation coefficients of sixteen equal blocks according to a frequency band, and the sixteen equal transformation coefficient blocks according to another exemplary embodiment.

The selective frequency-domain transformer 12 of FIG. 1 may select matrices M1 to M4 obtained by dividing a large transformation basis, e.g., a 16×16 transformation basis 2010, in the units of four pixels and in a direction of a vertical frequency, as selective vertical transformation bases, and may select matrices $M1^T$ to $M4^T$ that are matrix-transposed from the matrices M1 to M4, as selective horizontal transformation bases.

Thus, a 16×16 coefficient block 2020 of a 16×16 image data block X may be divided into sixteen 16×16 coefficient blocks D1 to D16 according to a frequency band. The coefficient blocks D1 to D16 may be obtained by respectively using the following transformation operations:

$D1=M1 \cdot X \cdot M1^T$, $D2=M1 \cdot X \cdot M2^T$, $D3=M1 \cdot X \cdot M3^T$, $D4=M1 \cdot X \cdot M4^T$;
$D5=M2 \cdot X \cdot M1^T$, $D6=M2 \cdot X \cdot M2^T$, $D7=M2 \cdot X \cdot M3^T$, $D8=M2 \cdot X \cdot M4^T$;
$D9=M3 \cdot X \cdot M1^T$, $D10=M3 \cdot X \cdot M2^T$, $D11=M3 \cdot X \cdot M3^T$, $D12=M3 \cdot X \cdot M4^T$;
$D13=M4 \cdot X \cdot M1^T$, $D14=M4 \cdot X \cdot M2^T$, $D15=M4 \cdot X \cdot M3^T$, $D16=M4 \cdot X \cdot M4^T$ Thus, the coefficient blocks D1 to D16 according to a frequency band may be obtained from only the matrices M1 to M4 instead of the 16×16 transformation basis 2010. For example, if a coefficient other than '0' is present in only the coefficient blocks D1, D2, D5, D6, and D9, then the selective frequency-domain transformer 12 may select one of the transformation bases M1 to M4 according to a frequency-domain, apply the selected transformation basis to the image data block X, and perform transformation operations, i.e., $D1=M1 \cdot X \cdot M1^T$, $D2=M1 \cdot X \cdot M2^T$, $D5=M2 \cdot X \cdot M1^T$, $D6=M2 \cdot X \cdot M2^T$, and $D9=M3 \cdot X \cdot M1^T$. The selective frequency-domain coefficient output unit 13 of FIG. 1 may output only data regarding the coefficient blocks D1, D2, D5, D6, and D9.

The selective frequency-domain inverse transformer 22 may perform an inverse transformation on the coefficient blocks D1 to D16 by respectively using inverse transformation operations shown in the coefficient blocks D1 to D16 in the form of a parenthesis, illustrated in FIG. 20. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 to D16.

For example, if the coefficient receiver 21 receives only data regarding the coefficient blocks D1, D2, D5, D6, and D9, then the selective frequency-domain inverse transformer 22 may reconstruct the image data block X' by respectively performing the inverse transformation operations, i.e., $M1^T \cdot D1 \cdot M1$, $M1^T \cdot D2 \cdot M2$, $M2^T \cdot D5 \cdot M1$, $M2^T \cdot D6 \cdot M2$, and $M3^T \cdot D9 \cdot M1$, on the coefficient blocks D1, D2, D5, D6, and D9, and then combining results of the performing.

Figure 21:
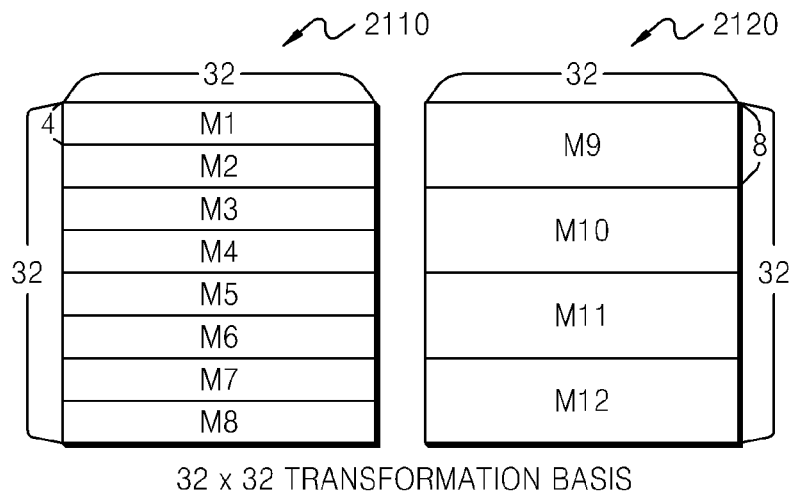
FIG. 21 illustrates transformation bases for dividing a large data unit, e.g., a 32×32 data unit, into 8×4 coefficient blocks and the coefficient blocks, according to another exemplary embodiment.

FIG. 21 illustrates transformation bases for dividing a large data unit, e.g., a 32×32 data unit, into 8×4 coefficient blocks, and the coefficient blocks, according to another exemplary embodiment.

The selective frequency-domain transformer 12 of FIG. 1 may select matrices M1 to M8 obtained by dividing a 32×32 transformation basis 2110 in the units of four pixels and in a direction of a vertical frequency, as selective vertical transformation bases. Also, the selective frequency-domain transformer 12 may select matrices $M9^T$, $M10^T$, $M11^T$, and $M12^T$ that are matrix-transposed from matrices M9, M10, M11, and M12, which are obtained by dividing a 32×32 transformation basis 2120 in the units of eight pixels and in the direction of the vertical frequency, as selective horizontal transformation bases.

Thus, a 32×32 coefficient block 2130 of a 32×32 image data block X may include 8×4 coefficient blocks D1 through D32. The coefficient blocks D1 to D32 may be obtained by respectively using the following transformation operations:

$D1=M1 \cdot X \cdot M9^T$, $D2=M1 \cdot X \cdot M10^T$, $D3=M1 \cdot X \cdot M11^T$, $D4=M1 \cdot X \cdot M12^T$;
$D5=M2 \cdot X \cdot M9^T$, $D6=M2 \cdot X \cdot M10^T$, $D7=M2 \cdot X \cdot M11^T$, $D8=M2 \cdot X \cdot M12^T$;
$D9=M3 \cdot X \cdot M9^T$, $D10=M3 \cdot X \cdot M10^T$, $D11=M3 \cdot X \cdot M11^T$, $D12=M3 \cdot X \cdot M12^T$;
$D13=M4 \cdot X \cdot M9^T$, $D14=M4 \cdot X \cdot M10^T$, $D15=M4 \cdot X \cdot M11^T$, $D16=M4 \cdot X \cdot M12^T$;
$D17=M5 \cdot X \cdot M9^T$, $D18=M5 \cdot X \cdot M10^T$, $D19=M5 \cdot X \cdot M11^T$, $D20=M5 \cdot X \cdot M12^T$;
$D21=M6 \cdot X \cdot M9^T$, $D22=M6 \cdot X \cdot M10^T$, $D23=M6 \cdot X \cdot M11^T$, $D24=M6 \cdot X \cdot M12^T$;
$D25=M7 \cdot X \cdot M9^T$, $D26=M7 \cdot X \cdot M10^T$, $D27=M7 \cdot X \cdot M11^T$, $D28=M7 \cdot X \cdot M12^T$;
$D29=M8 \cdot X \cdot M9^T$, $D30=M8 \cdot X \cdot M10^T$, $D31=M8 \cdot X \cdot M11^T$, $D32=M8 \cdot X \cdot M12^T$ Thus, the coefficient blocks D1 to D32 may be obtained from only the matrices M1 to M12 instead of the 32×32 transformation bases 2110 and 2120. For example, if the coefficients D1, D2, D3, D5, D6, D9, D10, D13, D17, and D21 are not '0', then the selective frequency-domain transformer 12 may select at least one of the transformation bases M1 to M12 according to a frequency band, apply the selected at least one transformation basis to the image data block X, and then perform the transformation operations, i.e., $D1=M1 \cdot X \cdot M9^T$, $D2=M1 \cdot X \cdot M10^T$, $D3=M1 \cdot X \cdot M11^T$, $D5=M2 \cdot X \cdot M9^T$, $D6=M2 \cdot X \cdot M10^T$, $D9=M3 \cdot X \cdot M9^T$, $D10=M3 \cdot X \cdot M10^T$, $D13=M4 \cdot X \cdot M9^T$, $D17=M5 \cdot X \cdot M9^T$, and $D21=M6 \cdot X \cdot M9^T$. The selective frequency-domain coefficient output unit 13 of FIG. 1 may output only data regarding the coefficient blocks D1, D2, D3, D5, D6, D9, D10, D13, D17, and D21.

The selective frequency-domain inverse transformer 22 may perform an inverse transformation on the coefficients D1 to D32 by respectively using inverse transformation operations shown in the coefficients D1 to D32 in the form of a parenthesis, illustrated in FIG. 21. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 to D32.

For example, if the coefficient receiver 21 receives only data regarding the coefficients D1, D2, D3, D5, D6, D9, D10, D13, D17, and D21, the selective frequency-domain inverse transformer 22 may reconstruct the image data block X' by performing corresponding inverse transformation operation from among $M1^T \cdot D1 \cdot M9$, $M1^T \cdot D2 \cdot M10$, $M1^T \cdot D3 \cdot M11$, $M2^T \cdot D5 \cdot M9$, $M2^T \cdot D6 \cdot M10$, $M3^T \cdot D9 \cdot M9$, $M3^T \cdot D10 \cdot M10$, $M4^T \cdot D13 \cdot M9$, $M5^T \cdot D17 \cdot M9$, and $M6^T \cdot D21 \cdot M9$, on at least one of the coefficients D1, D2, D3, D5, D6, D9, D10, D13, D17, and D21, and combining results of the performing.

Accordingly, a large data unit, e.g., a 16×16 or larger data unit, may be frequency-transformed and inversely frequency-transformed with respect to selective frequency-domains thereof, thereby reducing an amount and complexity of calculation.

FIG. 22 illustrates a transformation basis to be individually selected according to a frequency band of each transformation coefficient, and transformation coefficient blocks thereof according to another exemplary embodiment.

The selective frequency-domain transformer 12 and the selective frequency-domain inverse transformer 22 may select and use a transformation basis according to a frequency band of a transformation coefficient from among a plurality of transformation bases.

The selective frequency-domain transformer 12 may select a matrix M1 of a lowest frequency band from among matrices obtained by dividing a first 16×16 transformation basis 2210 in the units of four pixels and in a direction of a vertical frequency, a matrix M2 of a second lowest frequency band from among matrices obtained by dividing a second 16×16 transformation basis 2220 in the units of four pixels and in the direction of the vertical frequency, a matrix M3 of a third lowest frequency band from among matrices obtained by dividing a third 16×16 transformation basis 2230 in the units of four pixels and in the direction of the vertical frequency, and a matrix M4 of a highest frequency band from among matrices obtained by dividing a fourth 16×16 transformation basis 2240 in the units of four pixels and in the direction of the vertical frequency, as selective vertical transformation bases, and may select $M1^T, M2^T, M3^T$, and $M4^T$ obtained by respectively matrix-transposing the matrices M1 to M4, as selective horizontal transformation bases.

Thus, a 16×16 coefficient block 2250 of a 16×16 image data block X may be divided into sixteen 4×4 coefficient blocks D1 to D16 according to a frequency band. The coefficient blocks D1 to D16 may be obtained by respectively using the following transformation operations:

$D1=M1 \cdot X \cdot M1^T$, $D2=M1 \cdot X \cdot M2^T$, $D3=M1 \cdot X \cdot M3^T$, $D4=M1 \cdot X \cdot M4^T$;

$D5=M2 \cdot X \cdot M1^T$, $D6=M2 \cdot X \cdot M2^T$, $D7=M2 \cdot X \cdot M3^T$, $D8=M2 \cdot X \cdot M4^T$;

$D9=M3 \cdot X \cdot M1^T$, $D10=M3 \cdot X \cdot M2^T$, $D11=M3 \cdot X \cdot M3^T$, $D12=M3 \cdot X \cdot M4^T$;

$D13=M4 \cdot X \cdot M1^T$, $D14=M4 \cdot X \cdot M2^T$, $D15=M4 \cdot X \cdot M3^T$, $D16=M4 \cdot X \cdot M4^T$ Thus, the coefficient blocks D1 to D16 according to a frequency band may be obtained from only the matrices M1 to M4 instead of the 16×16 transformation bases 2210, 2220, 2230, and 2240. For example, if a coefficient other than '0' is present in only the coefficient blocks D1, D2, D3, D5, D6, and D9, then the selective frequency-domain transformer 12 may select one of the transformation bases M1 to M4 according to a frequency-domain, apply the selected transformation basis to the image data block X, and perform transformation operations, i.e., $D1=M1 \cdot X \cdot M1^T$, $D2=M1 \cdot X \cdot M2^T$, $D5=M2 \cdot X \cdot M1^T$, $D6=M2 \cdot X \cdot M2^T$, and $D9=M3 \cdot X \cdot M1^T$. The selective frequency-domain coefficient output unit 13 of FIG. 1 may output only data regarding the coefficient blocks D1, D2, D3, D5, D6, and D9.

The selective frequency-domain inverse transformer 22 may perform an inverse transformation on the coefficient blocks D1 to D16 by respectively using inverse transformation operations shown in the coefficient blocks D1 to D16 in the form of a parenthesis, illustrated in FIG. 22. That is, the selective frequency-domain inverse transformer 22 may reconstruct an image data block X' by applying a result of matrix-transposing selective vertical and horizontal transformation bases, which are used to perform a transformation, to a coefficient block received from among the coefficient blocks D1 to D16.

For example, if the coefficient receiver 21 receives only data regarding the coefficient blocks D1, D2, D3, D5, D6, and D9, then the selective frequency-domain inverse transformer 22 may reconstruct the image data block X' by respectively performing the inverse transformation operations, i.e., $M1^T \cdot D1 \cdot M1$, $M1^T \cdot D2 \cdot M2$, $M1^T \cdot D3 \cdot M3$, $M2^T \cdot D5 \cdot M1$, $M2^T \cdot D6 \cdot M2$, and $M3^T \cdot D9 \cdot M1$, on the coefficient blocks D1, D2, D3, D5, D6, and D9, and then combining results of the performing.

Accordingly, the selective frequency-domain transformation/inverse transformation may be performed using different transformation bases corresponding to frequency bands, based on the characteristics of the frequency bands and a goal of the transformation/inverse transformation.

According to the above exemplary embodiments of FIGS. 11 to 22, a selective frequency-domain transformation/inverse transformation is performed using selective horizontal and vertical transformation bases selected based on a frequency band having a coefficient other than '0', a arbitrary-sized coefficient block, and coefficients. Thus, an amount and complexity of calculation are less than when a transformation or an inverse transformation is performed using general square transformation bases.

Methods of changing an order of scanning coefficients based on a frequency-domain, performed by the selective frequency-domain transformer 12 and the selective frequency-domain inverse transformer 22 according to exemplary embodiments, will now be described in detail with reference to FIGS. 23 to 33. FIGS. 23 to 31 illustrate an order of scanning coefficients included in each 8×8 coefficient block, according to exemplary embodiments.

FIG. 23 illustrates a general order of scanning 8×8 transformation coefficients. Even if only coefficients D1, D2, D9, D10, D13, D14, D17, D19, D26, and D27 are not '0' from among coefficients included in an 8×8 transformation coefficient block 2310, a coefficient length from the coefficient D1 to the coefficient D16 is '27' according to the general order of scanning.

Figure 24:
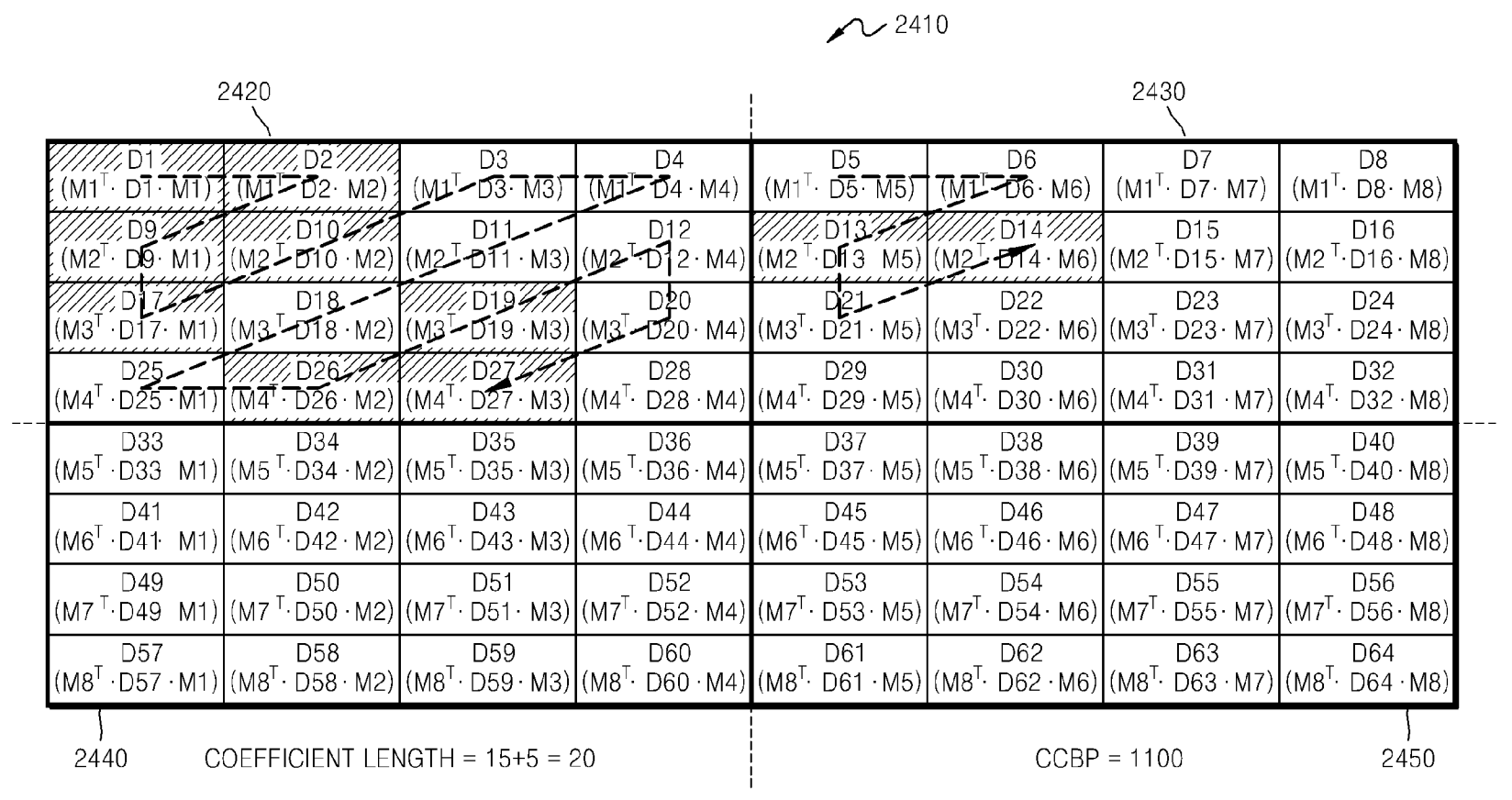

FIG. 24 illustrates an order of scanning 8×8 transformation coefficients according to a frequency band, according to an exemplary embodiment.

The video encoding apparatus 10 of FIG. 1 may set a coefficient scanning order in such a manner that coefficients are scanned in the units of coefficient blocks generated according to a frequency band. For example, if two coefficient blocks 2420 and 2430 of a vertical low-frequency band include coefficients other than '0' from among coefficient blocks 2420, 2430, 2440, and 2450 obtained by dividing an 8×8 coefficient block 2410 into four parts, then the coefficient scanning order may be set in such a manner that these coefficients are individually scanned in the units of blocks.

Also, the video decoding apparatus 20 of FIG. 2 may read and decode coefficients of received coefficient blocks, which are divided according to a frequency band, by individually scanning the coefficients in the units of coefficient blocks. A coefficient length, i.e., a total number of coefficients other than '0', which are obtained by dividing an 8×8 coefficient block 2410 into four sub blocks and individually scanning the four sub blocks, is 15+5=20.

The video encoding apparatus 10 may set and code coefficient block pattern information indicating whether a coefficient block including generated frequency-band coefficients includes a coefficient other than '0'. The coded coefficient block pattern (CCBP) information consists of bits arranged in the order that coefficient blocks are arranged in a zigzag pattern so as to indicate whether the coefficient blocks include coefficients other than '0'. For example, when the coefficient blocks 2420 and 2430 of a vertical low-frequency band from among the coefficient blocks 2420, 2430, 2440, and 2450 include coefficients other than '0', the CCBP information regarding the 8×8 coefficient block 2410 may be set to '1100'.

Also, the video decoding apparatus 20 of FIG. 2 may determine a coefficient block including a coefficient other than '0' by receiving and reading the CCBP information. The video decoding apparatus 20 may also determine locations of the coefficient blocks 2420 and 2430, which are determined to include coefficients other than '0' based on the CCBP information, and determine locations of scanned coefficients of the coefficient blocks 2420 and 2430.

Figure 25:
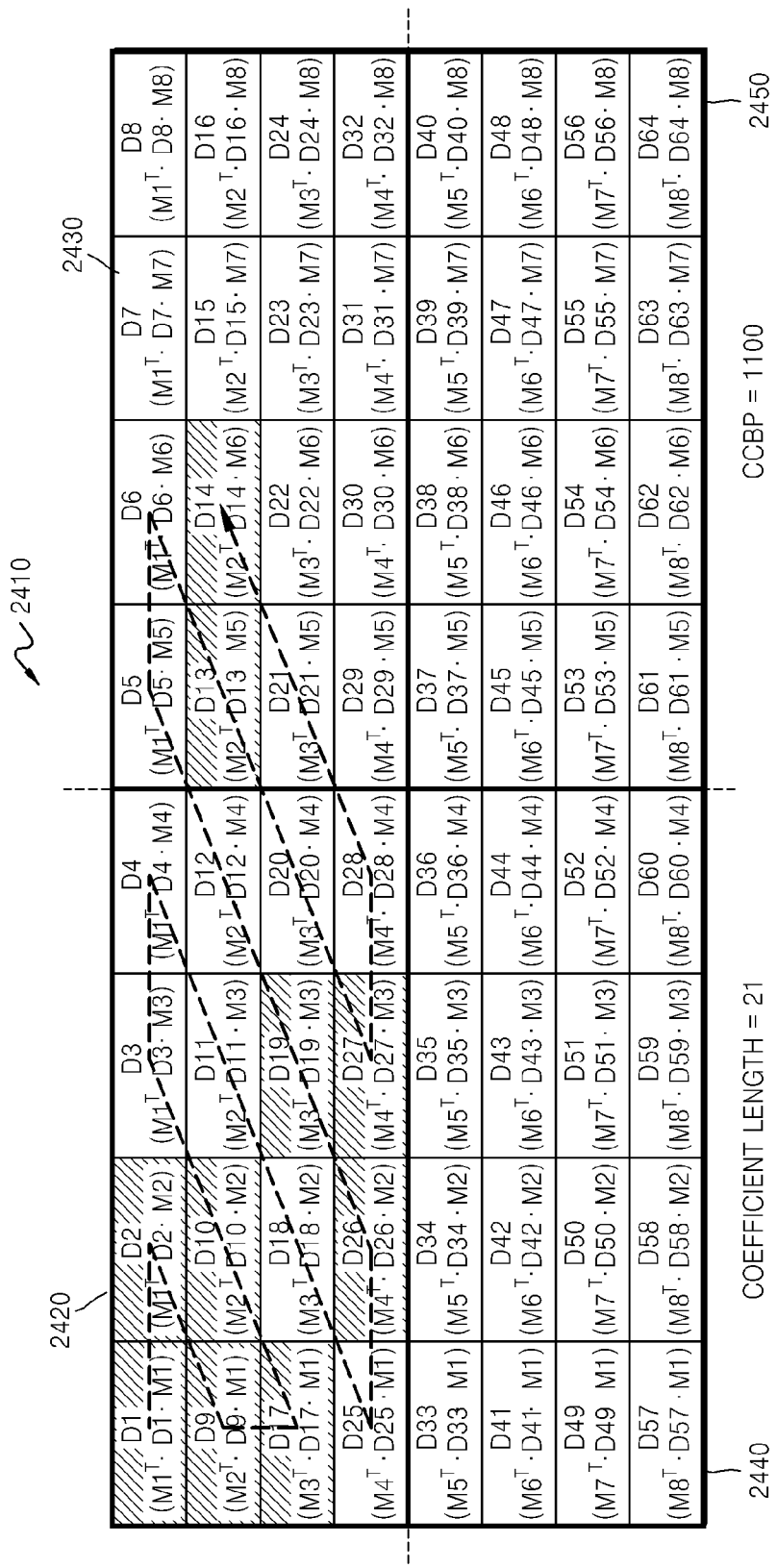
FIG. 25 illustrates an order of scanning 8×8 transformation coefficients in an entire frequency band, according to another exemplary embodiment.

FIG. 25 illustrates an order of scanning 8×8 transformation coefficients in an entire frequency band, according to another exemplary embodiment.

The video encoding apparatus 10 of FIG. 1 may set a coefficient scanning order in such a manner that coefficients of all coefficient blocks generated according to a frequency band are scanned together. For example, the coefficient scanning order may be set in such a manner that coefficients of two coefficient blocks 2420 and 2430 included in an 8×8 coefficient block 2410 may be continuously scanned. In this case, a coefficient length, the number of coefficients continuously scanned from a DC component coefficient to a highest frequency coefficient other than '0' may be '21'.

The video decoding apparatus 20 of FIG. 2 may read and decode coefficients of received coefficient blocks divided according to a frequency band, in the order that the coefficients other than '0' are scanned together in series from coefficient blocks 2420 to 2450 divided from the coefficient block 2410.

FIG. 26 illustrates an order of scanning 8×8 transformation coefficients except for coefficients corresponding to a middle frequency band, according to another exemplary embodiment. The video decoding apparatus 10 of FIG. 1 may change a coefficient scanning order in such a manner that coefficient blocks of frequency bands other than a predetermined frequency band from among all of coefficients of image data may be scanned. For example, the coefficient scanning order may be set in such a manner that coefficients included in a coefficient block 2620 of vertical and horizontal lowest frequency bands and a coefficient block 2650 of vertical and horizontal highest frequency bands may be continuously scanned from among 8×8 coefficient blocks 2620, 2630, 2640, and 2650 obtained by dividing an 8×8 coefficient block 2610 into four parts, except for the coefficient blocks 2630 and 2640 each including coefficients of '0'. In this case, coded coefficient block pattern (CCBP) information may be set to '1001' and a coefficient length from a DC component coefficient D1 of a lowest frequency band to a coefficient D54 is '25'.

The video decoding apparatus 20 of FIG. 2 may read and decode all of coefficients of received coefficient blocks in the order that the coefficients other that '0' are continuously scanned from coefficient blocks 2620 to 2650 divided from the coefficient block 2410. In this case, the video decoding apparatus 20 may receive and read coded coefficient block pattern (CCBP) information, and determine that the received coefficients belong to the 8×8 coefficient blocks 2620 and 2650 included in the 8×8 coefficient block 2610.

Figure 27:
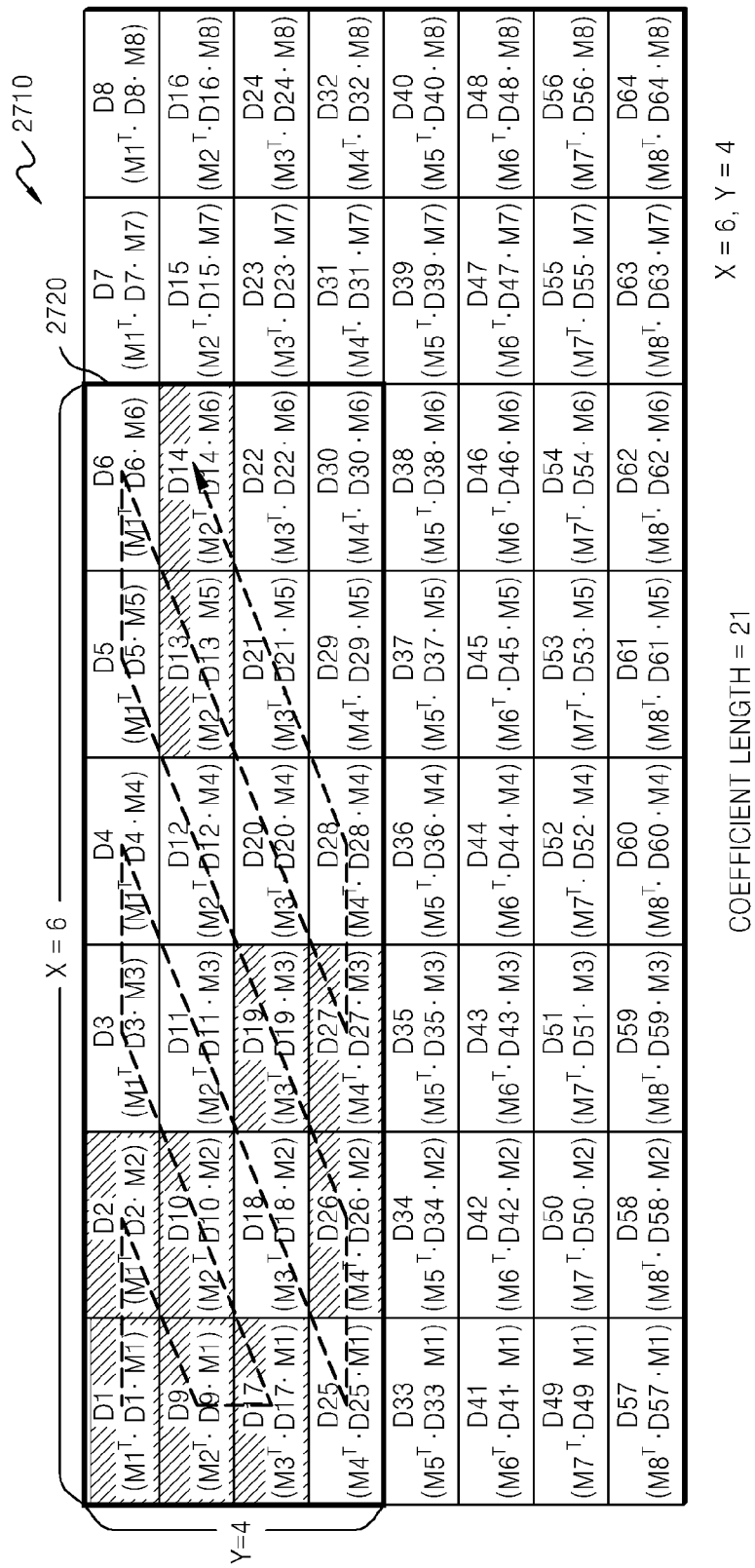
FIG. 27 illustrates expressing information regarding an order of scanning 8×8 transformation coefficients by using horizontal and vertical sizes of a coefficient block, according to an exemplary embodiment.

FIG. 27 illustrates expressing information regarding an order of scanning 8×8 transformation coefficients by using horizontal and vertical sizes of a coefficient block, according to an exemplary embodiment.

The video encoding apparatus 10 of FIG. 1 may encode information regarding a coefficient block size corresponding to a coefficient scanning range. The information regarding the coefficient block size may be expressed with a horizontal index X and a vertical index Y. For example, if coefficients D1, D2, D9, D10, D13, D14, D17, D19, D26, and D27 included in an 8×8 coefficient block 2710 are not '0', the information regarding the coefficient block size may be set to X=6 and Y=4 so as to determine the coefficient scanning range. A coefficient length from a DC component coefficient D1 of a lowest frequency band to a coefficient D14 is '21'.

The video decoding apparatus 20 of FIG. 2 may determine a coefficient block including coefficients to be scanned, based on the information regarding the coefficient block size.

FIG. 28 illustrates an order of scanning 8×8 transformation coefficients, according to another exemplary embodiment. The video encoding apparatus 10 of FIG. 1 may express information regarding coefficient block size with a horizontal index X and a vertical index Y. For example, a coefficient length for scanning coefficients D1, D9, D17, and D25 that are not '0' and are included in an 8×8 coefficient block 2810 is '10'.

The video decoding apparatus 20 of FIG. 2 may determine a coefficient block including coefficients to be scanned by obtaining the horizontal and vertical indexes X and Y, based on the information regarding the coefficient block size.

FIG. 29 illustrates a method of expressing information regarding an order of scanning 8×8 transformation coefficients by using a vertical or horizontal size of a coefficient block, according to another exemplary embodiment.

The video encoding apparatus 10 of FIG. 1 may express information regarding coefficient block size with a horizontal index X or a vertical index Y. For example, if coefficients D1, D9, D17, and D25 of an 8×8 coefficient block 2810 are not '0', then a coefficient block 2920 that is to be scanned may be determined only based on the vertical index Y, e.g., '4'.

The video decoding apparatus 20 of FIG. 2 may determine the coefficient block 2920 that is to be scanned by extracting only the vertical index Y, e.g., '4', from the information regarding the coefficient block size, so as to scan the received coefficients D1, D9, D17, and D25. In this case, a coefficient length of the coefficient block 29200 is reduced to '4'.

FIG. 30 illustrates an order of scanning 8×8 transformation coefficients, according to another exemplary embodiment. If coefficients D1, D9, D10, D11, D25, D34, and D42 of an 8×8 coefficient block 3010 are not '0', a coefficient length is '23' based on a general coefficient scanning order based on a zigzag pattern.

FIG. 31 illustrates a method of expressing information regarding an order of scanning 8×8 transformation coefficients by expressing vertical and horizontal indexes of a coefficient block as multiples of '2', according to another exemplary embodiment.

The video encoding apparatus 10 of FIG. 1 may express information regarding coefficient block size by setting a horizontal index X or a vertical index Y to multiples of '2'. For example, if coefficients D1, D9, D10, D11, D25, D34, and D42 of an 8×8 coefficient block 3110 are not '0', only a coefficient block 3120 including the coefficients D1, D9, D10, D11, D25, D34, and D42 may be encoded. The horizontal and vertical indexes X and Y may be set to '4' and '6' which are multiples of '2', as information regarding a size of the coefficient block 3120. In this case, a coefficient length is '19'.

The video decoding apparatus 20 of FIG. 2 may determine a size of a coefficient block including received coefficients, based on received information regarding coefficient block size. The horizontal and vertical indexes X and Y set to multiples of '2' may be extracted from the information regarding the coefficient block size. For example, if the horizontal index X=4 and the vertical index Y=6 are extracted from the information regarding the coefficient block size, size and location of a coefficient block 3120 of the coefficient block 3110, which includes the coefficients D1, D9, D10, D11, D25, D34, and D42, may be determined based on the extracted indexes.

FIG. 32 illustrates a method of changing an order of scanning 8×8 transformation coefficients based on frequency characteristics of each frequency band, according to another exemplary embodiment. An a×b vertical transformation basis matrix corresponding to an a/b vertical frequency band included in a lower part of a vertical frequency band may be selected from a b×b vertical transformation basis matrix 3210. Similarly, a c×d horizontal transformation basis matrix corresponding to a d/c horizontal frequency band included in a lower part of a horizontal frequency band may be selected from a c×c horizontal transformation basis matrix 3220.

If a transformation is performed by applying the b×b vertical transformation basis matrix 3210 and the c×c horizontal transformation basis matrix 3220 to b×c image data, then a b×c coefficient block 3230 is obtained.

When a transformation basis selected based on a selective frequency-domain according to an exemplary embodiment is used, then a transformation may be performed by applying the a×b vertical transformation basis matrix 3210 and the c×d horizontal transformation basis matrix 3220 to the b×c image data. According to an order of individually scanning coefficients of coefficient blocks 3240, 3250, and 3260 generated based on the above method in the units of coefficient blocks, a coefficient length from a DC component coefficient to a highest frequency coefficient other than '0' is '24'.

The video encoding apparatus 10 of FIG. 1 and the video decoding apparatus 20 of FIG. 2 may individually change a coefficient scanning order with respect to each of the coefficient blocks 3240, 3250, and 3260. For example, if it is determined that a vertical frequency band prevails according to frequency characteristics of the coefficient block 3260, then the coefficient scanning order of the coefficient block 3260 may be changed into a scanning order shown in the coefficient block 3270.

Figure 33:
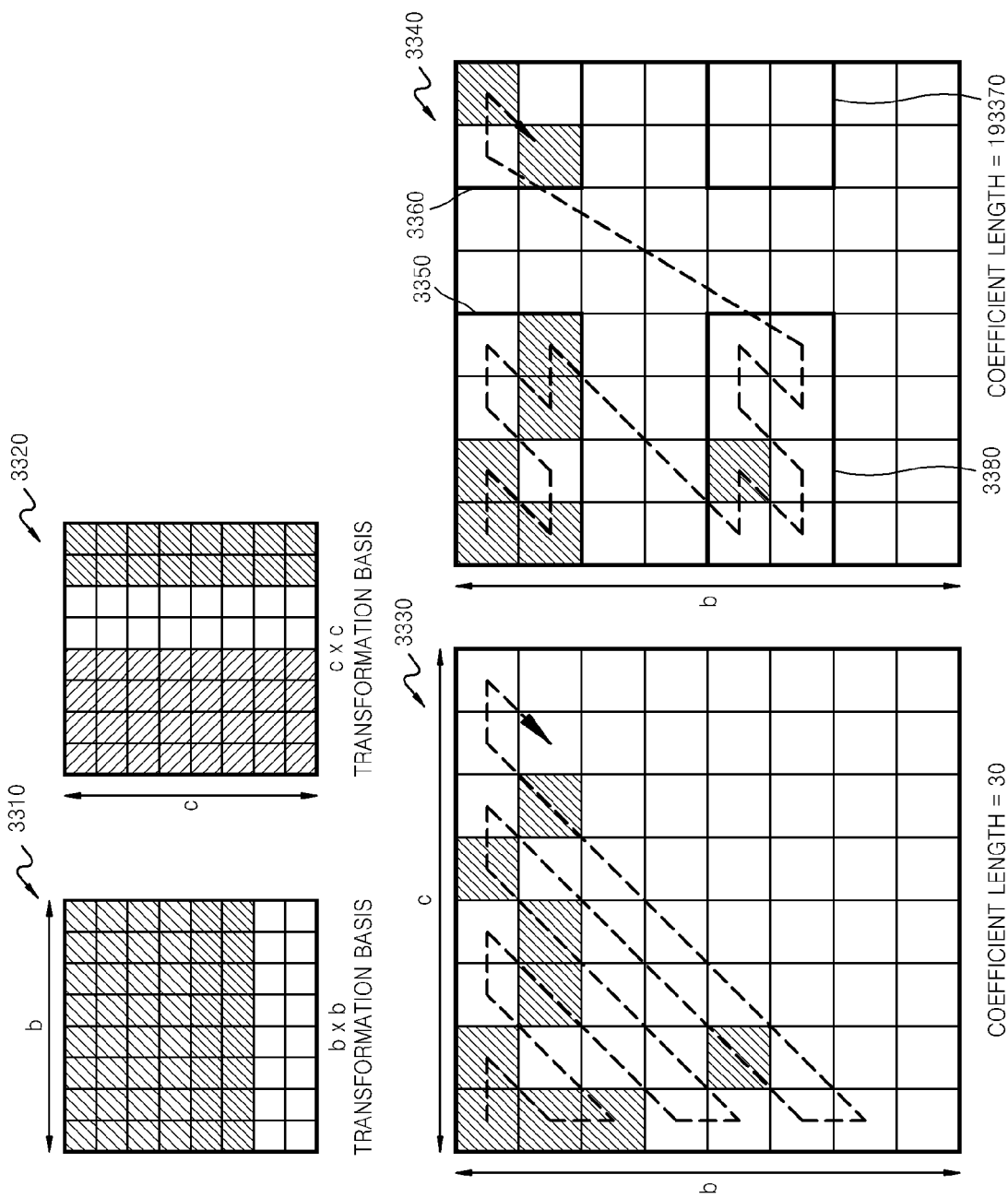
FIG. 33 illustrates an order of scanning 8×8 transformation coefficients except for coefficients corresponding to a middle frequency band, according to another exemplary embodiment.

FIG. 33 illustrates an order of scanning 8×8 transformation coefficients except for coefficients corresponding to a middle frequency band, according to another exemplary embodiment. The video encoding apparatus 10 may select a selective vertical transformation basis according to a vertical frequency band from a b×b vertical transformation basis matrix 3310, and select a selective horizontal transformation basis according to a horizontal frequency band from a c×c horizontal transformation basis matrix 3320.

If a transformation is applied to b×c image data, b×c coefficient blocks 3330 and 3340 are obtained. In order to scan coefficients other than '0' of the coefficient block 3330, a coefficient length from a DC component coefficient to a highest frequency coefficient is '30'.

When transformation bases selected based on a selective frequency-domain according to an exemplary embodiment is used, then a transformation may be performed by applying a selective vertical transformation basis and a selective horizontal transformation basis to the b×c image data. For example, selective vertical transformation bases may be selected by dividing a vertical frequency band of the b×b vertical transformation basis matrix 3310 into four frequency bands and excluding second and fourth frequency bands from among the four frequency bands, and selective horizontal transformation bases may be selected by dividing a horizontal frequency band of the c×c horizontal transformation basis matrix 3320 into four frequency bands and excluding a third frequency band from among the four frequency bands.

Coefficient blocks 3350, 3360, 3370, and 3380 may be obtained by performing a transformation by using selective vertical and horizontal transformation bases according to an exemplary embodiment. In the coefficient block 3340, an order of scanning the coefficient blocks 3350 to 3380 each including coefficients other than '0' according to a frequency band may be set so that the coefficients of the coefficient blocks 3350, 3360, 3370, and 3380 may be continuously scanned. In this case, a coefficient length may be reduced to '19'.

Figure 34:
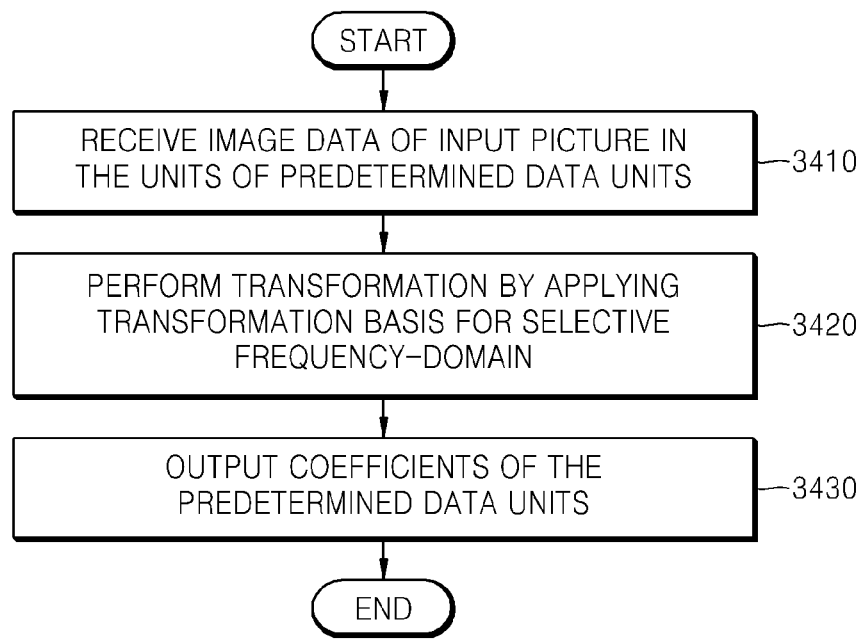
FIG. 34 is a flowchart illustrating a video encoding method using the selective frequency-domain transformation to perform the low-complexity transformation, according to an exemplary embodiment.

FIG. 34 is a flowchart illustrating a video encoding method using the selective frequency-domain transformation to perform the low-complexity transformation, according to an exemplary embodiment.

In operation 3410, image data of an input picture is received in units of predetermined data units. If the input picture is to be encoded according to a video encoding method based on hierarchical data units of each image region, image data of a transformation unit may be received.

In operation 3420, a transformation may be performed by applying transformation bases for a predetermined frequency-domain to the received data, thereby obtaining coefficients of a selective frequency-domain. The predetermined frequency-domain may include a predetermined frequency band, predetermined-sized coefficient blocks, predetermined coefficients, and the other bands excluding the predetermined frequency band. The coefficients of the selective frequency-domain may be generated from transformation bases by applying selective vertical and horizontal transformation bases corresponding to the predetermined frequency-domain to the received data. Square or rectangular transformation bases may be used, and the vertical and horizontal transformation bases may be selected from among different transformation bases or may be selected to correspond to different frequency bands.

In operation 3430, coefficients generated with respect to the predetermined data units of the input picture may be output. A coefficient scanning order may be changed in such a manner that coefficients selectively generated in the units of frequency bands in a whole coefficient block may be scanned, and the coefficients may be output according to the changed coefficient scanning order. Also, information regarding details of the selective frequency-domain transform, e.g., types of transformation bases and a selected frequency band, coded coefficient block pattern (CCBP) information indicating whether a coded coefficient block includes a coefficient other than '0', and information regarding a coefficient scanning order may be encoded and transmitted.

Figure 35:
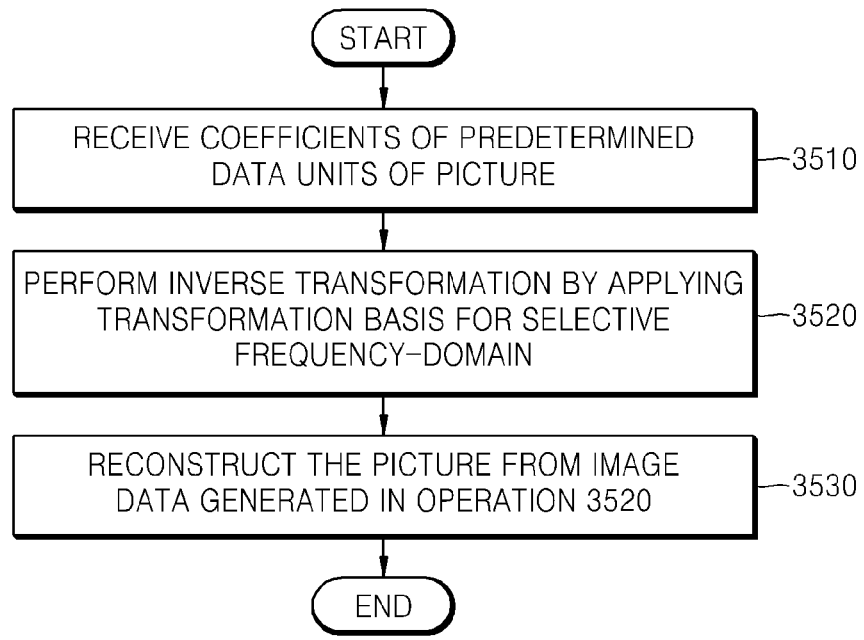
FIG. 35 is a flowchart illustrating a video decoding method using the selective frequency-domain inverse transformation to perform the low-complexity inverse transformation, according to an exemplary embodiment.

FIG. 35 is a flowchart illustrating a video decoding method using the selective frequency-domain inverse transformation to perform the low-complexity inverse transformation, according to an exemplary embodiment.

In operation 3510, coefficients of predetermined data units of a picture are received. Also, information regarding details of a selective frequency-domain transform, e.g., types of transformation bases and a selected frequency band, coded coefficient block pattern (CCBP) information indicating whether a coded coefficient block includes a coefficient other than '0', and information regarding a coefficient scanning order may further be received. The received coefficients may be read in a changed coefficient scanning order, based on the CCBP information and the information regarding the coefficient scanning order.

In operation 3520, an inverse transformation is performed by applying transformation bases for a predetermined frequency-domain to the received coefficients, thereby obtaining image data in the predetermined data units.

When information regarding a selective frequency-domain and the information regarding the coefficient scanning order are received, locations of the received coefficients may be determined based on these information. Also, the inverse transformation may be performed on the received coefficients by detecting information regarding transformation bases applied in the units of selected frequency-domains. The original image data may also be reconstructed by performing the inverse transformation on only the received coefficients.

In operation 3530, the picture is reconstructed from the image data generated in operation 3520.

A video encoding method and apparatus and a video decoding method and apparatus that use the sub data unit transformation which is another type of the low-complexity transformation according to exemplary embodiments, will be described with reference to FIGS. 36 to 42.

Figure 36:
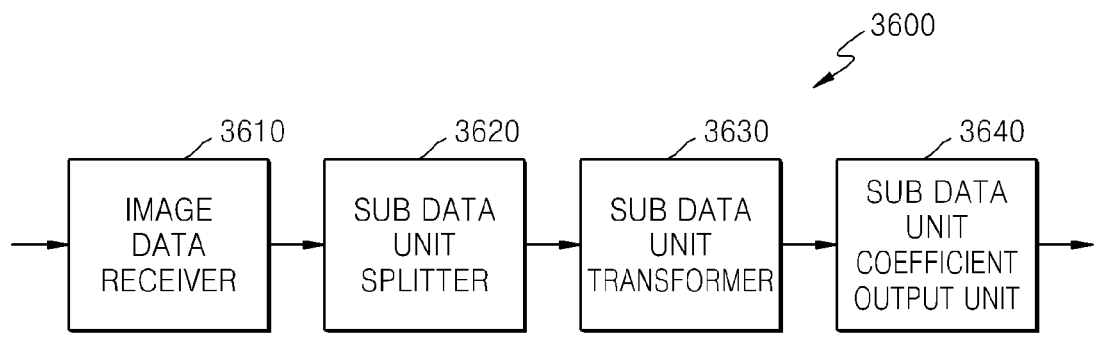
FIG. 36 is a block diagram of a video encoding apparatus using the sub data unit transformation to perform the low-complexity transformation, according to another exemplary embodiment.

FIG. 36 is a block diagram of a video encoding apparatus 3600 using the sub data unit transformation to perform the low-complexity transformation, according to another exemplary embodiment.

The video encoding apparatus 3600 includes an image data receiver 3610, a sub data unit division unit 3620, a sub data unit transformer 3630, and a sub data unit coefficient output unit 3640.

The image data receiver 3610 receives image data of an input picture in predetermined data units. The predetermined data units may be obtained by dividing the image data of the input picture into predetermined-sized blocks so as to perform a transformation thereon. The image data in the predetermined data units may be square or rectangular data blocks.

The sub data unit division unit 3640 divides the received data in the units of a plurality of sub data units. The sub data unit transformer 3630 may generate coefficients for the sub data units by performing a transformation by individually selecting and applying transformation bases to the plurality of sub data units. The sub data unit coefficient output unit 3640 may output the coefficients of the predetermined data units of the input picture.

The video encoding apparatus 3600 may change a coefficient scanning order in such a manner that coefficients of coefficient blocks generated in the units of sub data units may be scanned and encoded. For example, the coefficient scanning order may be changed in such a manner that coefficient blocks for the sub data units may be individually scanned from among a total of coefficients of the received data, all of coefficients of the coefficient blocks may be continuously scanned, or coefficient blocks other than the coefficient blocks for the sub data unit may be scanned.

The video encoding apparatus 3600 may encode information regarding sizes of the sub data units for performing coefficient scanning. The video encoding apparatus 3600 may further encode coefficient block pattern information indicating whether the coefficient blocks of the sub data units include coefficients other than '0'. The video encoding apparatus 3600 may change a coefficient scanning order for performing entropy-encoding according to a changed coefficient scanning order. The sub data unit coefficient output unit 3640 may output the coefficients generated in the units of the sub data units, based on the changed coefficient scanning order.

The video encoding apparatus 3600 may encode and transmit information regarding details of the sub data unit transformation, such as the sizes and number of the sub data units and types of transformation bases corresponding to the sub data units.

For division-combining transformation, the sub data unit transformer 3630 may combine the coefficients corresponding to the sub data units that are obtained through the sub data unit transformation, and then output a result of the combining. For example, the division-combining transformation may be performed by combining the corresponding coefficients or performing a transformation thereon in the units of the sub data units. That is, the sub data unit transformation and the division-combining transformation may be continuously performed.

When the video encoding apparatus 3600 is used to perform video encoding based on hierarchical data units for each image region, the image data input in the predetermined data units to the image data receiver 3610 may be a residual component of a current coding unit included in a current maximum coding unit.

Figure 37:
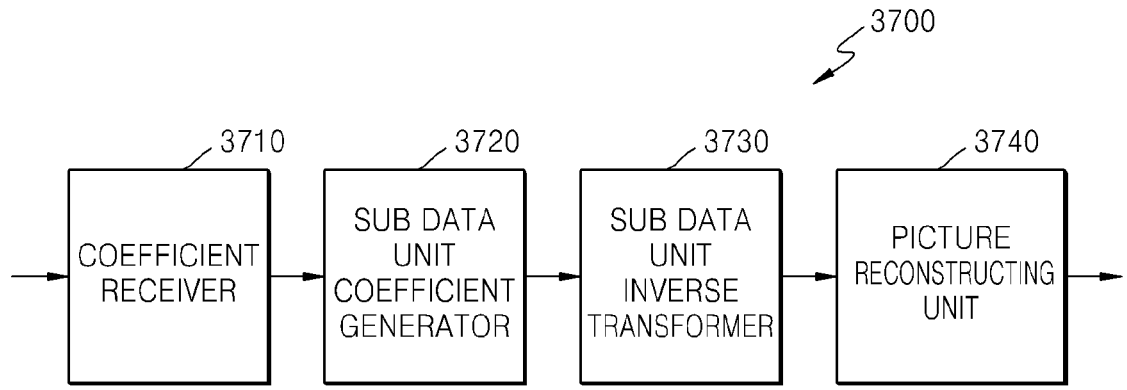
FIG. 37 is a block diagram of a video decoding apparatus using the sub data unit inverse transformation to perform the low-complexity inverse transformation, according to another exemplary embodiment.

FIG. 37 is a block diagram of a video decoding apparatus 3700 using the sub data unit inverse transformation to perform the low-complexity inverse transformation, according to another exemplary embodiment.

The video decoding apparatus 3700 includes a coefficient receiver 3710, a sub data unit coefficient generator 3720, a sub data unit inverse transformer 3730, and a picture reconstructing unit 3740.

The coefficient receiver 3710 may receive coefficients of predetermined data units of a picture. The predetermined data units including the received coefficients may be obtained by dividing coefficients of image data of the picture so as to perform an inverse transformation.

The sub data unit coefficient generator 3720 may generate coefficients of a plurality of sub data units from the coefficients received via the coefficient receiver 3710. The sub data unit inverse transformer 3730 may receive the coefficients of the sub data units from the sub data unit coefficient generator 3720, and generate image data in the predetermined data units by performing an inverse transformation by individually selecting and applying transformation bases to the received coefficients. The picture reconstructing unit 3740 reconstructs the picture from the generated image data.

The video decoding apparatus 3700 may receive and read information regarding details of the sub data unit transformation, such as the sizes and number of the sub data units and types of transformation bases corresponding to the sub data units.

The video decoding apparatus 3700 may analyze a changed coefficient scanning order by receiving and reading information regarding a coefficient scanning order. The video decoding apparatus 3700 may change the coefficient scanning order in such a manner that coefficients in received coefficient blocks of the sub data units may be individually or continuously scanned.

The video decoding apparatus 3700 may further receive information regarding coefficient block size information for performing coefficient scanning. The video decoding apparatus 3700 may receive coded coefficient block pattern (CCBP) information indicating whether a coefficient block including coefficients generated according to a frequency band includes a coefficient other than '0'.

In this case, the video decoding apparatus 3700 may change the coefficient scanning order in such a manner that only a coefficient block including a coefficient other than '0' may be scanned, based on the CCBP information.

If the sub data unit coefficient generator 3720 receives coefficients obtained by performing a division-combining transformation, then the sub data unit coefficient generator 3720 may copy the coefficients a number of times corresponding to the number of the sub data units and classify the coefficients according to the sub data units. Otherwise, the sub data unit coefficient generator 3720 may classify coefficients, which are obtained by performing a division-combining transformation, into a plurality of sub data units by performing an inverse transformation the coefficients.

Figure 38:
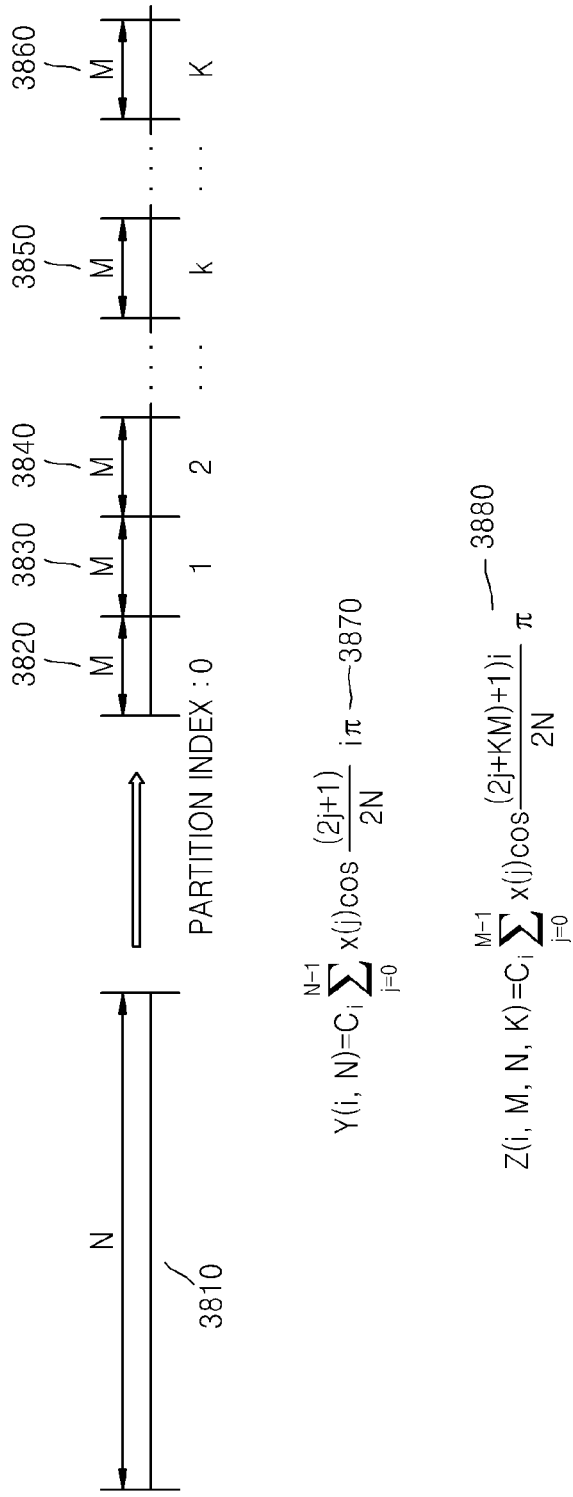
FIG. 38 illustrates a concept of the sub data unit transformation according to an exemplary embodiment.

FIG. 38 illustrates a concept of the sub data unit transformation, according to an exemplary embodiment. The video encoding apparatus 3600 of FIG. 36 and the video decoding apparatus 3710 of FIG. 37 may employ a sub data unit transformation/inverse trans that will now be described with reference to FIG. 38.

For convenience of explanation, a transformation/inverse transformation performed on one-dimensional (1D) data will be described with reference to FIG. 38. Two-dimensional (2D) data may be frequency-transformed or inversely frequency-transformed by continuously performing the transformation/inverse transformation performed on one-dimensional (1D) data in directions of horizontal and vertical frequencies.

Image data 3810 having a sample length N is divided into K sub data units each having a sample length M and the transformation is performed on the K sub data units so as to obtain coefficient partitions 3820, 3830, 3840, 3850, . . . , through to 3860 for the K sub data units. The K sub data units may be divided according to the sample length M in an order of samples of the image data 3810 or may be classified to include M samples according to a predetermined division rule. Partition indexes 0, 1, 2, . . . , k, . . . , through to K are respectively assigned to the coefficient partitions 3820, 3830, 3840, 3850, . . . through to 3860.

An equation 3880 of the sub data unit transformation according to an exemplary embodiment is an equation of a transformation performed on the sub data unit having a sample length M and assigned the partition index K, compared to an equation 3870 of a transformation performed on data having a sample length N, based on a discrete cosine transformation (DCT).

Specifically, in the equation 3880, 'x(j)' denotes data corresponding to the sub data unit having the sample length M and assigned the partition index K, and 'Z(i, M, N, K)' denotes a coefficient partition assigned the partition index K of this sub data unit. In the equation 3880, if the partition index K included in 'Z(i, M, N, K)' is replaced with 'k(=0, 1, 2, . . . , K)', then a result of the replacing, i.e., Z(i, M, N, k), denotes a transformation coefficient of a sub data unit assigned to an arbitrary partition index.

A coefficient partition, Z(i, M, N, k) obtained by performing the sub data unit transformation may be inversely frequency-transformed by using an inverse operation of the equation 3880.

The coefficient partition, Z(i, M, N, k) based on the equation 3880 denotes a result of applying a DCT basis to transformation bases for all of the sub data units assigned the partition indexes 0, 1, 2, . . . , k, . . . , through to K, but the sub data unit transformation according to an exemplary embodiment may use transformation bases individually selected for all of the sub data units.

Thus, the video encoding apparatus 3600 may perform a transformation on a plurality of sub data units divided from a spatial domain of image data so as to generate coefficients corresponding to the plurality of sub data units. The video decoding apparatus 3700 may reconstruct the original image data by performing an inverse transformation on coefficients of a plurality of sub data units and combining a result of the performing in a spatial domain.

An amount and complexity of calculation may be less when one large data unit is divided into a predetermined number of small data units and a transformation or an inverse transformation is individually performed on the predetermined number of small data units than when the transformation or the inverse transformation is directly performed on the large data unit. Thus, an amount and complexity of calculation when the transformation and the inverse transformation are performed may be reduced by using the video encoding apparatus 3600 and the video decoding apparatus 3710.

Figure 39:
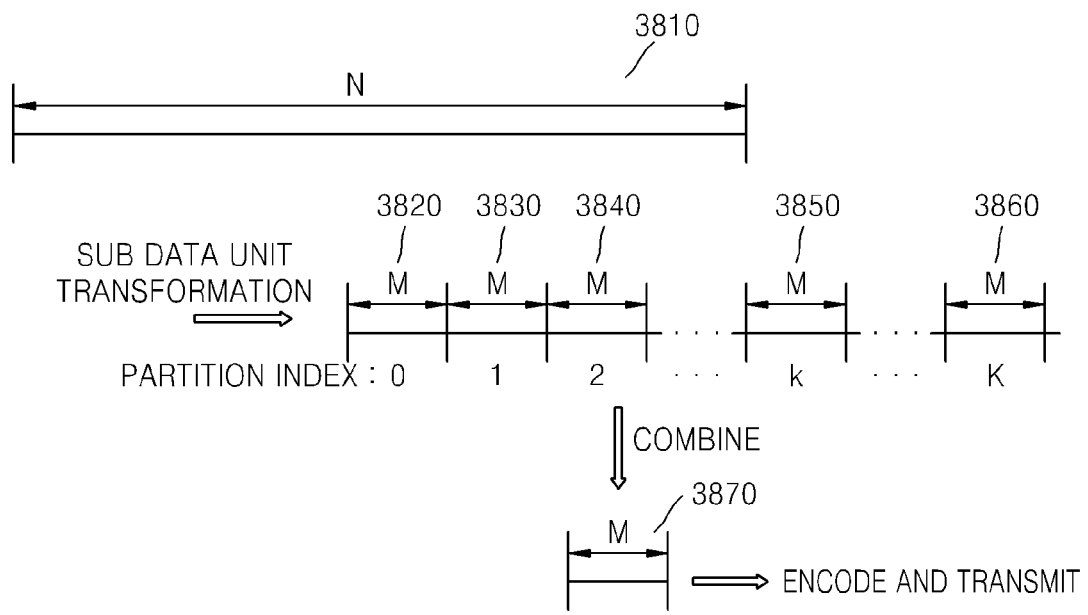
FIG. 39 illustrates a concept of a division-combining transformation using the sub data unit transformation, according to an exemplary embodiment.

FIG. 39 illustrates a concept of a division-combining transformation using the sub data unit transformation, according to an exemplary embodiment. In the division-combining transformation according to an exemplary embodiment, a large spatial domain is divided into a plurality of small spatial domains and transformation coefficients of the small spatial domains are combined to obtain transformation coefficients of one frequency-domain. The transformation coefficients of the plurality of small spatial domains may also be generated by performing the sub data unit transformation described above with reference to FIG. 38.

That is, a coefficient partition 3970 having a sample length M may be generated by dividing image data 3810 having a sample length N into K sub data units each having a sample length M and then combining K coefficient partitions 3820, 3830, 3840, . . . , 3850, . . . , through to 3860 obtained by performing the sub data unit transformation. In this case, the K coefficient partitions 3820, 3830, 3840, . . . , 3850, . . . through to 3860 may be combined by simply summing these coefficient partitions or performing another transformation on these coefficient partitions.

The video encoding apparatus 3600 may encode and transmit the coefficient partition 3970 having a sample length M.

Figure 40:
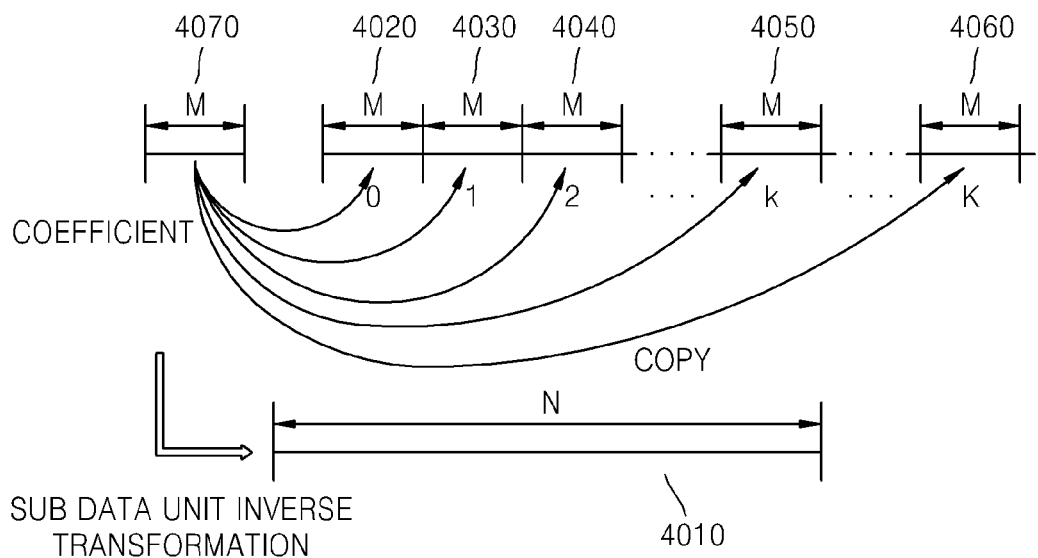
FIG. 40 illustrates a concept of a division-combining inverse transformation using the sub data unit transformation, according to an exemplary embodiment.

FIG. 40 illustrates a concept of a division-combining inverse transformation using the sub data unit transformation, according to an exemplary embodiment. The video decoding apparatus 3700 of FIG. 37 may receive a coefficient partition 4070 having a sample length M. For the division-combining inverse transformation, K coefficient partitions 4020, 4030, 4040, . . . , 4050, . . . through to 4060 are reconstructed by separating coefficients of the coefficient partition 4070 having a sample length M, which are obtained by performing the division-combining transformation.

The sub data unit coefficient generator 3720 may reconstruct the K coefficient partitions 4020, 4030, 4040, . . . , 4050, . . . through to 4060 by copying the coefficients of the coefficient partition 4070 to corresponding coefficient locations of the K coefficient partitions 4020, 4030, 4040, . . . , 4050, . . . through to 4060 or by performing another inverse transformation on the coefficients of the coefficient partition 4070.

The sub data unit inverse transformer 3730 may reconstruct the original image data 4010 having a sample length N by performing the sub data unit inverse transformation on the K coefficient partitions 4020, 4030, 4040, . . . , 4050, . . . through to 4060.

FIG. 41 is a flowchart illustrating a video encoding method using the sub data unit transformation to perform the low-complexity transformation, according to another exemplary embodiment.

In operation 4110, image data of an input picture is received in the units of predetermined data units. The predetermined data units of the input picture may be data units for performing a transformation.

In operation 4120, the image data is divided into a plurality of sub data units. In operation 4130, coefficients for the sub data units are generated by performing a transformation by individually selecting and applying transformation bases to the plurality of sub data units. The equation 3880 of the sub data unit transformation described above with reference to FIG. 38 may be used.

In operation 4140, the coefficients for the sub data units are output. In this case, coefficient blocks corresponding to the sub data units may be combined and a result of the combining may be output by performing a division-combining transformation. Coefficients may be obtained and output through the division-combining transformation by combining or performing another transformation on the coefficient blocks corresponding to the sub data units. Also, information regarding a coefficient scanning order, information regarding details of the sub data unit transformation, and coded coefficient block pattern (CCBP) information, may be encoded and output.

FIG. 42 is a flowchart illustrating a video decoding method using the sub data unit inverse transformation to perform the low-complexity inverse transformation, according to another exemplary embodiment. In operation 4210, coefficients of predetermined data units of a picture are received. Also, information regarding details of the sub data unit transformation, e.g., types of transformation bases and a number and lengths of sub data units, coded coefficient block pattern (CCBP) information indicating whether a coded coefficient block includes a coefficient other than '0', and information regarding a coefficient scanning order may be received. The received coefficients may be read in a changed coefficient scanning order, based on the CCBP information and the information regarding the coefficient scanning order.

In operation 4220, coefficients of a plurality of sub data units are generated from the coefficients received in operation 4210. If coefficients obtained by performing a division-combining transformation are received, then the coefficient may be classified into a plurality of sub data units by copying the received coefficients a number of times corresponding to the number of the sub data units. Otherwise, the coefficients obtained through the division-combining transformation may be classified into sub data units by performing another inverse transformation on the received coefficients.

In operation 4230, the coefficients for the sub data units are received and an inverse transformation is performed thereon by individually and selecting transformation bases to the coefficients, thereby obtaining image data in the predetermined data units. In operation 4240, the picture is reconstructed from the image data generated in operation 4230.

A video encoding method and apparatus and a video decoding method and apparatus that use the scale-down transformation which is another type of the low-complexity transformation according to exemplary embodiments, will be described with reference to FIGS. 43 to 46.

Figure 43:
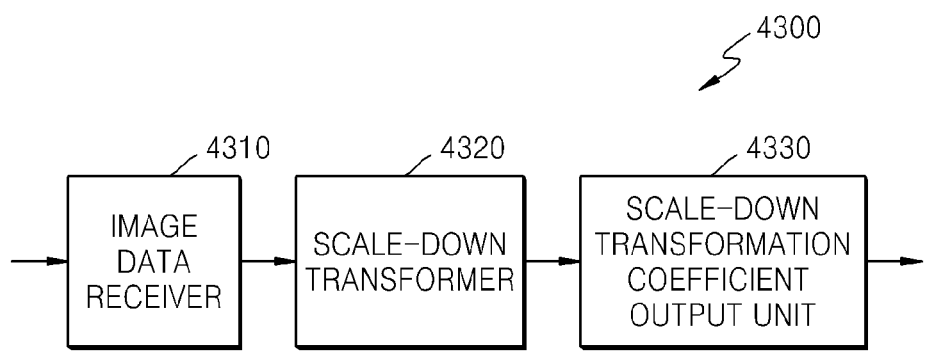
FIG. 43 is a block diagram of a video encoding apparatus using the scale-down transformation to perform the low-complexity transformation, according to another exemplary embodiment.

FIG. 43 is a block diagram of a video encoding apparatus 4300 using the scale-down transformation to perform the low-complexity transformation, according to another exemplary embodiment. The video encoding apparatus 4300 includes an image data receiver 4310, a scale-down transformer 4320, and a scale-down transformation coefficient output unit 4330.

The image data receiver 4310 may receive image data of an input picture in predetermined data units. The predetermined data units may be obtained by dividing the image data of the input picture into predetermined-sized blocks so as to perform a transformation thereon. The image data in the predetermined data units may be square or rectangular data blocks.

The scale-down transformer 4320 generates coefficients of the image data received from the image data receiver 4310 through the scale-down transformation by performing a transformation on the image data by using a rectangular transformation basis obtained by combining a rectangular matrix and a square matrix and scaling down a result of the combining. The scale-down transformation coefficient output unit 4330 outputs the coefficients received from the scale-down transformer 4320.

If a first size is greater than a second size and the image data receiver 4310 receives a data block, the width and height of which have the second size, then a scale-down transformation may be performed according to one of the following first to third exemplary embodiments.

According to the first exemplary embodiment, the scale-down transformer 4320 may perform a scale-down transformation by using a first rectangular transformation basis D=C·F, the width and height of which respectively have the first size and the second size, obtained from a combination of a transformation basis matrix C, the width and height of which have the first size and a scale-down spatial matrix F, the width and height of which respectively have the first size and the second size.

Thus, if the scale-down transformation is performed on the image data, the width and height of which have the second size, based on the first rectangular transformation basis D, then the image data is transformed into a spatial data block, the width and height of which have the first size through the scale-down spatial matrix F, and a transformation is performed using the transformation basis matrix C, thereby obtaining a transformation coefficient block, the width and height of which have the first size. The transformation basis matrix C may be a transformation basis matrix used to perform a sub data unit transformation according to an exemplary embodiment.

According to the second exemplary embodiment, the scale-down transformer 4320 may perform a scale-down transformation by using a second rectangular transformation basis D'=F'·C', the width and height of which respectively have the first size and the second size, obtained from a combination of a matrix F', the width and height of which respectively have the first size and the second size for selecting a predetermined frequency-domain and a transformation basis matrix C', the width and height of which have the second size.

Thus, if the scale-down transformation is performed on the image data, the width and height of which have the second size, based on the second rectangular transformation basis D', then a transformation is performed on the image data by using the transformation basis matrix C' to obtain a coefficient block, the width and height of which have the second size, and the matrix F' is used to select a frequency band having a ratio of the first size to the second size, thereby obtaining a transformation coefficient, the width and height of which have the first size.

According to the third exemplary embodiment, the scale-down transformer 4320 may perform a transformation on the image data block, the width and height of which have the second size by using a transformation basis matrix, the size of which is equal to that of the image data block and then quantize a result of the performing. Thus, the scale-down transformation may be performed by selectively using a scale-down transformation matrix, the width and height of which respectively have the first size and the second size only when all of high-frequency components are '0'.

According to the first to third exemplary embodiments, a transformation coefficient, the width and height of which have the first size is generated with respect to the image data, the width and height of which have the second size, thereby reducing an amount of calculation and a bit rate.

The video encoding apparatus 4300 may encode and transmit information regarding details of the scale-down transformation, e.g., types of divided transformation bases and various exemplary embodiments of the scale-down transformation.

The video encoding apparatus 4300 may change a coefficient scanning order in such a manner that only coefficients of a coefficient block generated may be scanned and encoded. For example, the coefficient scanning order may be changed in such a manner that coefficients of predetermined coefficient blocks from among all of the coefficients of the image data may be individually scanned in the units of coefficient blocks generated through the scale-down transformation, all of the coefficients of the generated coefficient blocks may be continuously scanned, or coefficient blocks other than coefficient blocks for predetermined sub data units may be scanned.

The video encoding apparatus 4300 may encode coefficient block size information for performing coefficient scanning. The video encoding apparatus 4300 may further encode coded coefficient block pattern (CCBP) information indicating whether each coefficient block includes a coefficient other than '0'. The video encoding apparatus 4300 may also change a coefficient scanning order for performing entropy-encoding, according to a changed coefficient scanning order. The scale-down transformation coefficient output unit 4330 may output the coefficients generated in the units of the sub data units, based on the changed coefficient scanning order.

Figure 44:
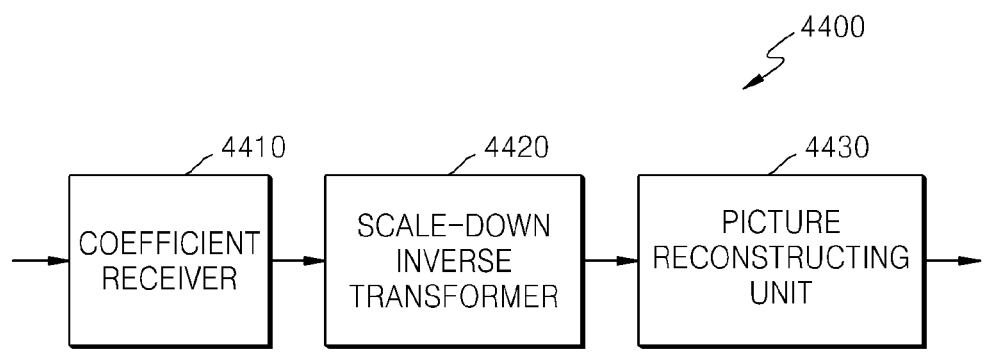
FIG. 44 is a block diagram of a video decoding apparatus using the scale-down inverse transformation to perform the low-complexity inverse transformation, according to another exemplary embodiment.

FIG. 44 is a block diagram of a video decoding apparatus 4400 using the scale-down inverse transformation to perform the low-complexity inverse transformation, according to another exemplary embodiment. The video decoding apparatus 4400 includes a coefficient receiver 4410, a scale-down inverse transformer 4420, and a picture reconstructing unit 4430.

The coefficient receiver 4410 may receive coefficients of predetermined data units of a picture. The coefficients of the predetermined data units may be a result of dividing coefficients of image data of the picture so as to perform an inverse transformation.

The scale-down inverse transformer 4420 may generate image data in the predetermined data units by performing an inverse transformation on the coefficients received via the coefficient receiver 4410 by using a scale-down rectangular transformation basis obtained by combining a rectangular matrix and a square matrix and scaling down a result of the combining.

The picture reconstructing unit 4430 reconstructs the picture from the image data generated by the scale-down inverse transformer 4420.

According to an exemplary embodiment, the scale-down inverse transformer 4420 may perform a scale-down inverse transformation by using a first rectangular transformation basis D=C·F, the width and height of which respectively have the first size and the second size, obtained from a combination of a transformation basis matrix C, the width and height of which have the first size and a scale-down spatial matrix F, the width and height of which respectively have the first size and the second size. The transformation basis matrix C may be a transformation basis matrix used to perform a sub data unit transformation according to an exemplary embodiment.

According to a second exemplary embodiment, the scale-down transformer 4420 may perform a scale-down inverse transformation by using a second rectangular transformation basis D'=F'·C', the width and height of which respectively have the first size and the second size, obtained from a combination of a matrix F', the width and height of which respectively have the first size and the second size for selecting a predetermined frequency-domain and a transformation basis matrix C', the width and height of which have the second size.

According to a third exemplary embodiment, if the coefficient receiver 4410 receives a coefficient block, the width and height of which have the first size and that is obtained by performing a scale-down transformation using a scale-down transformation matrix, the width and height of which respectively have the first size and the second size, then all of high-frequency components may be '0' when an inverse transformation is performed on an image data block, the width and height of which have the second size by using a transformation basis matrix that is equal to the coefficient block in terms of their sizes and a result of the performing is quantized. Thus, according to the third exemplary embodiment, the scale-down inverse transformer 4420 may reconstruct the image data block, the width and height of which have the second size by using only the received coefficient block, the width and height of which have the first size.

The video decoding apparatus 4400 may receive and read information regarding details of the scale-down transformation, e.g., types of divided transformation bases and various exemplary embodiments of the scale-down transformation. The scale-down inverse transformer 4420 may perform an inverse transformation based on the read information.

Also, information regarding details of a selective frequency-domain transform, e.g., types of transformation bases and a selected frequency band, coded coefficient block pattern (CCBP) information indicating whether a coded coefficient block includes a coefficient other than '0', and information regarding a coefficient scanning order may further be received. The received coefficients may be read in a changed coefficient scanning order, based on the CCBP information and the information regarding the coefficient scanning order.

The scale-down inverse transformer 4420 may generate image data in the predetermined data units by performing an inverse transformation on the received coefficients by using a transformation basis for a predetermined frequency-domain. The inverse transformation may be performed on current coefficients, based on the information regarding details of the selective frequency-domain transformation and the CCBP information.

When the information regarding the details of the scale-down transformation and the information regarding the coefficient scanning order are received, locations of the received coefficients may be determined based on these information. Also, the inverse transformation may be performed on the received coefficients by detecting information regarding transformation bases applied in the units of selected frequency-domains. The original image data may also be reconstructed by performing the inverse transformation on only the received coefficients.

According to the first to third exemplary embodiments of the scale-down inverse transformation, an image data block, the width and height of which have the second size may be obtained by performing an inverse transformation on a coefficient block, the width and height of which have the first size, thereby reducing an amount of calculation.

Figure 45:
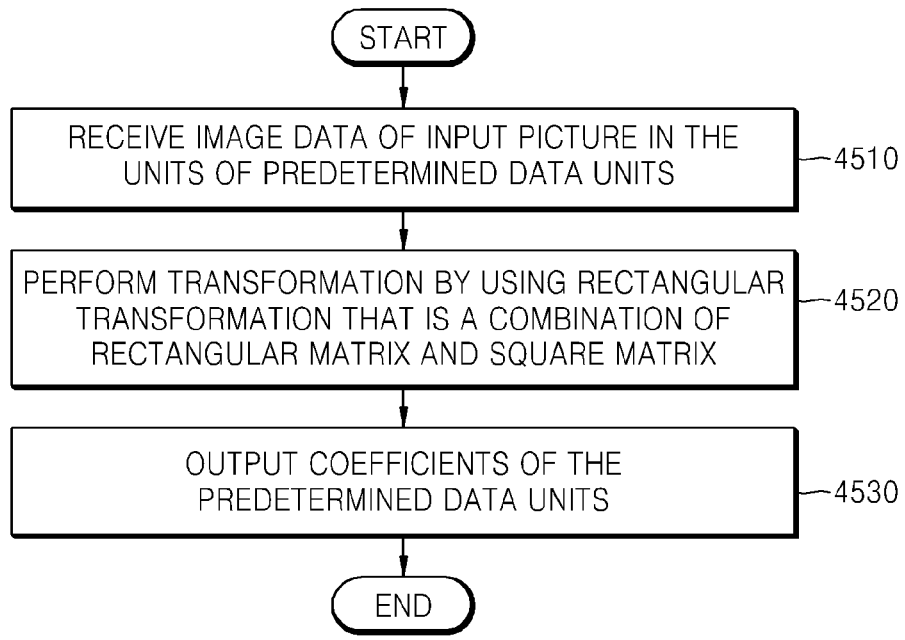
FIG. 45 is a flowchart illustrating a video encoding method using the scale-down transformation to perform the low-complexity transformation, according to another exemplary embodiment.

FIG. 45 is a flowchart illustrating a video encoding method using the scale-down transformation to perform the low-complexity transformation, according to another exemplary embodiment. In operation 4510, image data of an input picture is received in the units of predetermined data units. The predetermined data units may be obtained by dividing the image data of the input picture into predetermined-sized blocks so as to perform a transformation thereon. The predetermined data units may be square or rectangular data blocks. If the input picture is to be encoded according to a video encoding method based on hierarchical data units of each image region, image data of a transformation unit may be received to perform the scale-down transformation.

In operation 4520, coefficients of the image data are generated by performing the scale-down transformation on the image data received in operation 4510 by using a rectangular transformation that is obtained by combining a rectangular matrix and a square matrix and scaling down a result of the combining. According to various exemplary embodiments of the scale-down transformation according to exemplary embodiments, (i) a first M×N rectangular transformation basis that is a combination of an M×M transformation basis and an M×N scale-down spatial matrix may be used (first exemplary embodiment), (ii) a second M×N rectangular transformation basis that is a combination of an M×N selective frequency-domain matrix and an M×M transformation basis matrix may be used (second exemplary embodiment), and (iii) a scale-down inverse transformation may be performed when all of high-frequency components are '0' after a transformation is performed using an N×N transformation basis matrix and a result of the performing is quantized (third exemplary embodiment).

In operation 4530, the coefficients generated in operation 4520 are output. A coefficient scanning order may be changed in such a manner that only generated coefficients or coefficient blocks may be scanned.

Also, information regarding details of the scale-down transformation, e.g., types of transformation bases, coded coefficient block pattern (CCBP) information indicating whether a coded coefficient block includes a coefficient other than '0', and information regarding a coefficient scanning order may be encoded and transmitted.

Figure 46:
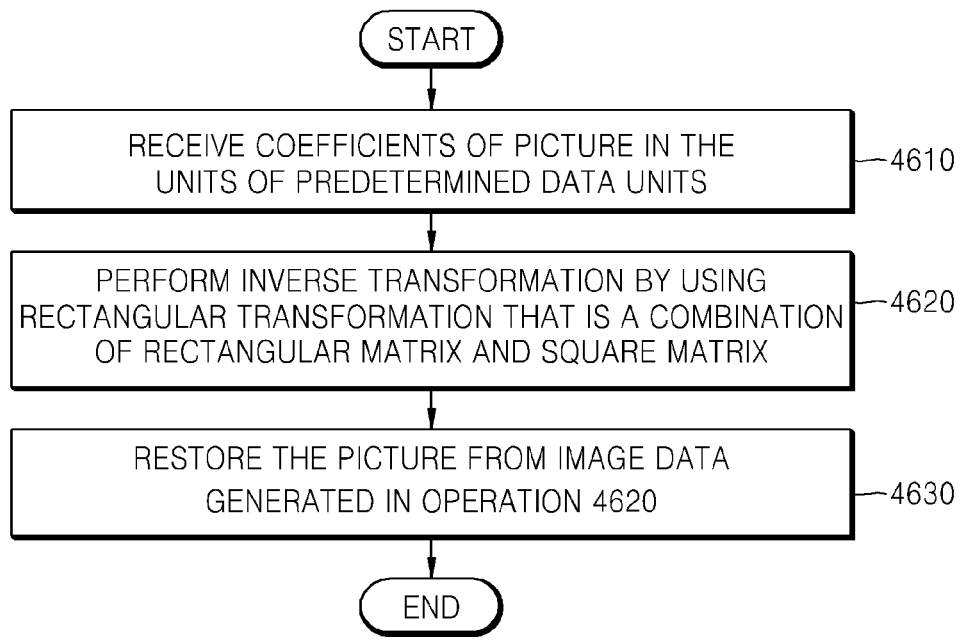
FIG. 46 is a flowchart illustrating a video decoding method using the scale-down inverse transformation to perform the low-complexity inverse transformation, according to another exemplary embodiment.

FIG. 46 is a flowchart illustrating a video decoding method using the scale-down inverse transformation to perform the low-complexity inverse transformation, according to another exemplary embodiment. In operation 4610, coefficients of predetermined data units of a picture are received. The received coefficients may be a result of dividing coefficients of image data of the picture so as to perform an inverse transformation. Information regarding details of the scale-down transformation, coded coefficient block pattern (CCBP) information, and information regarding a coefficient scanning order may further be received. The received coefficients may be read in a changed coefficient scanning order, based on the CCBP information and the information regarding the coefficient scanning order.

In operation 4620, image data in the predetermined data units is generated by performing the scale-down inverse transformation on the coefficients received in operation 4610 by using a rectangular transformation that is obtained by combining a rectangular matrix and a square matrix. According to various exemplary embodiments of the scale-down inverse transformation, (i) a first M×N rectangular transformation basis that is a combination of an M×M transformation basis and an M×N scale-down spatial matrix may be used (first exemplary embodiment), (ii) a second M×N rectangular transformation basis that is a combination of an M×N selective frequency-domain matrix and an M×M transformation basis matrix may be used (second exemplary embodiment), and (iii) a scale-down inverse transformation may be performed when all of high-frequency components are '0' after an inverse transformation is performed using an N×N transformation basis matrix and a result of the performing is quantized (third exemplary embodiment). For example, types of transformation bases may be determined based on the information regarding the details of the scale-down transformation.

In operation 4630, the picture is reconstructed from the image data generated in operation 4620. If an inverse transformation is performed on an image encoded according to a video encoding method based on hierarchical data units of each image region according to an exemplary embodiment, then image data may be reconstructed in transformation units through the inverse transformation.

A video encoding method and apparatus and a video decoding method and apparatus that employ the low-complexity transformation according to various exemplary embodiments, will be described with reference to FIGS. 47 to 50.

Figure 47:
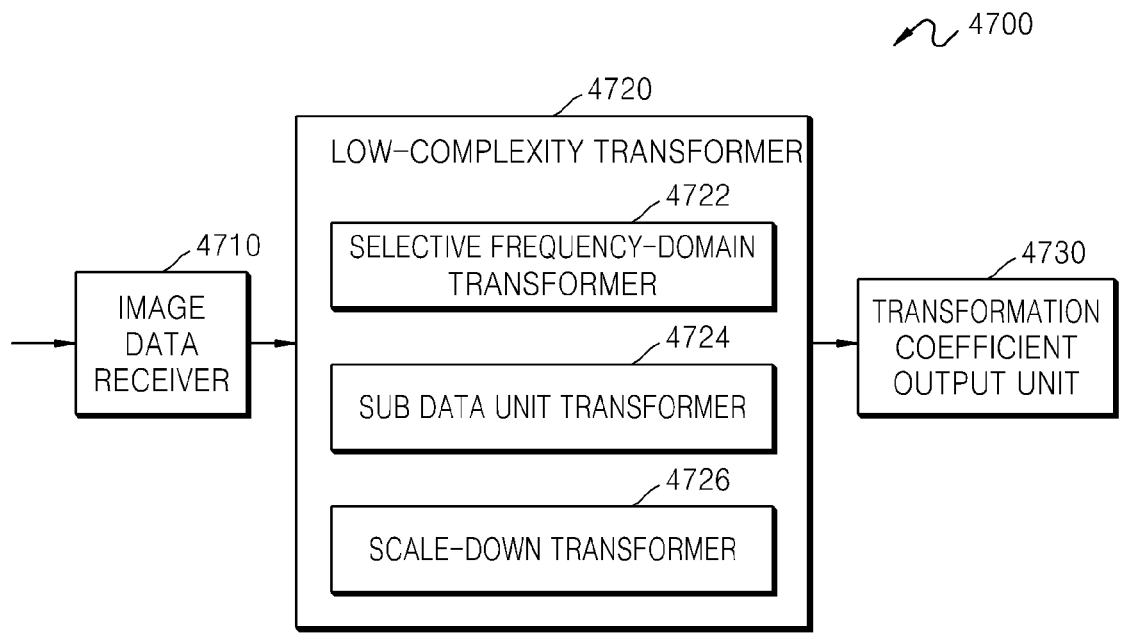
FIG. 47 is a block diagram of a video encoding apparatus using the low-complexity transformation, according to another exemplary embodiment.

FIG. 47 is a block diagram of a video encoding apparatus 4700 using the low-complexity transformation, according to another exemplary embodiment. The video encoding apparatus 4700 includes an image data receiver 4710, a low-complexity transformer 4720, and a transformation coefficient output unit 4730. The low-complexity transformer 4720 includes a selective frequency-domain transformer 4722, a sub data unit transformer 4724, and a scale-down transformer 4726.

The image data receiver 4710 may receive image data of an input picture in predetermined data units. The predetermined data units may be obtained by dividing the image data of the input picture into predetermined-sized blocks so as to perform a transformation thereon. The image data in the predetermined data units may be square or rectangular data blocks. If the input picture is to be encoded according to a video encoding method based on hierarchical data units of each image region, the image data may be image data in transformation units.

The low-complexity transformer 4720 may selectively perform a transformation on the image data received from the image data receiver 4710 from among a selective frequency-domain transformation using a transformation basis for a predetermined frequency-domain, a sub data unit transformation for performing a transformation by individually selecting and applying transformation bases to sub data units divided from the image data, and a scale-down transformation using a rectangular transformation basis obtained by combining a rectangular matrix and a square matrix and scaling down a result of the combining.

According to a selection of the low-complexity transformer 4720, the image data is input to the selective frequency-domain transformer 4722, the sub data unit transformer 4724, or the scale-down transformer 4726.

The selective frequency-domain transformer 4722 may generate selective frequency-domain coefficients by performing a transformation on the image data by using a transformation basis for a predetermined frequency-domain. The selective frequency-domain transformer 4722 may perform a selective frequency-domain transformation described above with reference to FIGS. 1 to 35. The selective frequency-domain transformer 4722 may correspond to the selective frequency-domain transformer 12 of FIG. 1.

The sub data unit transformer 4724 may generate coefficients for a plurality of sub data units by performing a transformation by individually selecting and applying transformation bases to the plurality of sub data units divided from the image data. The sub data unit transformer 4724 may perform a sub data unit transformation described above with reference to FIGS. 36 to 42. The sub data unit transformer 4724 may correspond to the sub data unit transformation unit 3620 of FIG. 36.

The scale-down transformer 4726 generates coefficients of the image data by performing a scale-down transformation on the image data by using a rectangular transformation basis obtained by combining a rectangular matrix and a square matrix and scaling down a result of the combining. The scale-down transformer 4726 may perform a scale-down transformation described above with reference to FIGS. 43 to 46. The scale-down transformer 4726 may correspond to the scale-down transformer 4320 of FIG. 43.

The low-complexity transformer 4720 may generate coefficients of the image data in the predetermined data units by performing the selected transformation, and output the coefficients to the transformation coefficient output unit 4730.

The transformation coefficient output unit 4730 may encode and transmit information regarding a type of the low-complexity transformation to be selected in the units of data units. Also, transformation information regarding details of the selectively performed transformation may be encoded and transformed. The transformation information may be set in the units of predetermined data units, e.g., pictures, frames, coding units, or transformation units. The video decoding apparatus 4700 may further encode and transmit, for example, coded coefficient block pattern (CCBP) information and information regarding a coefficient scanning order.

The transformation coefficient output unit 4730 may output transformation coefficients generated by the low-complexity transformer 4720. The video encoding apparatus 4700 may change a coefficient scanning order in such a manner that generated coefficients or coefficient blocks may be scanned. An entropy-encoding order may be changed or an order of outputting the transformation coefficients may be output, based on the changed coefficient scanning order.

For example, the coefficient scanning order may be changed in such manner that the generated coefficient blocks may be individually scanned or coefficients of the generated coefficient blocks may be continuously scanned. Coefficient block size information may be encoded. The coefficient scanning order may be changed in the units of the generated coefficient blocks and according to frequency characteristics, or may be changed in such a manner that only generated coefficients from among a total of coefficients of image data or coefficient blocks generated excluding coefficient blocks corresponding to a predetermined frequency band from among the total of coefficients of image data may be scanned. Also, the coefficient scanning order may be changed in such a manner that a coefficient block including a coefficient other than '0' may be scanned, based on the CCBP information.

Figure 48:
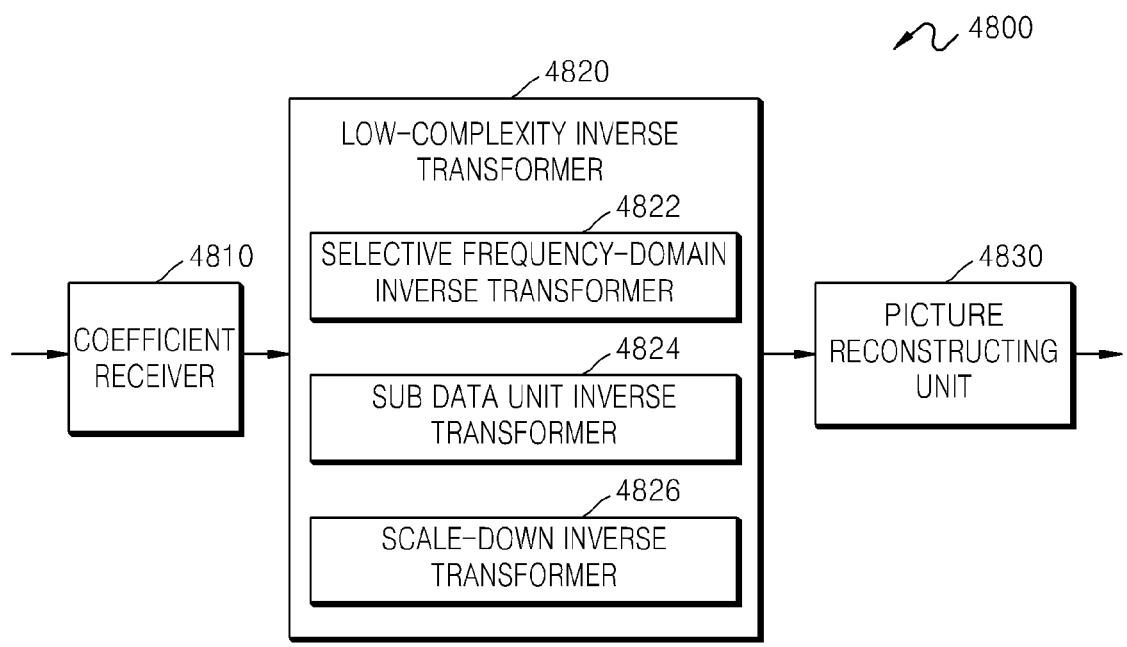
FIG. 48 is a block diagram of a video decoding apparatus using the low-complexity inverse transformation, according to another exemplary embodiment.

FIG. 48 is a block diagram of a video decoding apparatus 4800 using the low-complexity inverse transformation, according to another exemplary embodiment. The video decoding apparatus 4800 includes a coefficient receiver 4810, a low-complexity inverse transformer 4820, and a picture reconstructing unit 4830. The low-complexity inverse transformer 4820 includes a selective frequency-domain inverse transformer 4822, a sub data unit inverse transformer 4824, and a scale-down inverse transformer 4826.

The coefficient receiver 4810 may receive coefficients of predetermined data units of a picture. The received coefficients of the predetermined data units may be a result of dividing coefficients of image data of the picture so as to perform an inverse transformation.

The low-complexity inverse transformer 4820 may selectively perform an inverse transformation on the coefficients received from the coefficient receiver 4810 from among a selective frequency-domain inverse transformation using a transformation basis for a predetermined frequency-domain, a sub data unit inverse transformation for performing an inverse transformation by individually selecting and applying transformation bases to sub data units divided from the image data, and a scale-down inverse transformation using a rectangular transformation basis obtained by combining a rectangular matrix and a square matrix.

The video encoding apparatus 4800 may change a coefficient scanning order in such a manner that received coefficients or coefficient blocks may be scanned. An entropy-decoding order may be changed based on the changed coefficient scanning order. For example, the coefficient scanning order may be changed in such manner that the received coefficient blocks may be individually scanned or coefficients of the received coefficient blocks may be continuously scanned. The coefficient scanning order may be changed in the units of the received coefficient blocks and according to frequency characteristics, or may be changed in such a manner that only received coefficients from among a total of coefficients of image data or coefficient blocks excluding coefficient blocks corresponding to a predetermined frequency band from among the total of coefficients of image data may be scanned. Also, the coefficient scanning order may be changed in such a manner that a coefficient block including a coefficient other than '0' may be scanned, based on received coded coefficient block pattern (CCBP) information.

According to a selection of the low-complexity inverse transformer 4820, the received coefficients are input to the selective frequency-domain inverse transformer 4822, the sub data unit inverse transformer 4824, or the scale-down inverse transformer 4826. If information regarding a selection of a type of the low-complexity transformation is received in the units of data unit, then the low-complexity inverse transformer 4820 may input the received coefficients to the selective frequency-domain inverse transformer 4822, the sub data unit inverse transformer 4824, or the scale-down inverse transformer 4826, based on the information regarding a selection of a type of the low-complexity transformation with respect to a current data unit.

For example, if information regarding a selected transformation, for example, coefficients obtained through a selective frequency-domain transformation, is received, then information regarding, for example, a range and number of selected frequency bands, coefficient block size, and types of transformation bases, may be received. If coefficients obtained through a sub data unit transformation are received, information, such as a number of sub data units and types of transformation bases, may be received. Also, if coefficients obtained through a scale-down transformation are received, then information, such as types of divided transformation bases and scale-down transformation techniques, may be received. The low-complexity inverse transformer 4820 may perform an inverse transformation according to a selected transformation, based on the information regarding the selected transformation.

The selective frequency-domain inverse transformer 4822 may generate image data in the predetermined data units by performing an inverse transformation on the received coefficients by using a transformation basis for a predetermined frequency-domain. The selective frequency-domain inverse transformer 4822 may perform a selective frequency-domain inverse transformation described above with reference to FIGS. 1 to 35. The selective frequency-domain inverse transformer 4822 may correspond to the selective frequency-domain inverse transformer 22 of FIG. 22.

The sub data unit frequency-domain inverse transformer 4824 may generate image data in the predetermined data units by generating coefficients of a plurality of sub data units from the received coefficients and performing an inverse transformation by individually selecting and applying transformation bases to the generated coefficients. The sub data unit inverse transformer 4824 may perform a sub data unit inverse transformation described above with reference to FIGS. 36 to 42. The sub data unit inverse transformer 4824 may correspond to the sub data unit inverse transformation unit 3720 of FIG. 37.

The scale-down inverse transformer 4826 may generate image data in the predetermined data units by performing a scale-down inverse transformation on the received coefficients by using a rectangular transformation basis obtained by combining a rectangular matrix and a square matrix and scaling down a result of the combining. The scale-down inverse transformer 4826 may perform a scale-down inverse transformation described above with reference to FIGS. 43 to 46. The scale-down inverse transformer 4826 may correspond to the scale-down inverse transformer 4420 of FIG. 44.

The low-complexity inverse transformer 4820 may output the image data in the predetermined data units, which are obtained through the selected inverse transformation, to the picture reconstructing apparatus 4830. If a video encoding method based on hierarchical data units of each image region has been employed, image data reconstructed by the low-complexity inverse transformation unit may be image data in transformation units.

The picture reconstructing unit 4830 reconstructs the picture from the image data generated by the low-complexity inverse transformer 4820.

Accordingly, the video encoding apparatus 4700 and the video decoding apparatus 4800 may respectively perform a transformation and an inverse transformation by using transformation bases for deriving a scale-down frequency band or scale-down spatial data, thereby increasing the efficiency of calculation.

Figure 49:
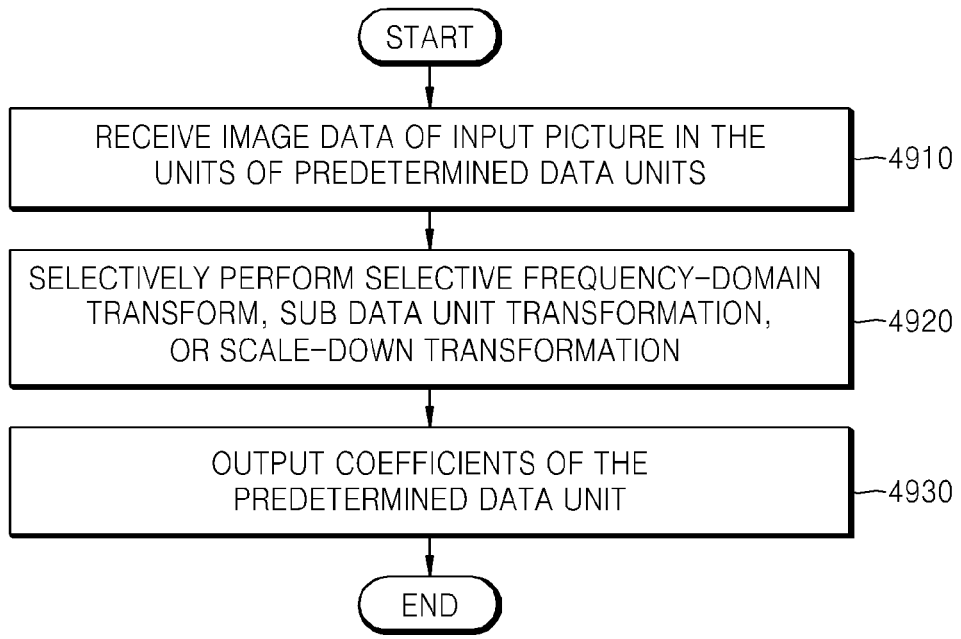
FIG. 49 is a flowchart illustrating a video encoding method using the low-complexity transformation, according to another exemplary embodiment.

FIG. 49 is a flowchart illustrating a video encoding method using the low-complexity transformation, according to another exemplary embodiment. In operation 4910, image data of an input picture is received in the units of predetermined data units. The predetermined data units may be obtained by dividing the image data of the input picture into predetermined-sized blocks so as to perform a transformation thereon. The predetermined data units may be square or rectangular data blocks.

In operation 4920, a transformation from among a selective frequency-domain transform, a sub data unit transformation, and a scale-down transformation is selectively performed on the image data received in operation 4910. Coefficients of the predetermined data units of the image data are generated through the selected transformation and are then output. In operation 4920, the selective frequency-domain transformation may correspond to operation 3420 included in the video encoding method of FIG. 34 that uses a selective frequency-domain transformation according to an exemplary embodiment, the sub data unit transformation may correspond to operation 4120 included in the video encoding method of FIG. 41 that uses a sub data unit transformation according to an exemplary embodiment, and the scale-down transformation may correspond to operation 4520 included in the video encoding method of FIG. 45 that uses a scale-down transformation according to an exemplary embodiment.

In operation 4930, the coefficients generated in operation 4920 are output. Also, information regarding a selection of a type of the low-complexity transformation in the units of data units may be encoded and transmitted. Information regarding details of the performed low-complexity transformation, information regarding a changed coefficient scanning order, and coded coefficient block pattern (CCBP) information may also be encoded and transmitted.

Figure 50:
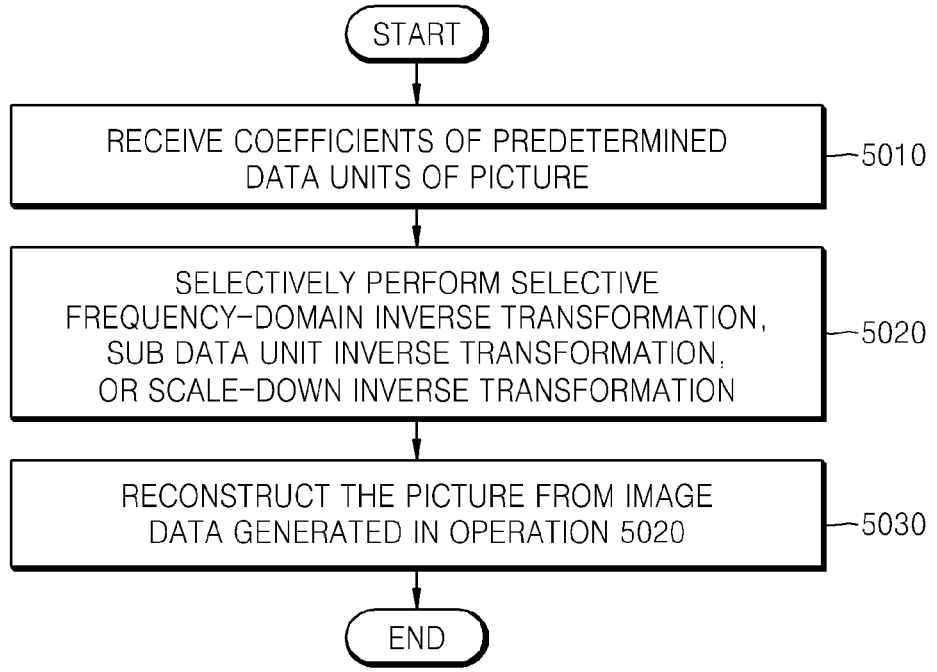
FIG. 50 is a flowchart illustrating a video decoding method using the low-complexity inverse transformation, according to another exemplary embodiment.

FIG. 50 is a flowchart illustrating a video decoding method using the low-complexity inverse transformation, according to another exemplary embodiment. In operation 5010, coefficients of predetermined data units of a picture are received. The received coefficients of the predetermined data units may be a result of dividing coefficients of image data of the picture so as to perform an inverse transformation. If information regarding details of the performed inverse transformation, information regarding a coefficient scanning order, and coded coefficient block pattern (CCBP) information are received, then an order of scanning the received coefficients may be changed based on at least one piece of information from among the received information.

In operation 5020, a selective frequency-domain inverse transformation, a sub data unit inverse transformation, and a scale-down inverse transformation is selectively performed on the coefficients received in operation 5010. In operation 5020, the selective frequency-domain inverse transformation may correspond to operation 3520 included in the video decoding method of FIG. 35 that uses a selective frequency-domain inverse transformation according to an exemplary embodiment, the sub data unit inverse transformation may correspond to operation 4220 included in the video decoding method of FIG. 42 that uses a sub data unit inverse transformation according to an exemplary embodiment, and the scale-down inverse transformation may correspond to operation 4620 included in the video decoding method of FIG. 46 that uses a scale-down inverse transformation according to an exemplary embodiment.

If information regarding a selection of a type of the low-complexity transformation in the units of data units is received, a type of an inverse transformation may be selected based on this information. If information regarding particulars of a performed transformation is received, an inverse transformation selected based on this information may be performed to reconstruct the image data in the predetermined data units.

In operation 5030, the picture is reconstructed from the image data generated in operation 5020.

In a video encoding method using a low-complexity transformation according to an exemplary embodiment, a transformation is performed on only a scale-down transformation basis or data unit so as to encode only necessary information instead of a general transformation basis. Thus, only generated coefficients or coefficients blocks may be scanned and output, thereby reducing an amount of calculation and a transmission bitrate. Also, in a video decoding method using a low-complexity transformation according to an exemplary embodiment, an amount and complexity of calculation needed to perform an inverse transformation may be reduced when a transformation basis is appropriately selected for received coefficients, since information regarding a selected transformation basis, frequency band, and data unit is exchanged.

A video encoding method and apparatus using the low-complexity transformation according to an exemplary embodiment as described above may be applied to a video encoding method and apparatus based on hierarchical data units of each image region. In other words, a transformation and an inverse transformation included in a video encoding/decoding method and apparatus based on hierarchical data units of each image region according to an exemplary embodiment, may be performed similar to the low-complexity transformation and inverse transformation according to an exemplary embodiment. In this case, image data in transformation units may be transformed into coefficients in transformation units through the low-complexity transformation.

In order to explain a process of determining transformation units, a video encoding method and apparatus and a video decoding method and apparatus that are based on hierarchical data units of each image region according to various exemplary embodiments, will now be described with reference to FIGS. 51 to 63.

Figure 51:
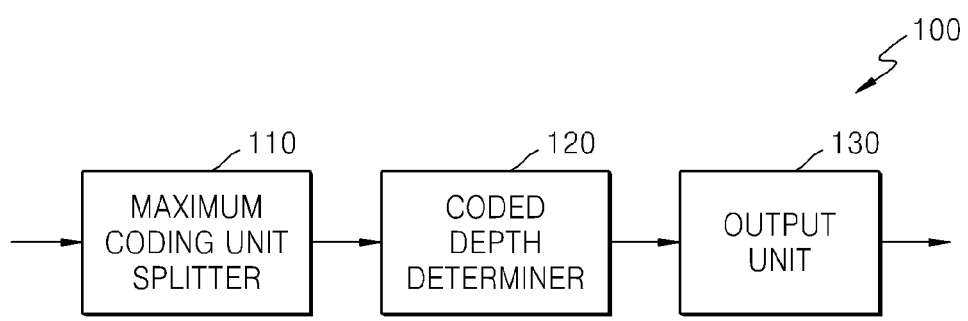
FIG. 51 is a block diagram of a video encoding apparatus based on hierarchical data units of each image region, according to another exemplary embodiment.

FIG. 51 is a block diagram of a video encoding apparatus 100 based on hierarchical data units of each image region, according to another exemplary embodiment. The video encoding apparatus 100 includes a maximum coding unit splitter 110, a coded depth determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The image data may be output to the coded depth determiner 120 according to the at least one maximum coding unit.

A coding unit according to an exemplary embodiment may be characterized by a maximum size and a depth. The depth denotes a number of times the coding unit is hierarchically split, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coded depth determiner 120 encodes at least one split region obtained by splitting a region of the maximum coding unit according to depths, and determines a depth to output a finally encoded image data according to the at least one split region. In other words, the coded depth determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Prediction encoding and transformation may be performed according to the maximum coding unit. The prediction encoding and the transformation may also be performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transform, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding on the maximum coding unit, the prediction encoding may be performed based on partial data units of coding units of the maximum coding unit that correspond to depths. The partial data units may include the coding units and data units each obtained by splitting at least one of a height and a width of the corresponding coding unit.

For example, when the size of a coding unit is 2N×2N (where N is a positive integer), the sizes of the partial data units may be 2N×2N, 2N×N, N×2N, and N×N. The prediction encoding may be performed based on not only a data unit obtained by halving at least one of a height and width of a coding unit but also data units divided from a coding unit in various ways. Hereinafter, a data unit based on which prediction-encoding is performed will be referred to as a prediction unit.

A prediction mode of a coding unit may be at least one of an intra mode, a inter mode, and a skip mode. For example, the intra mode or the inter mode may be performed on prediction units of 2N×2N, 2N×N, N×2N, or N×N. Also, the skip mode may be performed only on a prediction unit of 2N×2N. The encoding is independently performed on one prediction unit in a coding unit, thereby selecting a prediction mode having a least encoding error.

The video encoding apparatus 100 may also perform a transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode. A data unit used as a base of the transformation will be referred to as a 'transformation unit'.

Encoding information according to coding units corresponding to a coded depth requires not only information about the coded depth, but also about information related to prediction encoding and transformation. Accordingly, the coded depth determiner 120 not only determines a coded depth having a least encoding error, but also determines a partition type for dividing a coding unit of a coded depth into prediction units, a prediction mode according to prediction units, and a size of a transformation unit for a transformation.

The coded depth determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coded depth determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since at least one coded depth in a maximum coding unit and information about at least one encoding mode for each coded depth should be determined, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may set encoding information for a minimum coding unit included in a maximum coding unit. That is, a coding unit corresponding to a coded depth includes at least one minimum coding unit having the same encoding information. Based on this fact, if adjacent minimum coding units have the same encoding information according to depths, the adjacent minimum coding units may be included in the same maximum coding unit.

For example, encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may determine coding units having an optimum shape and size for each maximum coding unit, based on the size of the maximum coding unit and the maximum depth determined considering characteristics of the current picture. Also, since encoding may be performed on each maximum coding unit by using any one of various prediction modes and transforms, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 52:
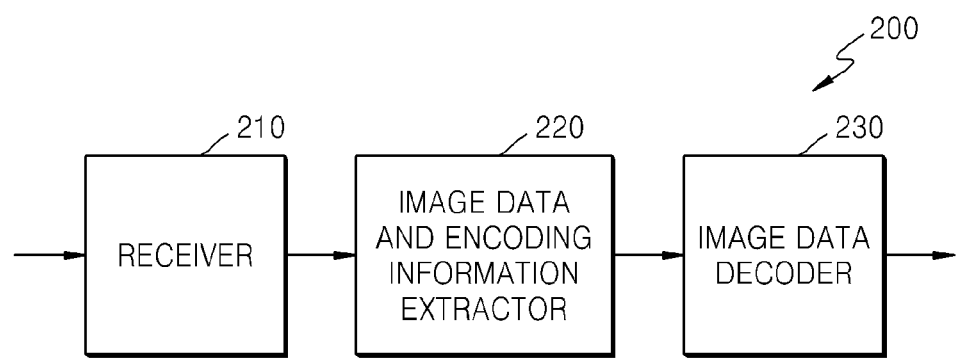
FIG. 52 is a block diagram of a video decoding apparatus based on hierarchical data units of each image region, according to another exemplary embodiment.

FIG. 52 is a block diagram of a video decoding apparatus 200 based on hierarchical data units of each image region, according to another exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts image data in the units of maximum coding unit from the parsed bitstream, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for each of the maximum coding units, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode for each of the maximum coding units may be set for information about at least one coding unit corresponding to the coded depth, and information about an encoding mode may include information about a partition type of a prediction unit of each coding unit, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

The image data and encoding information extractor 220 may extract the information about the coded depth and the encoding mode in the units of minimum coding units. If information regarding a coded depth and an encoding mode of a maximum coding unit is recorded in the units of minimum coding units, minimum coding units to which the same information about the coded depth and the encoding mode is assigned may be inferred to be data units included in the same maximum coding unit. That is, decoding may be performed based on a coding unit corresponding to a coded depth having the least encoding error by collecting minimum coding units assigned the same information and performing decoding according to these minimum coding units.

The image data decoder 230 reconstructs the current picture by decoding the image data in each maximum coding unit based on the information about the coded depth and the encoding mode of each of the maximum coding units. The image data decoder 230 may decode image data in the units of coding units corresponding to at least one coded depth, based on the information regarding the coded depth of each of the maximum coding units. This decoding process may include a prediction including intra prediction and motion compensation, and an inverse transformation.

For performing prediction-encoding on each coding unit, the image data decoder 230 may perform intra prediction or motion compensation according to a prediction unit and a prediction mode of each coding unit, based on the information about the partition type and the prediction mode of the prediction unit of the coding unit according to coded depths.

For performing an inverse transformation on each maximum coding unit, the image data decoder 230 may perform an inverse transformation according to each transformation unit in the coding unit, based on the information about the size of the transformation unit of the coding unit according to coded depths.

The image data decoder 230 may determine at least one coded depth of a current maximum coding unit by using split information according to depths. If the split information indicates that image data is to be decoded using the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, minimum coding units containing encoding information including the same split information may be gathered by observing encoding information assigned for minimum coding units, and the gathered data units may be decoded to be one data unit.

The video decoding apparatus 200 may obtain information about at least one coding unit that generates the minimum encoding error when encoding is recursively performed for each maximum coding unit, and may use the information to decode the current picture. In other words, image data may be decoded in the units of maximum coding units and by using optimum coding units.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 53:
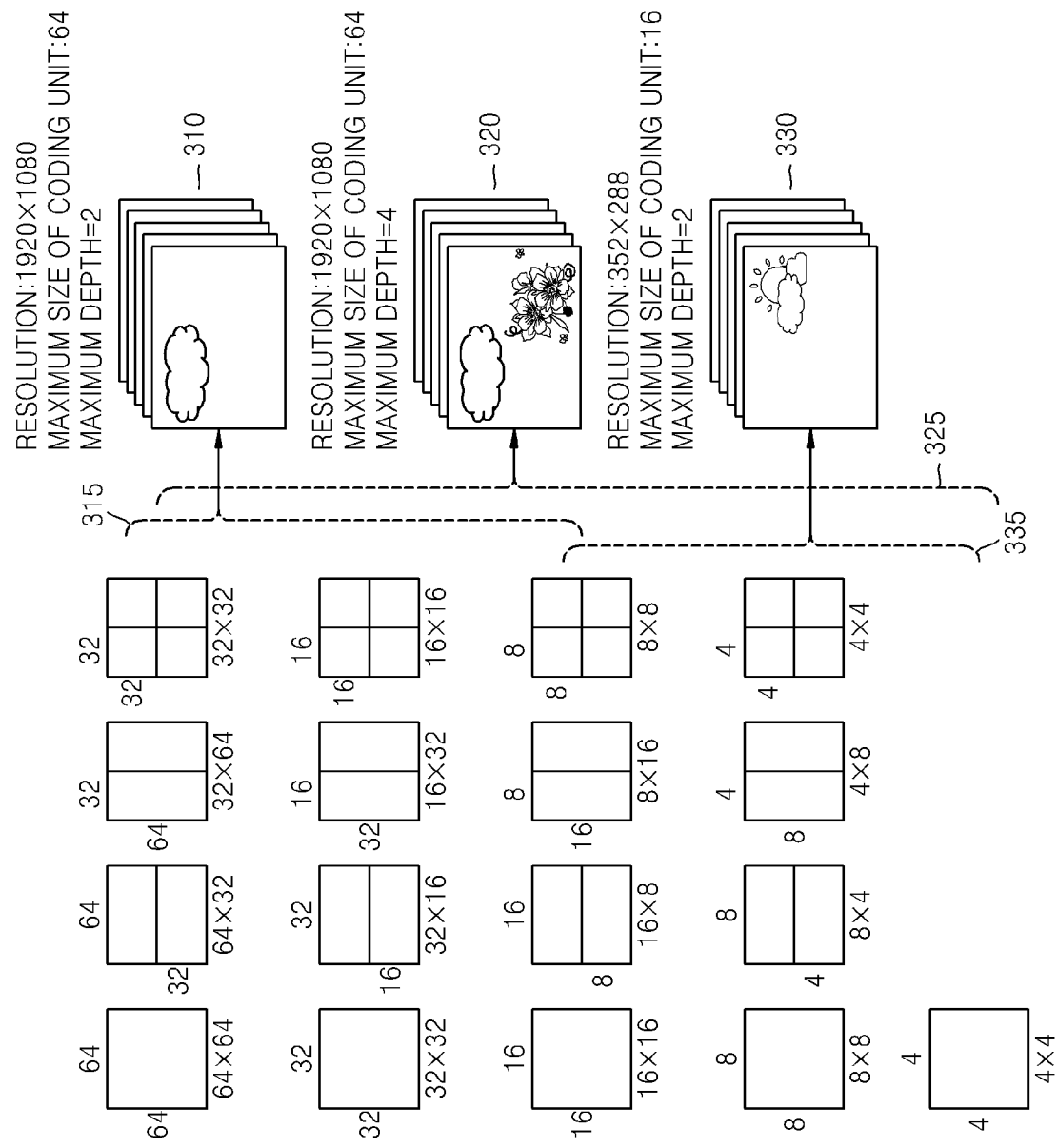
FIG. 53 is a diagram for describing a concept of a coding unit according to an exemplary embodiment.

FIG. 53 is a diagram for describing a concept of coding units according to an exemplary embodiment. Examples of a coding unit may include a 64×64 coding unit, a 32×32 coding unit, a 16×16 coding unit, and an 8×8 coding unit. In addition to such square type coding units, examples of a coding unit may include a 64×32 partition, a 32×64 partition, a 32×16 partition, a 16×32 partition, a 16×8 partition, an 8×16 partition, an 8×4 partition, a 4×8 partition and a 4×4 partition.

In video data 310, a resolution is 1920×1080, a maximum size of a coding unit is '64', and a maximum depth is '2'. In video data 320, a resolution is 1920×1080, a maximum size of a coding unit is '64', and a maximum depth is '3'. In video data 330, a resolution is 352×288, a maximum size of a coding unit is '16', and a maximum depth is '2'.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be '64'.

A maximum depth denotes a total number of layers in hierarchical coding units. Thus, since the maximum depth of the video data 310 is '2', coding units 315 of the video data 310 may include a maximum coding unit having a long axis size of 64 and coding units having long axis sizes of 32 and 16 as a depth is deepened to two layers. Since the maximum depth of the video data 330 is '2', coding units 335 of the vide data 330 may include a maximum coding unit having a long axis size of 16, and coding units having long axis sizes of 8 and 4 since depths are deepened to two layers.

Since the maximum depth of the video data 320 is 4, coding units 325 of the video data 320 may include a maximum coding unit having a long axis size of 64, and coding units having long axis sizes of 32, 16, 8, and 4 since the depths is deepened to four layers. As a depth deepens, detailed information may be precisely expressed.

Figure 54:
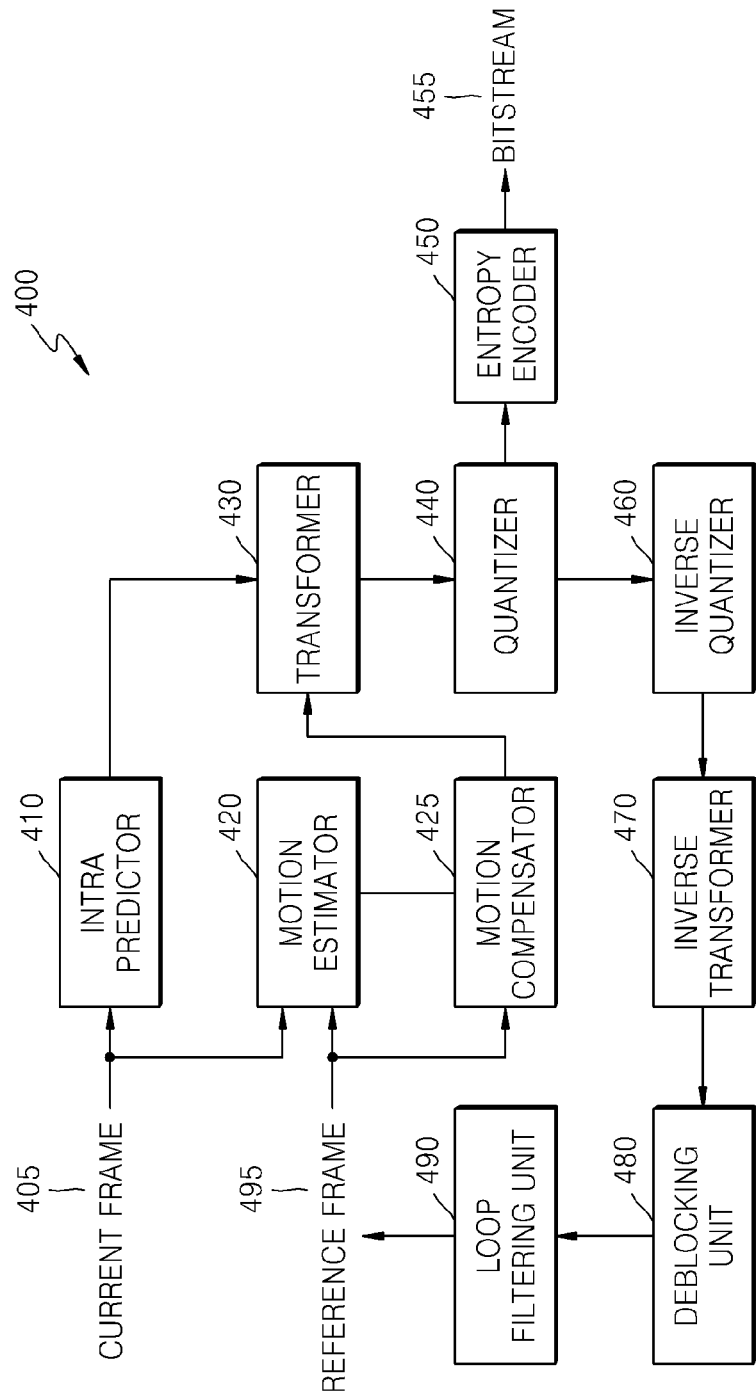
FIG. 54 is a block diagram of an image encoder based on a coding unit, according to an exemplary embodiment.

FIG. 54 is a block diagram of an image encoder 400 based on coding units, according to an exemplary embodiment. The image encoder 400 performs operations of the coded depth determiner 120 of the video encoding apparatus 100 to gencode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on coding units corresponding to depths while considering the maximum depth of each maximum coding unit.

In particular, the intra predictor 410, the motion estimator 420, and the motion compensator 425 determine a prediction unit and a prediction mode of each coding unit, and the transformer 430 determines the size of a transformation unit, in consideration of a maximum size and a depth of each coding unit.

Figure 55:
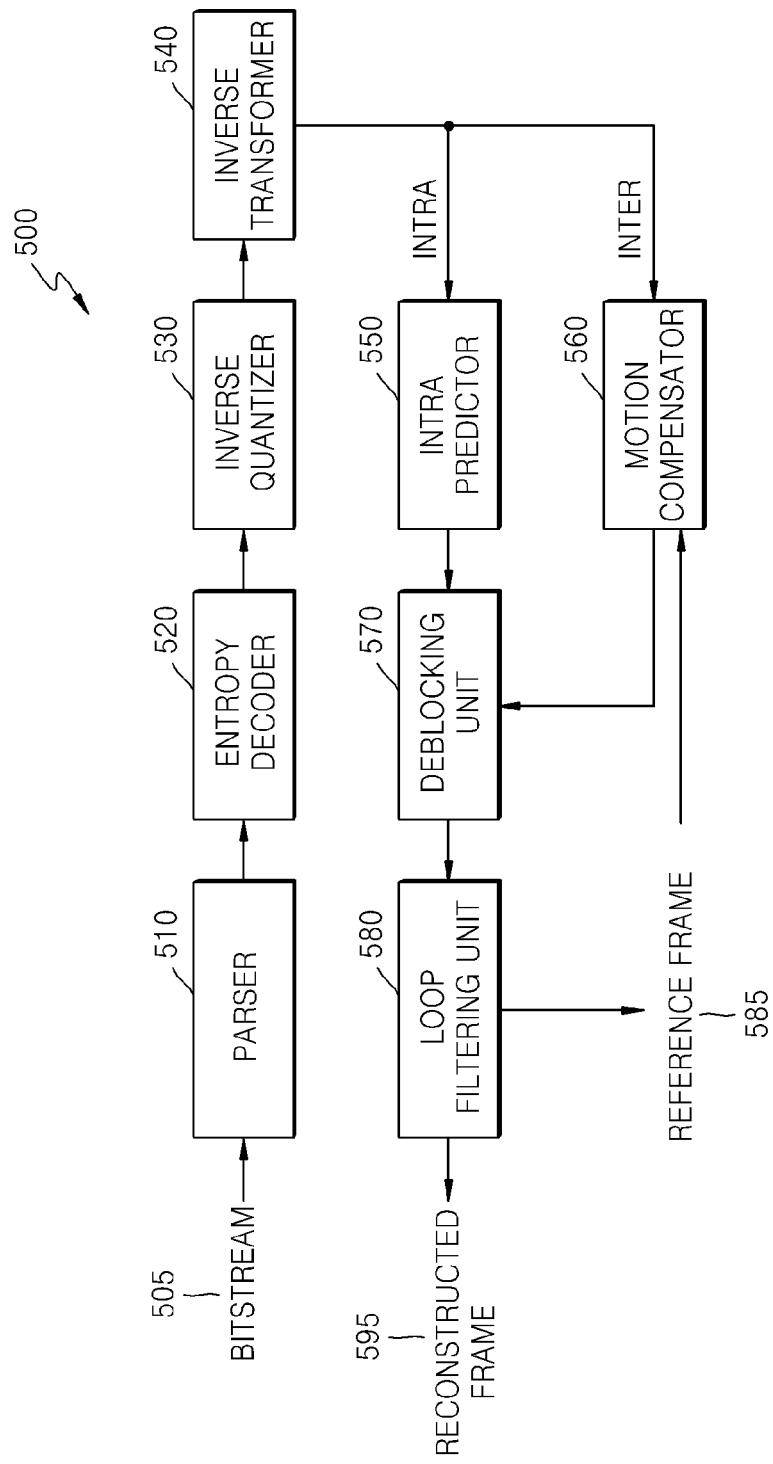
FIG. 55 is a block diagram of an image decoder based on a coding unit, according to an exemplary embodiment.

FIG. 55 is a block diagram of an image decoder 500 based on coding units, according to an exemplary embodiment. A parser 510 parses encoded video data to be decoded and information about encoding required for decoding from a bitstream 505. The encoded video data is output as inverse quantized data through an entropy decoder 520 and an inverse quantizer 530, and the inverse quantized data is reconstructed to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a reconstructed frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations in the units of maximum coding units and based on a coding unit corresponding to a coded depth.

In particular, the intra prediction 550 and the motion compensator 560 determine a coding unit and a prediction mode, and the inverse transformer 540 determines a size of a transformation unit, in consideration of a maximum size and depth of the coding unit.

Figure 56:
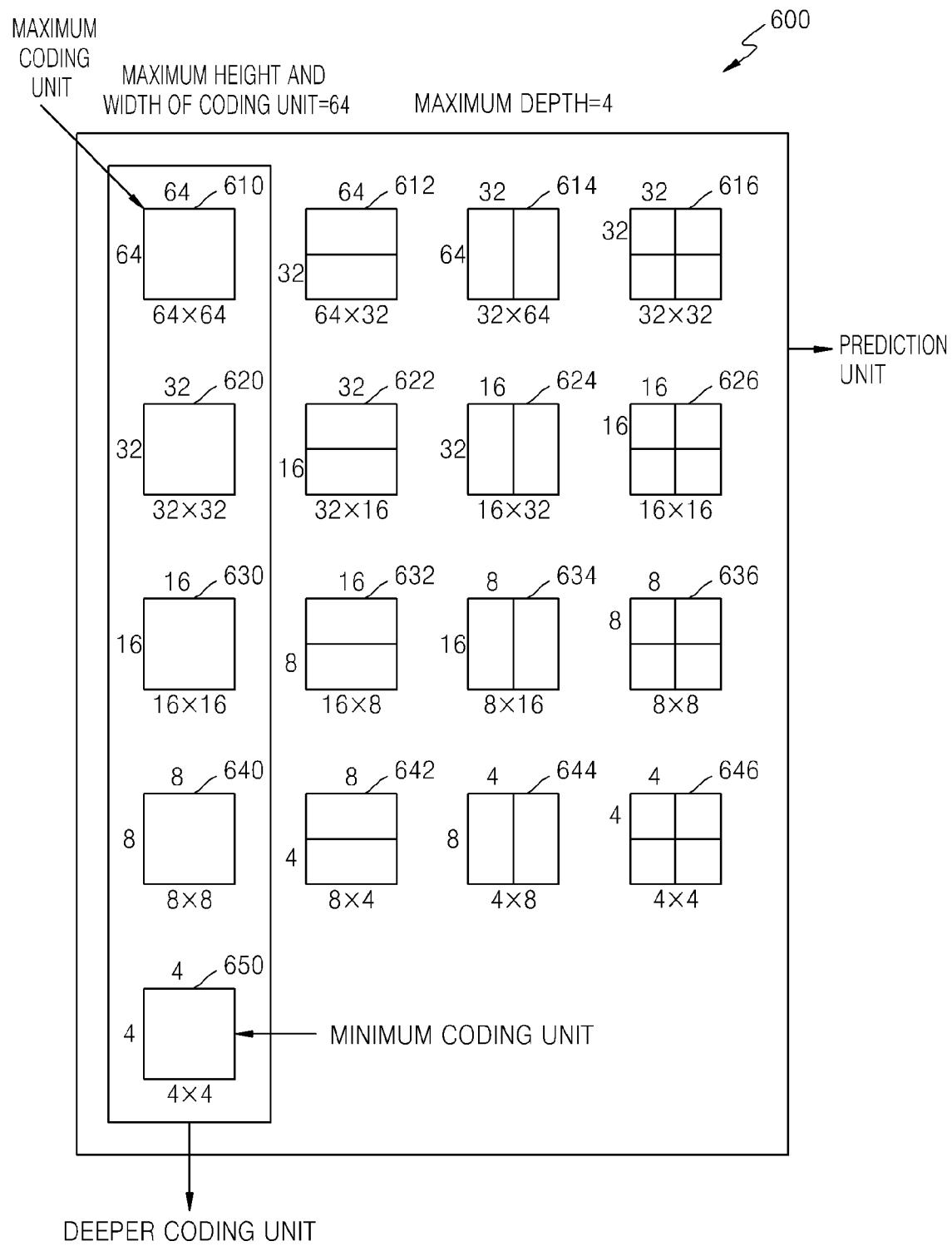
FIG. 56 is a diagram illustrating a deeper coding unit according to depths, and prediction units, according to an exemplary embodiment.

FIG. 56 is a diagram illustrating deeper coding units according to depths, and prediction units, according to an exemplary embodiment. The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, prediction units, which are partial data units based on which deeper coding units are respectively prediction-encoded, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The partial data units are arranged as prediction units of coding units along the horizontal axis and according to each depth. In other words, prediction units of the coding unit 610 having the size of 64×64 and the depth of 0 may include a 64×64 partial data unit 610 included in the coding unit 610, 64×32 partial data units 612, 32×64 partial data units 614, and 32×32 partial data units 616. In other words, a coding unit may be a square data unit including transformation units 610, 612, 614, and 616.

Similarly, prediction units of the coding unit 620 having the size of 32×32 and the depth of 1 may include a 32×32 partial data unit 620 included in the coding unit 620, 32×16 partial data units 622, 16×32 partial data units 624, and 16×16 partial data units 626.

Similarly, prediction units of the coding unit 630 having the size of 16×16 and the depth of 2 may include a 16×16 partial data unit 630 included in the coding unit 630, 16×8 partial data units 632, 8×16 partial data units 634, and 8×8 partial data units 636.

Similarly, prediction units of the coding unit 640 having the size of 8×8 and the depth of 3 may include an 8×8 partial data unit 640 included in the coding unit 640, 8×4 partial data units 642, 4×8 partial data units 644, and 4×4 partial data units 646.

The coding unit 650 having the size of 4×4 and the depth of 4 is the minimum coding unit and a coding unit of the lowermost depth. A prediction unit of the coding unit 650 is also a 4×4 partial data unit 650.

In order to determine the at least one coded depth of the coding units constituting the maximum coding unit 610, the coded depth determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth having the minimum encoding error in the coding unit 610 may be selected as the coded depth and a partition type of the coding unit 610.

FIG. 57 is a diagram for describing a relationship between a coding unit 710 and transformation units 720 according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 58 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a partition type into which a current coding unit is split, as a prediction unit for prediction-encoding the current coding unit. For example, a current coding unit CU_0 having a depth of 0 and a size of 2N×2N may be split into any one of a 2N×2N prediction unit 802, a 2N×N prediction unit 804, an N×2N prediction unit 806, and an N×N prediction unit 808. Here, the information 800 about a partition type is set to indicate one of the 2N×2N prediction unit 802, the 2N×N prediction unit 804, the N×2N prediction unit 806, and the N×N prediction unit 808.

The information 810 indicates a prediction mode of each prediction unit. For example, the information 810 may indicate a mode of prediction encoding performed on a prediction unit indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 59:
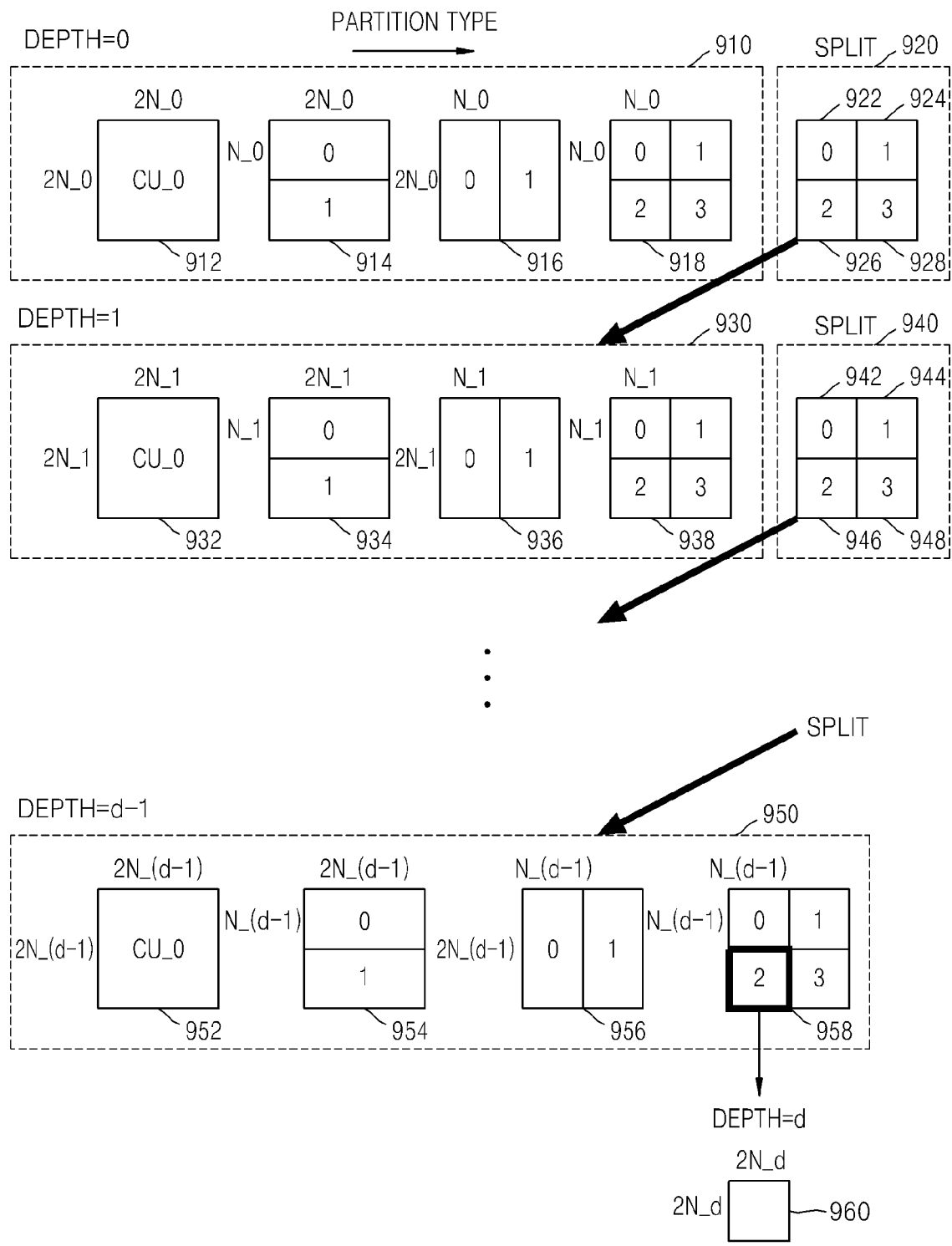
FIG. 59 is a diagram of deeper coding units according to depths, according to an exemplary embodiment.

FIG. 59 is a diagram of deeper coding units according to depths, according to an exemplary embodiment.

Split information may be used to indicate a change of a depth. The spilt information indicates whether a coding unit of a current depth is split into coding units of a lower depth.

Prediction units 910 for prediction encoding a coding unit having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0.

Prediction encoding is repeatedly performed on one prediction unit having a size of 2N_0×2N_0, two prediction units having a size of 2N_0×N_0, two prediction units having a size of N_0×2N_0, and four prediction units having a size of N_0×N_0, according to each partition type. The prediction encoding in an intra mode and an inter mode may be performed on the prediction units having the sizes of 2N_0×2N_0, N_0×2N_0, 2N_0×N_0, and N_0×N_0. The prediction encoding in a skip mode is performed only on the prediction unit having the size of 2N_0×2N_0.

If the encoding error is the smallest in the partition type 918, a depth is changed from 0 to 1 to split in operation 920, and a minimum encoding error may be repeatedly searched for with respect to coding units 922, 924, 926, and 928 of a partition type having a depth of 2 and a size of N_0×N_0.

Since encoding is repeatedly performed on coding units 922, 924, 926, and 928 having the same depth, encoding of a coding unit having a depth of 1, for example, from among these coding units will now be described. A prediction unit 930 for prediction encoding the coding unit 930 having a depth of 1 and a size of 2N_1×2N_1 (=N_0×N_0) may include prediction units of a partition type 932 having a size of 2N_1×2N_1, a partition type 934 having a size of 2N_1×N_1, a partition type 936 having a size of N_1×2N_1, and a partition type 938 having a size of N_1×N_1. For each partition type, one 2N_1×2N_1 prediction unit, two 2N_1×N_1 prediction unit are repeatedly units, two N_1×2N_1 prediction units, and four 1_1×N−1 prediction unit are repeatedly prediction encoded.

If an encoding error is the smallest in the partition type 938, a depth is changed from 1 to 2 in operation 950, and a smallest encoding error may be repeatedly searched for with respect to coding units 942, 944, 946, and 948 having a depth of 2 and a size of N_2×N_2.

When a maximum depth is d, split information according to depths may be set until a depth becomes d−1. In other words, a prediction unit 950 for prediction encoding a coding unit having a depth of d−1 and a size of 2N_(d−1)×2N_(d−1) may include prediction units of a partition type 952 having a size of 2N_(d−1)×2N_(d−1), a partition type 954 having a size of 2N_(d−1)×N_(d−1), a partition type 956 having a size of N_(d−1)×2N_(d−1), and a partition type 958 having a size of N_(d−1)×N_(d−1).

For each partition type, prediction encoding may be repeatedly performed on one 2N_(d−1)×2N_(d−1) prediction unit, two 2N_(d−1)×N_(d−1) prediction units, two N_(d−1)×2N_(d−1) prediction units, and four N_(d−1)×N_(d−1) prediction units. Since the maximum depth is d, a coding unit 952 having a depth of d−1 is no longer split to a lower depth.

The video encoding apparatus 100 may compare encoding errors according to depths of the coding unit 900 and select a depth having the least encoding error so as to determine a coded depth for a coding unit 912.

For example, in the case of a coding unit having a depth of 0, prediction encoding is individually performed for the partition types 912, 914, 916, and 918 and a prediction unit having the least encoding error is selected. Similarly, a prediction having the least encoding error of each of coding units having depths of 0, 1, . . . , through to d−1 may be searched for. In the case of the depth of 0, a least encoding error may be determined by prediction encoding, based on a coding unit 960 having a size of 2N_d×2N_d, which is also used as a prediction unit.

As such, the minimum encoding errors according to depths are compared in all of the depths of 1 through d, and a depth having the least encoding error may be determined as a coded depth. The coded depth and a prediction unit thereof may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 912 to decode the coding unit 912. The video decoding apparatus 200 may determine a depth, in which split information is 0, as a coded depth by using split information according to depths, and use information about an encoding mode of the corresponding depth for decoding.

Figure 60:
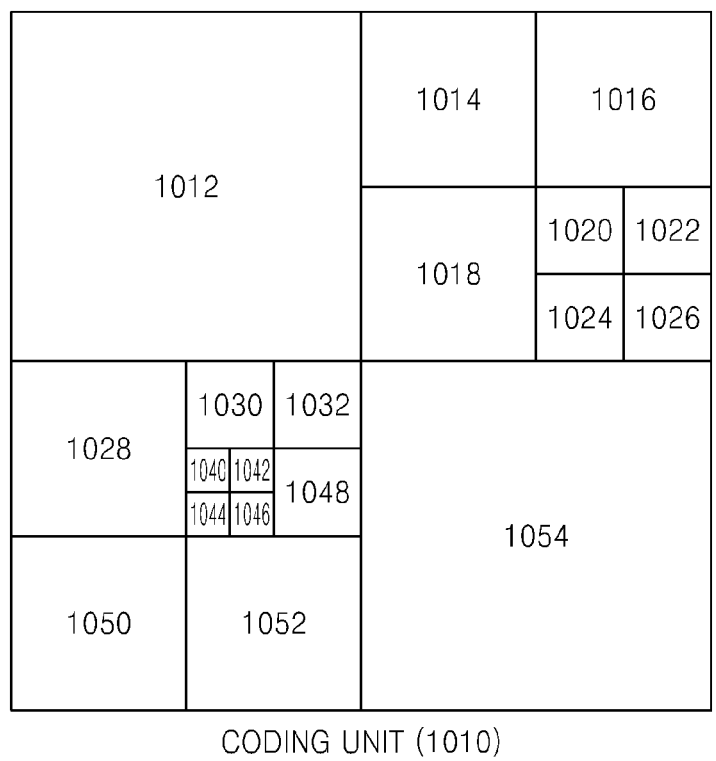
FIGS. 60 to 62 are diagrams for describing a relationship between a coding unit, a prediction unit, and a transformation unit, according to an exemplary embodiment.
Figure 61:
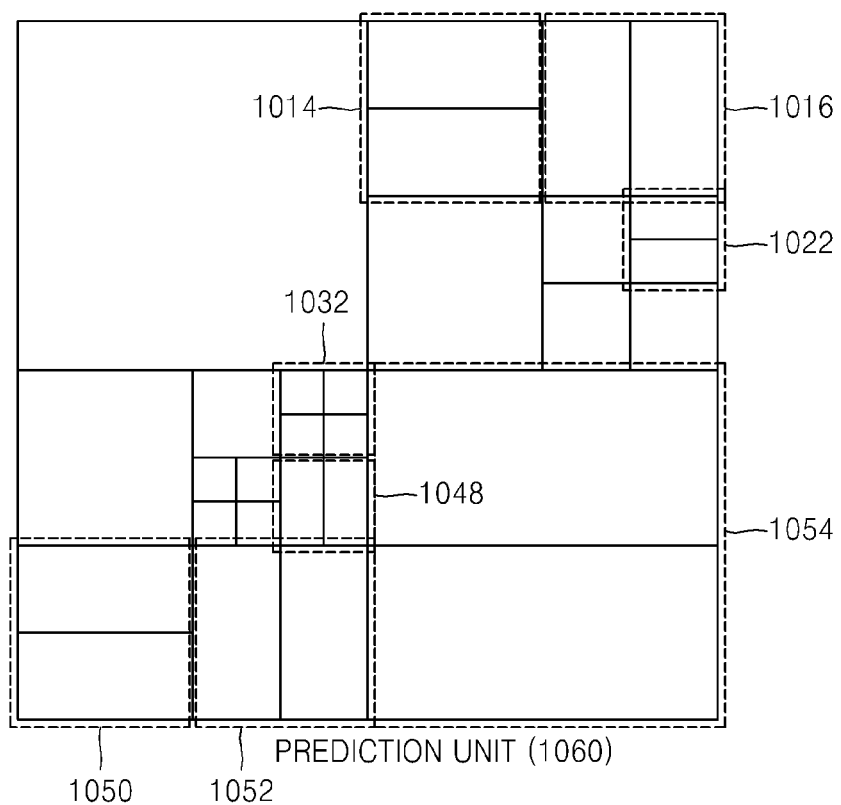
Figure 62:
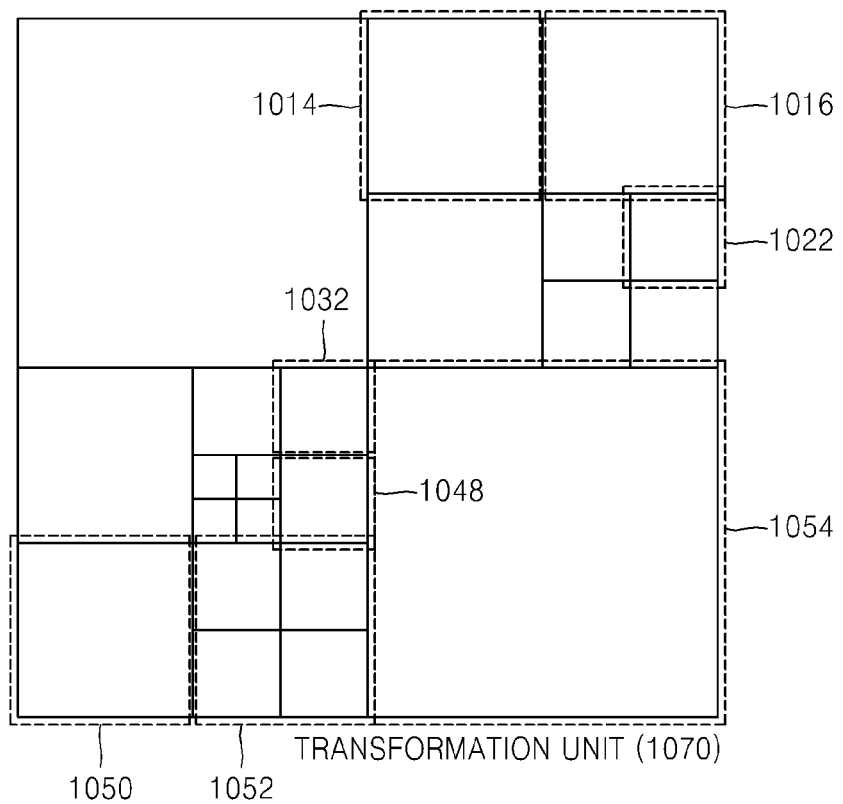

FIGS. 60 through 62 are diagrams for describing a relationship between a coding unit 1010, a prediction unit 1060, and a transformation unit 1070, according to an exemplary embodiment.

The coding unit 1010 includes coding units having a tree structure, corresponding to coded depths determined by the video encoding apparatus 100, in a maximum coding unit. The prediction unit 1060 includes prediction units corresponding to the coding units 1010. The transformation unit 1070 includes transformation units corresponding to the coding units 1010.

When a depth of a maximum coding unit is 0 in the coding unit 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction unit 1060, some prediction units 1014, 1016, 1022, 1032, 1048, 1050, 1052, and 1054 are divided from one of the coding units 1012 to 1054. In other words, the prediction units 1014, 1022, 1050, and 1054 are partition types having a size of 2N×N, the prediction units 1016, 1048, and 1052 are partition types having a size of N×2N, and the prediction unit 1032 is a partition type having a size of N×N. The prediction units of the coding unit 1010 are smaller than or equal to the corresponding coding units.

Transformation or inverse transformation is performed on image data of some transformation units 1052 in the transformation units 1070 in the units of data units that are smaller than the coding unit 1052. Also, the transformation units 1014, 1016, 1022, 1032, 1048, 1050, 1052, and 1054 are different from the corresponding prediction units in the prediction unit 1060 in terms of sizes and shapes. In other words, the video encoding and decoding apparatuses 100 and 200 may perform intra prediction, motion estimation, motion compensation, transform, and inverse transformation individually on different data units in even the same coding unit.

FIG. 63 is a table illustrating encoding information for each coding unit, according to an exemplary embodiment. The output unit 130 of the video encoding apparatus 100 may output coding unit for each coding unit, and the image data and encoding information extractor 220 of the video decoding apparatus 200 may extract the encoding information for each coding unit.

Encoding information may include split information about a coding unit, information about a partition type, information about a prediction mode, and information about a transformation unit size. The encoding information illustrated in the table are examples of encoding information that may be set by the video encoding apparatus 100 and the video decoding apparatus 200.

The split information may indicate a coded depth of each coding unit. Since a depth that is no longer split into a lower depth based on the split information is a coded depth, the information about a partition type, a prediction mode, and information regarding a transformation unit size may be determined for the coded depth. If a current coding unit is further split according to the split information, encoding is independently performed on four split coding units of a lower depth.

In the information about a partition type, a partition type of a transformation unit of a coding unit corresponding to the coded depth may be one of 2N×2N, 2N×N, N×2N, and N×N. A prediction mode may be one of an intra mode, an inter mode, and a skip mode. The intra mode and the inter mode may be defined in all partition types, and the skip mode is defined only in a partition type having a size of 2N×2N. The size of the transformation unit may be set to be two types in the intra mode and two types in the inter mode.

A minimum coding unit in each coding unit may contain encoding information in the units of coding units corresponding to a coded depth. Accordingly, it may be determined whether adjacent minimum data units are included in coding units corresponding to the same coded depth by comparing encoding information of the adjacent minimum data units. Also, a coding unit corresponding to a coded depth may be determined by using encoding information contained in a minimum data unit, and thus a distribution of coded depths in a maximum coding unit may be determined.

Accordingly, if a current coding unit is predicted based on adjacent data units, encoding information of minimum data units in deeper coding units adjacent to the current coding unit may be directly referred to and used.

Alternatively, only encoding information of a representative minimum coding unit from among coding units according to depths may be stored. In this case, if a current coding unit is predicted based on adjacent coding units, data units adjacent to the current coding unit are searched for from among coding units according to depths, based on encoding information of adjacent coding units according to depths.

Figure 64:
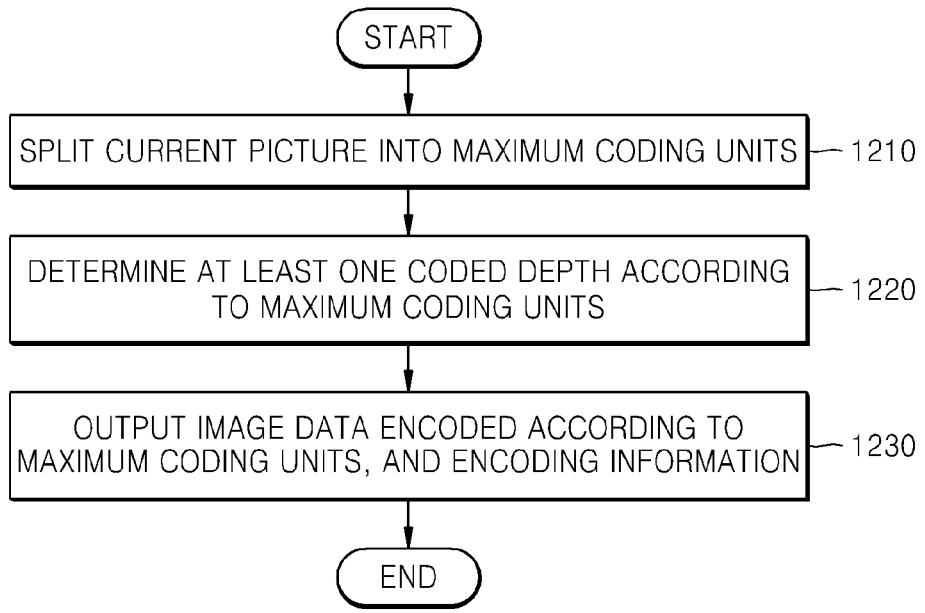
FIG. 64 is a flowchart illustrating a video encoding method based on hierarchical data units of each image region, according to another exemplary embodiment.

FIG. 64 is a flowchart illustrating a video encoding method based on hierarchical data units of each image region, according to another exemplary embodiment. In operation 1210, a current picture is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region. Each of the maximum coding units is hierarchically split, and as a depth deepens, encoding is repeatedly performed on coding units of a lower depth.

Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data constituting the final encoding result according to the coded depth is output for each maximum coding unit, with encoding information about the coded depth and an encoding mode. The information about the encoding mode may include information about a coded depth or split information, information about a partition type of the coded depth, a prediction mode, and a size of a transformation unit. The encoded information about the encoding mode may be transmitted to a decoder with the encoded video data.

Figure 65:
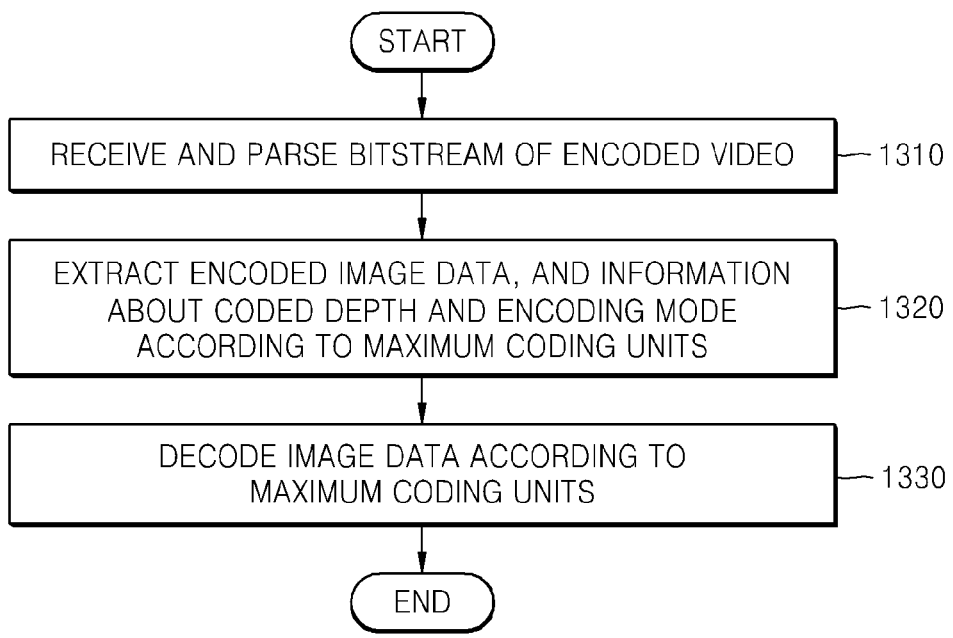
FIG. 65 is a flowchart illustrating a video decoding method based on hierarchical data units of each image region, according to another exemplary embodiment.

FIG. 65 is a flowchart illustrating a video decoding method based on hierarchical data units of each image region, according to another exemplary embodiment. In operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting the each maximum coding unit according to depths. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. The decoded image data may be reconstructed by a reconstructing apparatus, stored in a storage medium, or transmitted through a network.

Video encoding and decoding performed based on hierarchical data units of each image region according to various exemplary embodiments has been described above with reference to FIGS. 51 to 65. Image data in transformation units from among hierarchical data units of each image region according to an exemplary embodiment, may be image data input to the video encoding apparatuses 10, 3600, 4300, and 4700 that use a low-complexity transformation according to various exemplary embodiments. Also, image data reconstructed by the video decoding apparatuses 20, 3700, 4400, and 4800 that use a low-complexity transformation according to various exemplary embodiments, may be image data in transformation units.

A video encoding method and apparatus and a video decoding method and apparatus that use a low-complexity transformation based on hierarchical data units of each image region according to various exemplary embodiments, will now be described with reference to FIGS. 66 to 69.

Figure 66:
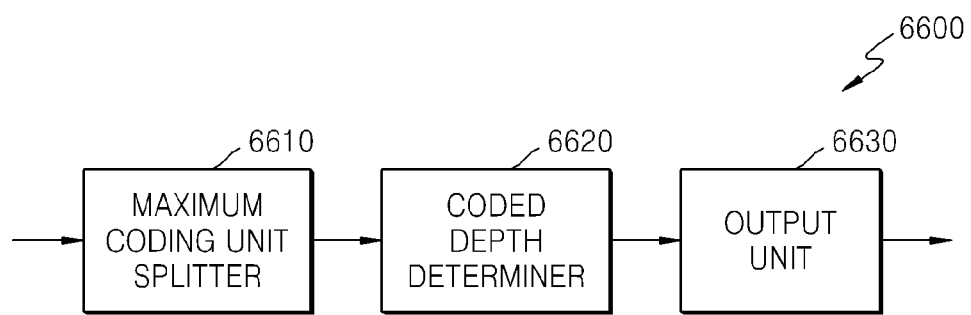
FIG. 66 is a block diagram of a video encoding apparatus using the low-complexity transformation based on hierarchical data units of each image region, according to another exemplary embodiment.

FIG. 66 is a block diagram of a video encoding apparatus 6600 using the low-complexity transformation based on hierarchical data units of each image region, according to another exemplary embodiment. The apparatus 6600 includes a maximum coding unit splitter 6610, a coded depth determiner 6620, and an output unit 6630.

The maximum coding unit splitter 6610 may split a current picture based on a maximum coding unit for the current picture of an image. Image data may be output to the coded depth determiner 6620 according to the at least one maximum coding unit.

The coded depth determiner 6620 encodes at least one split domain obtained by splitting a domain of the maximum coding unit according to depths, and determines a depth to output a final encoding result according to the at least one split domain. In other words, the coded depth determiner 6620 determines a coded depth by encoding the image data in deeper coding units according to depths, according to the maximum coding unit of the current picture, and selecting a depth having the least encoding error. The determined coded depth and the image data according to the maximum coding units are output to the output unit 6630.

The output unit 6630 outputs the image data of the maximum coding unit, which is encoded based on the at least one encoding depth determined by the coded depth determiner 6620, and information about coding modes according to depths, in bitstreams.

The output unit 6630 may encode and transmit only coefficients obtained by performing the low-complexity transformation, e.g., a selective transformation, a sub data unit transformation, or a sale-down transformation, on image data in transformation units determined by the coded depth determiner 6620.

During the encoding of the coded depth determiner 6620, not only either a frequency band or the size of a coefficient block including a coefficient other than '0' when a transformation is performed on a transformation unit or a transformation basis appropriate for frequency characteristics may be determined, but also a type of the low-complexity transformation and details of the selected low-complexity transformation may be determined. Information regarding the selection of a type of the low-complexity transformation and the details of the selected low-complexity transformation may be encoded and transmitted together with the encoded coefficients.

In the coded depth determiner 6620, a video encoding apparatus from among the video encoding apparatus 10 that uses a selective frequency-domain transformation according to an exemplary embodiment, the video encoding apparatus 3600 that uses a sub data unit transformation according to another exemplary embodiment, the video encoding apparatus 4300 that uses a scale-down transformation according to another exemplary embodiment, and the video encoding apparatus 4700 that uses a low-complexity transformation according to another exemplary embodiment, may be installed as a transformation module.

Figure 67:
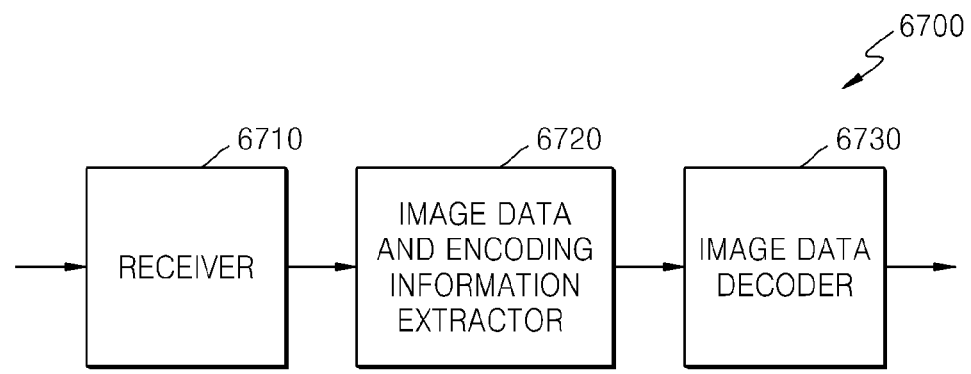
FIG. 67 is a block diagram of a video decoding apparatus using the low-complexity inverse transformation based on hierarchical data units of each image region, according to another exemplary embodiment.

FIG. 67 is a block diagram of a video decoding apparatus 6700 using the low-complexity inverse transformation based on hierarchical data units of each image region, according to another exemplary embodiment. The video decoding apparatus 6700 includes a receiver 6710, an image data and encoding information extractor 6720, and an image data decoder 6730. Various terms, e.g., a coding unit, a depth, a prediction unit, a transformation unit, and information regarding various encoding modes, which are related to various processes performed by the video decoding apparatus 6700, have been described above with reference to FIGS. 51 to 65 and 67.

The receiver 6710 receives and parses a bitstream of encoded video. The image data and encoding information extractor 6720 extracts image data in the units of maximum coding units from the parsed bitstream, and then outputs the image data to the image data decoder 6730. The image data and encoding information extractor 6720 may extract information regarding a maximum size of a coding unit of a current picture, information regarding a coded depth of each maximum coding unit, and information regarding an encoding mode, from a header of the current picture. The image data in the bitstream is split into maximum coding units based on the extracted information so that the image data decoder 6730 may decode the image data in the units of maximum coding units.

The image data and encoding information extractor 6720 may extract information regarding a selection of a type of the low-complexity transformation and information regarding details of the selected transformation, from the parsed bitstream.

In order to perform an inverse transformation in the units of maximum coding units, the image data decoder 6730 may perform an inverse transformation on coding units by respectively using transformation units corresponding to the coding units, based on information regarding a transformation unit size of coding units according to coded depths. In this case, a low-complexity inverse transformation may be performed on coefficients of transformation units obtained through the low-complexity transformation, based on the information regarding a selection of a type of the low-complexity transformation and details of the selected low-complexity transformation.

In the image data decoder 6730, a video decoding apparatus from among the video decoding apparatus 20 that uses a selective frequency-domain inverse transformation according to an exemplary embodiment, the video decoding apparatus 3700 that uses a sub data unit inverse transformation according to another exemplary embodiment, the video decoding apparatus 4400 that uses a scale-down inverse transformation according to another exemplary embodiment, and the video decoding apparatus 4800 that uses a low-complexity transformation according to another exemplary embodiment, may be installed as an inverse transformation module.

Figure 68:
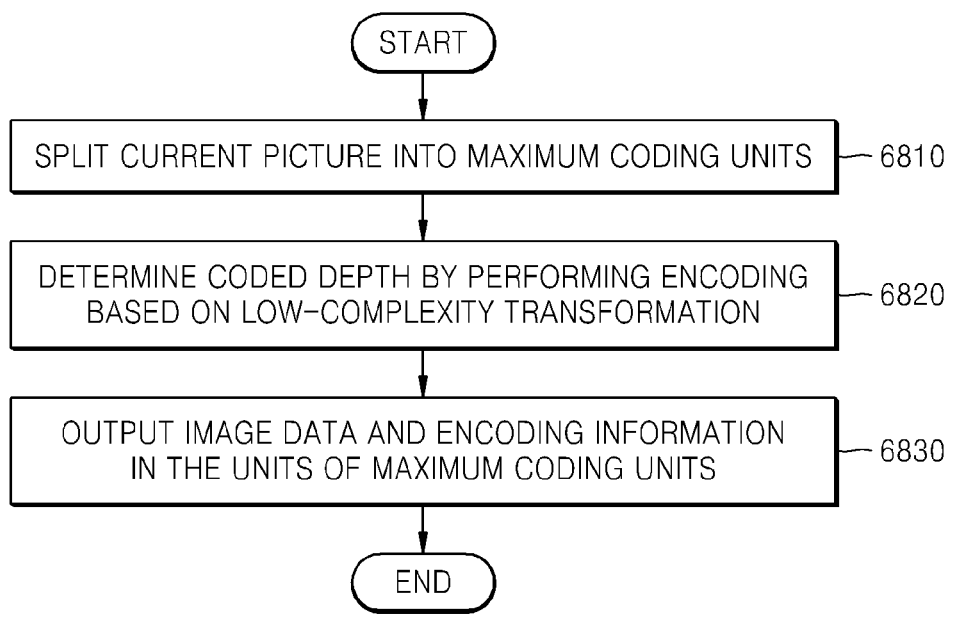
FIG. 68 is a flowchart illustrating a video encoding method using the low-complexity transformation based on hierarchical data units of each image region, according to another exemplary embodiment.

FIG. 68 is a flowchart illustrating a video encoding method using the low-complexity transformation based on hierarchical data units of each image region, according to another exemplary embodiment. In operation 6810, a current picture may be split based on a maximum coding unit for the current picture of an image.

In operation 6820, at least one split domain obtained by splitting a domain of the maximum coding unit according to depths is encoded, and a depth to output a final encoding result according to the at least one split domain is determined. For example, the image data may be encoded in deeper coding units according to depths, according to the maximum coding unit of the current picture, and a depth having the least encoding error may be selected as a coded depth. A transformation performed during the encoding may be a low-complexity transformation, e.g., a selective frequency-domain transform, a sub data unit transformation, or a scale-down transformation.

In operation 6830, the image data of the maximum coding unit, which is encoded based on a determined at least one coded depth, and information about encoding modes according to depths are output in the form of a bitstream. With respect to image data in transformation units, only coefficients obtained through the low-complexity transformation, e.g., the selective frequency-domain transform, the sub data unit transformation, or the scale-down transformation, may be encoded and transmitted.

Figure 69:
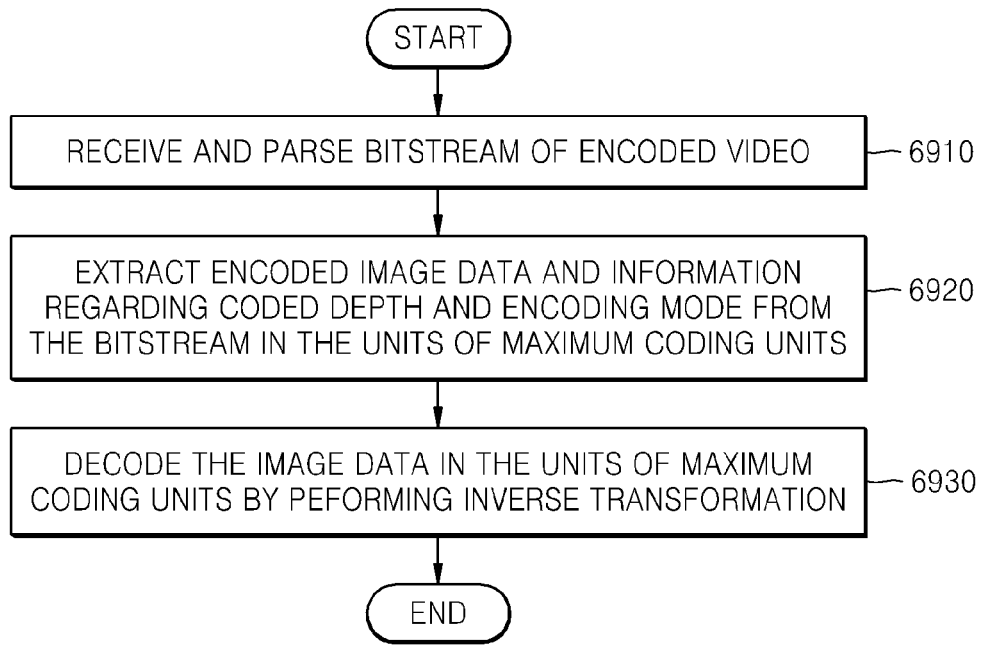
FIG. 69 is a flowchart illustrating a video decoding method using the low-complexity inverse transformation based on hierarchical data units of each image region, according to an exemplary embodiment.

FIG. 69 is a flowchart illustrating a video decoding method using the low-complexity inverse transformation based on hierarchical data units of each image region, according to an exemplary embodiment. In operation 6910, a bitstream containing information regarding encoded video is received and parsed. In operation 6920, image data may be extracted in the units of maximum coding units from the parsed bitstream. Information regarding a maximum size of a coding unit of a current picture, information regarding a coded depth of each maximum coding unit, and information regarding an encoding mode, may also be extracted from the parsed bitstream.

Information regarding a selection of a type of the low-complexity transformation and details of the selected low-complexity transformation may further be extracted from the parsed bitstream.

In operation 6930, in order to perform an inverse transformation in the units of maximum coding units, an inverse transformation may be performed on coding units by respectively using transformation units corresponding to the coding units, based on information regarding a transformation unit size of coding units according to coded depths. In this case, coefficients of the transformation units obtained through the low-complexity transformation may be inversely transformed according to an appropriate low-complexity inverse transformation selected based on the information regarding the selection of a type of the low-complexity transformation and the details of the selected low-complexity transformation, thereby reproducing the image data.

In the case of a large amount of an image or a high-definition image, an amount of calculation may be very large when the image is encoded or decoded in the units of relatively small macroblocks. According to frequency characteristics of a general image, coefficients other than '0' are likely to be distributed in a particular frequency band. In this case, it is inefficient to perform a transformation or an inverse transformation on a large amount of data in the units of relatively small macroblocks.

In the video encoding method and apparatus of FIGS. 66 and 68 that use the low-complexity transformation based on hierarchical data units of each image region, according to an exemplary embodiment, a transformation is performed on data in coding units and transformation units, the sizes of which are hierarchically determined based on an image size and in the units of image regions by using a predetermined frequency band, sub data units, or a scale-down transformation basis. Accordingly, a relatively small bit rate is needed to transformation a bitstream. Also, in the video decoding method and apparatus of FIGS. 67 and 69 that use a low-complexity inverse transformation based on hierarchical data units of each image region, according to an exemplary embodiment, an inverse transformation is performed on only received coefficients by using a predetermined frequency band, sub data units, or a scale-down transformation basis. Accordingly, an amount of calculation is relatively small during a decoding process.

The above exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, one or more of the above-described elements can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of exemplary embodiments, but by the appended claims, and all differences within the scope will be construed as being included in the present invention.

The invention claimed is:

1. A method of encoding video by using a low-complexity transformation, the method comprising: receiving image data of an input picture in predetermined data units; generating coefficients of the predetermined data units by performing the low-complexity transformation, wherein the low-complexity transformation comprises at least one of a selective frequency-domain transformation that applies a sub-basis of a transformation basis, which corresponds to a predetermined frequency-domain of the transformation basis, to the image data, a sub data unit transformation that performs a transformation by respectively selecting and applying transformation bases for a plurality of sub data units divided from the image data, and a scale-down transformation that uses a scale-down rectangular transformation basis obtained by combining a rectangular matrix and a square matrix and scaling down a result of the combining; and outputting the generated coefficients generated with respect to the predetermined data units of the input picture, wherein a transformation basis of at least one sub data unit among the sub data units is different from a transformation basis of each of other sub data units among the sub data units, wherein the generating of the coefficients comprises generating a coefficient unit comprising the generated coefficients by performing the low-complexity transformation on the predetermined data units, wherein a size of the coefficient unit is less than a size of a data unit of the image data to which the low-complexity transformation is performed to generate the coefficients, and wherein the sub data unit transformation generates the coefficient unit by combining at least two coefficient units.

2. The method of claim 1, wherein the generating of the coefficients comprises:
selecting the predetermined frequency-domain for performing a transformation on the image data; and
performing the selective frequency-domain transformation by using the transformation basis corresponding to the predetermined frequency-domain so as to generate coefficients of the predetermined frequency-domain.

3. The method of claim 2, wherein, during the performing of the selective frequency-domain transform, the coefficients of the predetermined frequency-domain are generated by performing a transformation by selecting, from among square transformation bases, a transformation basis corresponding to a current frequency-domain related to a predetermined frequency band, a predetermined-sized coefficient block, or a predetermined coefficient location, and applying the selected transformation basis to the image data.

4. The method of claim 3, wherein the performing of the selective frequency-domain transformation comprises individually selecting a vertical frequency band and a horizontal frequency band from the square transformation bases.

5. The method of claim 2, wherein, during the performing of the selective frequency-domain transform, coefficients except for the coefficients of the predetermined frequency-domain are generated by performing a transformation by selecting, from among the square transformation bases, a transformation basis selected by excluding a predetermined frequency band and applying the selected transformation basis to the image data.

6. The method of claim 3, wherein, during the performing of the selective frequency-domain transform, a transformation is performed in units of arbitrary frequency bands by applying a vertical transformation basis and a horizontal transformation basis to the image data so that coefficients generated through the transformation may be classified according to the arbitrary frequency bands, wherein the vertical transformation basis corresponds to a vertical frequency band of a predetermined frequency band from among the arbitrary frequency bands and the horizontal transformation basis corresponds to a horizontal frequency band of the predetermined frequency band.

7. The method of claim 3, wherein, during the performing of the selective frequency-domain transform, a transformation is performed in units of arbitrary-sized coefficient blocks by applying a vertical transformation basis and a horizontal transformation basis to the image data so that coefficients generated through the transformation may be classified according to the arbitrary-sized coefficient blocks, wherein the vertical transformation basis corresponds to a vertical size of a predetermined coefficient block from among the arbitrary-sized coefficient blocks and the horizontal transformation basis corresponds to a horizontal size of the predetermined coefficient block.

8. The method of claim 3, wherein, during the performing of the selective frequency-domain transform, a transformation is performed in units of coefficients by applying a vertical transformation basis and a horizontal transformation basis to the image data so that coefficients generated through the transformation may be differentiated from one another, wherein the vertical transformation basis and the horizontal transformation basis respectively correspond to the coefficients from among the square transformation bases.

9. The method of claim 3, wherein the performing of the selective frequency-domain transformation comprises individually selecting a vertical frequency basis and a horizontal frequency basis from among the square transformation bases.

10. The method of claim 1, wherein the generating of the coefficients comprises:
dividing the image data into the plurality of sub data units; and
performing the sub data unit transformation by individually selecting and applying the transformation bases to the plurality of sub data units so as to generate coefficients of the plurality of sub data units.

11. The method of claim 10, wherein the performing of the sub data unit transformation comprises combining coefficient blocks corresponding to the plurality of sub data units.

12. The method of claim 10, wherein the performing of the sub data unit transformation comprises performing a transformation on coefficient blocks corresponding to the plurality of sub data units.

13. The method of claim 1, wherein the generating of the coefficients comprises performing the scale-down transformation by performing a transformation on the scale-down rectangular transformation basis to the image data so as to generate the coefficients.

14. The method of claim 13, wherein, if horizontal and vertical sizes of the image data are a second size, the performing of the scale-down transformation comprises at least one of:
performing a transformation using a rectangular transformation basis, a horizontal size of which is a first size, greater than the second size, and a vertical size of which is the second size, and that is a combination of a transformation basis matrix, horizontal and vertical sizes of which are the first size, and a scale-down spatial matrix, a horizontal size of which is the first size and a vertical size of which is the second size;
performing a transformation using a rectangular transformation basis, a horizontal size of which is the first size and a vertical size of which is the second size, and that is a combination of a matrix, horizontal and vertical sizes of which are the first size, and a transformation basis matrix, horizontal and vertical sizes of which are the second size, for selecting a predetermined frequency-domain; and
selectively performing the scale-down transformation on the image data when performing a transformation using a transformation basis matrix, horizontal and vertical sizes of which are the second size, quantizing a result of the performing, and a component other than '0' is not present in high-frequency components.

15. The method of claim 1, further comprising encoding information regarding a type of a selected transformation and details of the selected transformation so as to perform the low-complexity transformation.

16. The method of claim 1, further comprising changing a coefficient scanning order such that coefficients of downscaled coefficient blocks generated through the low-complexity transformation are scanned and encoded.

17. The method of claim 16, wherein the generated coefficient blocks comprises at least one of coefficient blocks generated in units of frequency bands through the selective frequency-domain transform, coefficient blocks generated in units of sub data units through the sub data unit transformation, and coefficient blocks obtained through the scale-down transformation.

18. The method of claim 16, wherein the changing of the coefficient scanning order comprises changing the coefficient scanning order such that the generated coefficient blocks are individually scanned.

19. The method of claim 16, wherein the changing of the coefficient scanning order comprises changing the coefficient scanning such that the generated coefficient blocks are individually scanned.

20. The method of claim 16, further comprising encoding coefficient block size information for scanning the coefficients.

21. The method of claim 16, wherein the changing of the coefficient scanning order comprises changing the coefficient scanning order in units of the generated coefficient blocks and according to frequency characteristics.

22. The method of claim 16, wherein the changing of the coefficient scanning order comprises changing the coefficient scanning order such that only the generated coefficient blocks from among all coefficients of the image data are scanned and encoded.

23. The method of claim 16, wherein the changing of the coefficient scanning order comprises changing the coefficient scanning order such that coefficient blocks generated excluding coefficient blocks of the predetermined frequency band from among all coefficients of the image data are scanned and encoded.

24. The method of claim 1, further comprising setting and encoding coded coefficient block pattern information indicating whether a coefficient other than '0' is present in a coefficient block including the generated coefficients.

25. The method of claim 24, further comprising changing a coefficient scanning order such that a coefficient block including a coefficient other than '0' is scanned, based on the coded coefficient block pattern information.

26. The method of claim 2, wherein the generating of the coefficients further comprises performing a transformation by applying a transformation basis having a same size as the image data to the image data, and determining the frequency-domain based on a result of analyzing frequency characteristics according to the transformation performed by applying the transformation basis having the same size as the image data.

27. The method of claim 1, further comprising:
dividing the input picture into predetermined maximum coding units; and
determining an encoding mode regarding a coding unit corresponding to at least one coded depth to output an encoding result by encoding the maximum coding units in units of regions, which are hierarchically split from the maximum coding units as a depth deepens, by performing a transformation based on at least one transformation unit for at least one deeper coding units according to depths, wherein the encoding mode comprises information regarding the at least one coded depth and a transformation unit size,
wherein the receiving of the image data comprises receiving a residual component of the at least one transformation unit.

28. A method of decoding video by using a low-complexity inverse transformation, the method comprising: receiving coefficients of predetermined data units of a picture; generating image data in the predetermined data units by performing the low-complexity inverse transformation on the received coefficients, wherein the low-complexity inverse transformation comprises at least one of a selective frequency-domain inverse transformation that uses a sub basis of a transformation basis which corresponds to a predetermined frequency-domain of the transformation basis, an inverse sub data unit transformation that performs an inverse transformation by respectively selecting and applying transformation bases for a plurality of sub data units divided from the picture, and a scale-down inverse transformation that uses a scale-down rectangular transformation basis that is a combination of a rectangular matrix and a square matrix; and reconstructing the picture from the generated image data, wherein a transformation basis of at least one sub data unit among the sub data units is different from a transformation basis of each of other sub data units among the sub data units, wherein the inverse sub data unit transformation generates coefficients of the plurality of sub data units by copying the received coefficients at least one time, wherein the generating of the image data comprises generating a data unit of the image data by performing the low-complexity inverse transformation on a received coefficient unit comprising the received coefficients, and wherein a size of the coefficient unit to which the low-complexity inverse transformation is performed to generate the data unit of image data is less than a size of the data unit of image data.

29. The method of claim 28, wherein the performing of the low-complexity transformation and the generating of the image data comprises performing the selective frequency-domain inverse transformation by applying the transformation basis for the predetermined frequency-domain to the received coefficients.

30. The method of claim 29, wherein, during the performing of the selective frequency-domain inverse transformation, the image data in the predetermined data units is reconstructed by performing an inverse transformation by selecting, from among square transformation bases, a transformation basis corresponding to a current frequency-domain related to a predetermined frequency band, a predetermined-sized coefficient block, or a predetermined coefficient location, and applying the selected transformation basis to the received coefficients.

31. The method of claim 28, wherein the performing of the low-complexity inverse transformation and the generating of the image data comprises:
generating coefficients of the plurality of sub data units from the received coefficients; and
performing the sub data unit inverse transformation by individually selecting and applying the transformation bases to the plurality of sub data units so as to generate the image data in the predetermined data units.

32. The method of claim 31, wherein the generating of the coefficients of the plurality of sub data units comprises generating the coefficients of the plurality of sub data units by copying the received coefficients a number of times corresponding to a number of the plurality of sub data units.

33. The method of claim 31, wherein the generating of the coefficients of the plurality of sub data units comprises generating the coefficients of the plurality of sub data units by performing an inverse transformation on the received coefficients.

34. The method of claim 28, wherein the performing of the low-complexity inverse transformation and the generating of the image data comprises performing the scale-down inverse transformation by applying the scale-down rectangular transformation basis to the received coefficients so as to generate the image data in the predetermined data units.

35. The method of claim 34, wherein, if horizontal and vertical sizes of the image data are the second size, the performing of the scale-down inverse transformation comprises at least one of:

performing an inverse transformation using a rectangular transformation basis, a horizontal size of which is a first size, greater than the second size, and a vertical size of which is the second size, and that is a combination of a transformation basis matrix, horizontal and vertical sizes of which are the first size and a scale-down spatial matrix, a horizontal size of which is the first size and a vertical size of which is the second size;

performing an inverse transformation using a rectangular transformation basis, a horizontal size of which is the first size and a vertical size of which is the second size, and that is a combination of a matrix, a horizontal size of which is the first size and a vertical size of which is the second size and a transformation basis matrix, horizontal and vertical sizes of which are the second size, for selecting a predetermined frequency-domain; and selectively performing the scale-down inverse transformation on the image data when the received coefficients include low-frequency components including components other than '0'.

36. The method of claim 28, further comprising changing a coefficient scanning order such that the received coefficients are scanned and decoded.

37. The method of claim 28, further comprising receiving coefficient block size information for scanning the coefficients.

38. The method of claim 28, further comprising receiving coded coefficient block pattern information indicating whether a coefficient other than '0' is present in a coefficient block including the generated coefficients.

39. The method of claim 28, wherein, if during encoding of the picture, an encoding mode regarding a coding unit corresponding to at least one coded depth to output an encoding result is determined by encoding maximum coding units in units of regions, which are hierarchically split from the maximum coding units as a depth deepens, by performing a transformation based on at least one transformation unit for at least one deeper coding units according to depths, wherein the encoding mode comprises information regarding the at least one coded depth and a transformation unit size, then the receiving of the coefficients comprises receiving coefficients of transformation units of the maximum coding units of the picture.

40. An apparatus for encoding video by using a low-complexity transformation, the apparatus comprising: an image data receiver which receives image data of an input picture in predetermined data units; a low-complexity transformation unit which generates coefficients of the predetermined data units by performing the low-complexity transformation, wherein the low-complexity transformation comprises at least one of a selective frequency-domain transformation that applies a sub-basis of a transformation basis, which corresponds to a predetermined frequency-domain of the transformation basis, to the image data, a sub data unit transformation that performs a transformation by respectively selecting and applying transformation bases for a plurality of sub data units divided from the image data, and a scale-down transformation that uses a scale-down rectangular transformation basis obtained by combining a rectangular matrix and a square matrix and scaling down a result of the combining; and a transformation coefficient output unit which outputs the generated coefficients generated with respect to the predetermined data units of the input picture, wherein a transformation basis of at least one sub data unit among the sub data units is different from a transformation basis of each of other sub data units among the sub data units, wherein the low-complexity transformation unit generates a coefficient unit comprising the generated coefficients by performing the low-complexity transformation on the predetermined data units, wherein a size of the coefficient unit is less than a size of a data unit of the image data to which the low-complexity transformation is performed to generate the coefficients, and wherein the low-complexity transformation unit performs the sub data unit transformation generating the coefficient unit by combining at least two coefficient units.

41. The apparatus of claim 40, wherein the low-complexity transformation unit comprises:
   a selective frequency-domain transformation unit which generates selective frequency-domain coefficients by performing a transformation by applying the transformation basis for the predetermined frequency-domain to the image data;
   a sub data unit transformation unit which generates coefficients of the plurality of sub data units by performing a transformation by individually selecting and applying the transformation bases to the plurality of sub data units divided from the image data; and
   a scale-down transformation unit which generates coefficients by performing a scale-down transformation by applying the scale-down rectangular transformation basis, which is a combination of the rectangular matrix and the square matrix, to the image data.

42. The apparatus of claim 40, which changes a coefficient scanning order such that coefficients of down-scaled coefficient blocks generated through the low-complexity transformation are scanned and encoded.

43. The method of claim 40, wherein the transformation coefficient output unit further encodes and transmits information regarding a type of a selected transformation and details of the selected transformation so as to perform the low-complexity transformation on the generated transformation coefficients.

44. An apparatus for decoding video by using a low-complexity inverse transformation, the apparatus comprising: a coefficient receiver which receives coefficients of predetermined data units of a picture; a low-complexity inverse transformation unit which generates image data in the predetermined data units by performing the low-complexity inverse transformation on the received coefficients, wherein the low-complexity inverse transformation comprises at least one of a selective frequency-domain inverse transformation that uses a sub basis of a transformation basis which corresponds to a predetermined frequency-domain of the transformation basis, an inverse sub data unit transformation that performs an inverse transformation by respectively selecting and applying transformation bases for a plurality of sub data units divided from the picture, and a scale-down inverse transformation that uses a scale-down rectangular transformation basis that is a combination of a rectangular matrix and a square matrix; and a picture reproducing unit which reproduces the generated picture from the image data, wherein a transformation basis of at least one sub data unit among the sub data units is different from a transformation basis of each of other sub data units among the sub data units, wherein the low-complexity inverse transformation unit performs the inverse sub data unit transformation generating coefficients of the plurality of sub data units by copying the received coefficients at least one time, wherein the low-complexity inverse transformation unit generates a data unit of the image data by performing the low-complexity inverse transformation on a received coefficient unit comprising the received coefficients, and wherein a size of the coefficient unit to which the low-complexity inverse transformation is performed to generate the data unit of image data is less than a size of the data unit of image data.

45. The apparatus of claim 44, wherein the low-complexity inverse transformation unit comprises:
   a selective frequency-domain inverse transformation unit which generates the image data in the predetermined data units by performing an inverse transformation by applying the transformation basis for the predetermined frequency-domain to the received coefficients;
   a sub data unit frequency-domain inverse transformation unit which generates the image data in the predetermined data units by generating coefficients of the plurality of sub data units from the received coefficients and performing an inverse transformation by individually selecting and applying the transformation bases to the generated coefficients; and
   a scale-down inverse transformation unit which generates the image data in the predetermined data units by performing a scale-down inverse transformation by applying the scale-down rectangular transformation basis, which is a combination of the rectangular matrix and the square matrix, to the image data.

46. The apparatus of claim 44, which changes a coefficient scanning order such that locations of coefficients being selectively encoded through the low-complexity transformation.

47. The apparatus of claim 44, wherein the coefficient receiver further receives information regarding a type of a selected transformation and details of the selected transformation so as to perform the low-complexity inverse transformation on the received coefficients.

48. A non-transitory computer readable recording medium having recorded thereon a computer program for executing the video encoding method of claim 1.

49. A non-transitory computer readable recording medium having recorded thereon a computer program for executing the video decoding method of claim 28.

* * * * *